(12) United States Patent
Mukhopadhyay et al.

(10) Patent No.: US 12,496,275 B2
(45) Date of Patent: Dec. 16, 2025

(54) DRUG DELIVERY METHODS AND COMPOSITIONS

(71) Applicant: Mayo Foundation for Medical Education and Research, Rochester, MN (US)

(72) Inventors: Debabrata Mukhopadhyay, Jacksonville, FL (US); Vijay S. Madamsetty, Jacksonville, FL (US); Krishnendu Pal, Jacksonville, FL (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 918 days.

(21) Appl. No.: 17/618,389

(22) PCT Filed: Jun. 16, 2020

(86) PCT No.: PCT/US2020/037860
§ 371 (c)(1),
(2) Date: Dec. 10, 2021

(87) PCT Pub. No.: WO2020/257148
PCT Pub. Date: Dec. 24, 2020

(65) Prior Publication Data
US 2022/0257515 A1    Aug. 18, 2022

Related U.S. Application Data

(60) Provisional application No. 62/862,525, filed on Jun. 17, 2019.

(51) Int. Cl.
| | | |
|---|---|---|
| *A61K 9/51* | (2006.01) |
| *A61K 9/1275* | (2025.01) |
| *A61K 31/165* | (2006.01) |
| *A61K 31/337* | (2006.01) |
| *A61K 31/343* | (2006.01) |
| *A61K 31/353* | (2006.01) |
| *A61K 31/365* | (2006.01) |
| *A61K 31/381* | (2006.01) |
| *A61K 31/395* | (2006.01) |
| *A61K 31/433* | (2006.01) |
| *A61K 31/436* | (2006.01) |
| *A61K 31/444* | (2006.01) |
| *A61K 31/475* | (2006.01) |
| *A61K 31/513* | (2006.01) |
| *A61K 31/517* | (2006.01) |
| *A61K 31/519* | (2006.01) |
| *A61K 31/52* | (2006.01) |
| *A61K 31/5377* | (2006.01) |
| *A61K 31/7068* | (2006.01) |
| *A61K 31/7072* | (2006.01) |
| *A61K 31/7076* | (2006.01) |
| *A61K 47/60* | (2017.01) |
| *A61K 47/69* | (2017.01) |
| *A61P 1/18* | (2006.01) |
| *A61P 35/00* | (2006.01) |
| *C07K 7/06* | (2006.01) |
| *C07K 14/00* | (2006.01) |

(Continued)

(52) U.S. Cl.
CPC .......... *A61K 9/1275* (2013.01); *A61K 31/165* (2013.01); *A61K 31/337* (2013.01); *A61K 31/343* (2013.01); *A61K 31/353* (2013.01); *A61K 31/365* (2013.01); *A61K 31/381* (2013.01); *A61K 31/433* (2013.01); *A61K 31/436* (2013.01); *A61K 31/444* (2013.01); *A61K 31/475* (2013.01); *A61K 31/513* (2013.01); *A61K 31/517* (2013.01); *A61K 31/519* (2013.01); *A61K 31/52* (2013.01); *A61K 31/5377* (2013.01); *A61K 31/5545* (2017.08); *A61K 31/7068* (2013.01); *A61K 31/7072* (2013.01); *A61K 31/7076* (2013.01); *A61K 47/60* (2017.08); *A61K 47/6923* (2017.08); *A61P 1/18* (2018.01); *A61P 35/00* (2018.01); *C07K 7/06* (2013.01); *C07K 14/001* (2013.01); *C07K 16/2863* (2013.01); *C07K 19/00* (2013.01)

(58) Field of Classification Search
CPC .. A61K 9/1275; A61K 31/165; A61K 31/337; A61K 31/343; A61K 31/352; A61K 31/353; A61K 31/365; A61K 31/381; A61K 31/433
See application file for complete search history.

(56) References Cited

U.S. PATENT DOCUMENTS

| | | | |
|---|---|---|---|
| 5,304,121 A | 4/1994 | Sahatjian | |
| 5,595,756 A * | 1/1997 | Bally | A61K 9/1272 264/4.1 |

(Continued)

FOREIGN PATENT DOCUMENTS

| | | | |
|---|---|---|---|
| KR | 101689542 | * 12/2016 | ........... A61K 31/517 |
| WO | WO 2017/192863 | 11/2017 | |

OTHER PUBLICATIONS

KR101689542, English Machine translation, provided by PTO Foreign Patent Service Center, published 2016.*

(Continued)

*Primary Examiner* — Julie Ha
*Assistant Examiner* — Kristina M Hellman
(74) *Attorney, Agent, or Firm* — Fish & Richardson P.C.

(57) ABSTRACT

The present application provides liposomal compositions containing anti-cancer agents and tumor-targeting lipopeptides. The present application also provides nanodiamond complexes and particles as carriers for anti-cancer agents.

22 Claims, 28 Drawing Sheets

Specification includes a Sequence Listing.

(51) Int. Cl.
C07K 16/28 (2006.01)
C07K 19/00 (2006.01)

(56) References Cited

U.S. PATENT DOCUMENTS

| | | | |
|---|---|---|---|
| 5,886,026 | A | 3/1999 | Hunter et al. |
| 6,099,562 | A | 8/2000 | Ding et al. |
| 6,803,031 | B2 | 10/2004 | Rabinowitz et al. |
| 8,147,867 | B2 | 4/2012 | Hong et al. |
| 9,254,276 | B2 | 2/2016 | Li et al. |
| 9,616,022 | B1 | 4/2017 | Roy et al. |
| 9,775,803 | B2 | 10/2017 | Kim et al. |
| 2011/0214205 | A1* | 9/2011 | Dietrich ............. C12N 15/8274 800/278 |
| 2017/0258929 | A1 | 9/2017 | Cardelli et al. |
| 2017/0290882 | A1* | 10/2017 | Andronova ........ A61K 31/7068 |
| 2017/0319482 | A1* | 11/2017 | Niyikiza ................ A61P 31/18 |
| 2017/0360955 | A1* | 12/2017 | Janssen .............. A61K 47/6817 |
| 2018/0064662 | A1 | 3/2018 | Fukumura et al. |

OTHER PUBLICATIONS

UnitProt Accession No. P20129, accessed Mar. 2, 2025 at URL rest.uniprot.org/uniprotkb/P20129.fasta (Year: 2025).*
Breast Cancer, Merck Manual accessed Aug. 21, 20214 at URL merckmanuals.com/home/women-s-health-issues/breast-cancer, pp. 1-20 (Year: 2014).*
Hait, WN, "Anticancer drug development: the grand challenges," Nature Reviews, Apr. 2010, 9: 253-254 (Year: 2010).*
Auerbach et al., "Angiogenesis assays: Problems and pitfalls," Cancer and Metastasis Reviews, 2000, 19: 167-172 (Year: 2000).*
Gura, T, "Systems for Identifying New Drugs Are Often Faulty," Science, 1997, 278: 1041-1042 (Year: 1997).*
Jain, RK, "Barriers to Drug Delivery in Solid Tumors," Scientific American, Jul. 1994, 58-65. (Year: 1994).*
Neidle, Stephen, ed., Cancer Drug Design and Discovery, Elsevier/Academy Press, 2008, 427-431. (Year: 2008).*
Burguin et al., "Breast Cancer Treatments: Updates and New Challenges" J Personalized Medicine 11:808 pp. 1-54(2021) (Year: 2021).*
National Institute of Cancer- understanding and related topics, accessed Aug. 21, 2014 at URL: cancer.gov/cancertopics/understanding cancer, 63 pages (Year: 2014).*
Renal cell carcinoma, accessed Mar. 12, 2017 at URL merckmanuals.com/professional/genitourinary-disorders/genitourinary-cancer/renal-cell-carcinoma, 6 pages (Year: 2017).*
Thyroid cancer accessed Mar. 12, 2017 at URL www.merckmanuals.com/professional/endocrine-and-metabolic-disorders/thyroid-disorders/thyroid-cancers, 4 pages (Year: 2017).*
Merck Manuals Lung Carcinoma accessed Mar. 12, 2017 at URL merckmanuals.com/professional/pulmonary-disorders/tumors-of-the-lungs/lung-carcinoma, 18 pages (Year: 2017).*
Merck Manuals Brain Tumors accessed Aug. 21, 2014 at URL merckmanuals.com/home/brain_spinal_cord_and_nerve_disorders/ (Year : 2014).*
Merck Manuals Pancreatic Cancer accessed Aug. 21, 2014 at URL merckmanuals.com/professional/gastrointestinal-disorders/tumors-of-the-gastrointestinal-tract/pancreatic-cancer (Year: 2014).*
Merck Manuals melanoma accessed Jan. 13, 2021 at URL merckmanuals.com/professional/dermatologic-disorders/cancers-of-the-skin/melanoma (Year: 2021).*
Sporn, CHemopreventon of Cancer, Carcinogenesis 21:525-530 (2000) (Year: 2000).*
Cai et al., "Peptide ligand and PEG-mediated long-circulating liposome targeted to FGFR overexpressing tumor in vivo," Int. J. Nanomedicine, Aug. 2012, 4499-4510.
Extended Search Report in European Appln. No. 20827620.4, dated May 8, 2023, 14 pages.
Iwase et al., "Preparation and in Vivo Evaluation of Liposomal Everolimus for Lung Carcinoma and Thyroid Carcinoma," Biol. Pharm. Bulletin, Jan. 2012, 35(6):975-979.
Lakkadwala et al., "Co-delivery of doxorubicin and erlotinib through liposomal nanoparticles for glioblastoma tumor regression using an in vitro brain tumor model," Colloids Surf. B Biointerfaces, Jan. 2019, 173:27-35.
Liu et al., "Mixed Liposome Approach for Ratiometric and Sequential Delivery of Paclitaxel and Gemcitabine," AAPS PharmSciTech, Oct. 2017, 19(2):693-699.
Napolitano et al., "Neuropilins Controlling Cancer Therapy Responsiveness," Int. J. Mol. Sciences, Apr. 25, 2019, 20(8):2049, 14 pages.
Vahed et al., "Liposome-based drug co-delivery systems in cancer cells," Mater. Sci. Eng. C Mater. Biol. Applications, Nov. 23, 2016, 71:1327-1341.
Van Swearingen et al., "LCCC 1025: a phase II study of everolimus, trastuzumab, and vinorelbine to treat progressive HER2-positive breast cancer brain metastases," Breast Cancer Res. Treatment, Jun. 25, 2018, 171(3):637-648.
Zhen et al., "A phase I trial of cabozantinib and gemcitabine in advanced pancreatic cancer," Invest. New Drugs, Jul. 21, 2016, 34(6):733-739.
Zhigaltsev et al., "Liposome-encapsulated vincristine, vinblastine and vinorelbine: A comparative study of drug loading and retention," J. Control. Release, May 2005, 104(1):103-111.
Adiseshaiah et al., "Nanomedicine strategies to overcome the pathophysiological barriers of pancreatic cancer," Nat. Rev. Clin. Oncology, Dec. 2016, 13(12):750-765.
Akbarzadeh et al., "Liposome: classification, preparation, and applications," Nanoscale Res. Letters, Feb. 22, 2013, 8(1):102, 9 pages.
Balek et al., "Nanodiamonds as "artificial proteins": Regulation of a cell signalling system using low nanomolar solutions of inorganic nanocrystals," Biomaterials, Sep. 2018, 176:106-121.
Bhattacharya et al., "Biological interactions of carbon-based nanomaterials: From coronation to degradation," Nanomedicine, Feb. 2016, 12(2):333-351.
Bhattacharya et al., "Cytotoxicity screening and cytokine profiling of nineteen nanomaterials enables hazard ranking and grouping based on inflammogenic potential," Nanotoxicology, Aug. 2017, 11(6):809-826.
Cassetta et al., "Targeting macrophages: therapeutic approaches in cancer," Nat. Rev. Drug Discovery, Dec. 2018, 17(12):887-904.
Caulfield et al., "Motion of transfer RNA from the A/T state into the A-site using docking and simulations," Proteins, Nov. 2012, 80(11):2489-2500.
Caulfield et al., "Phosphorylation by PINK1 releases the UBL domain and initializes the conformational opening of the E3 ubiquitin ligase Parkin," PLoS Comput. Biology, Nov. 6, 2014, 10(11):e1003935, 19 pages.
Chen et al., "Nanodiamond-Mediated Delivery of Water-Insoluble Therapeutics," ACS Nano, Jul. 28, 2009, 3(7):2016-2022.
Chow et al., "Nanodiamond Therapeutic Delivery Agents Mediate Enhanced Chemoresistant Tumor Treatment," Sci. Transl. Medicine, Mar. 9, 2011, 3(73):73ra21, 10 pages.
Cui et al., "Nanodiamond autophagy inhibitor allosterically improves the arsenical-based therapy of solid tumors," Nat. Communications, Oct. 19, 2018, 9(1):4347, 11 pages.
Daley et al., "NLRP3 signaling drives macrophage-induced adaptive immune suppression in pancreatic carcinoma," J. Exp. Medicine, Jun. 5, 2017, 214(6):1711-1724.
Erkan et al., "The role of stroma in pancreatic cancer: diagnostic and therapeutic implications," Nat. Rev. Gastroenterol. Hepatology, Aug. 2012, 9(8):454-467.
Fadus et al., "Curcumin: An age-old anti-inflammatory and anti-neoplastic agent," J. Tradit. Complement. Medicine, Jul. 2017, 7(3):339-346.
Guerra et al., "Genetically engineered mouse models of pancreatic adenocarcinoma," Mol. Oncology, Apr. 2013, 7(2):232-247.
Ho et al., "Nanodiamonds: The intersection of nanotechnology, drug development, and personalized medicine," Sci. Advances, Aug. 21, 2015, 1(7):e1500439,.

(56) References Cited

OTHER PUBLICATIONS

Hu et al., "Interleukin-9 Promotes Pancreatic Cancer Cells Proliferation and Migration via the miR-200a/Beta-Catenin Axis," BioMed Res. International, 2017, 2017:2831056, 9 pages.

Humphrey et al., "VMD: Visual molecular dynamics," J. Mol. Graphics, Feb. 1996, 14(1):33-38.

Ilium, "Is nose-to-brain transport of drugs in man a reality?," J. Pharm. Pharmacology, Jan. 2004, 56(1):3-17.

Ilium, "Transport of drugs from the nasal cavity to the central nervous system," Eur. J. Pharm. Sciences, Jul. 2000, 11(1):1-18.

Kamisawa et al., "Pancreatic cancer," Lancet, Jul. 2, 2016, 388(10039):73-85.

Lee et al., "Genetically Engineered Mouse Models of Pancreatic Cancer: The KPC Model (LSL-Kras(G12D/+);LSL-Trp53(R172H/+) ;Pdx-1-Cre), Its Variants, and Their Application in Immuno-oncology Drug Discovery," Curr. Protoc. Pharmacology, Jun. 1, 2016, 73:14.39.1-14.39.20.

Liu et al., "M2-polarized tumor-associated macrophages promoted epithelial-mesenchymal transition in pancreatic cancer cells, partially through TLR4/IL-10 signaling pathway," Lab. Investigation, Jul. 2013, 93(7):844-854.

Lu et al., "PEG Grafted-Nanodiamonds for the Delivery of Gemcitabine," Macromol. Rapid Communications, Dec. 2016, 37(24):2023-2029.

Madamsetty et al., "Tumor selective uptake of drug-nanodiamond complexes improves therapeutic outcome in pancreatic cancer," Nanomed. Nanotech. Bio. Medicine, Jun. 2019, 18:112-121.

Man et al., "Synthesis of nanodiamond-daunorubicin conjugates to overcome multidrug chemoresistance in leukemia," Nanomedicine, Feb. 2014, 10(2):359-369.

Miao et al., "The Current State of Nanoparticle-Induced Macrophage Polarization and Reprogramming Research," Int. J. Mol. Sciences, Feb. 6, 2017, 18(2):336, 13 pages.

Mochalin et al., "The properties and applications of nanodiamonds," Nat. Nanotechnology, Dec. 18, 2011, 7(1):11-23.

Moore et al., "Biocompatibility Assessment of Detonation Nanodiamond in Non-Human Primates and Rats Using Histological, Hematologic, and Urine Analysis," ACS Nano, Jul. 20, 2016, 10(8):7385-7400.

Mosser et al., "Exploring the full spectrum of macrophage activation," Nat. Rev. Immunology, Dec. 2008, 8(12):958-969.

Neesse et al., "Stromal biology and therapy in pancreatic cancer: a changing paradigm," Gut, Sep. 2015, 64(9):1476-1484.

Neoptolemos et al., "Therapeutic developments in pancreatic cancer: current and future perspectives," Nat. Rev. Gastroenterol. Hepatology, Jun. 2018, 15(6):333-348.

Noelle et al., "Cellular sources and immune functions of interleukin-9," Nat. Rev. Immunology, Oct. 2010, 10(10):683-687.

Nyström et al., "Safety assessment of nanomaterials: Implications for nanomedicine," J. Control. Release, Jul. 20, 2012, 161(2):403-408.

Olive et al., "Mutant p53 gain of function in two mouse models of Li-Fraumeni syndrome," Cell, Dec. 17, 2004, 119(6):847-860.

PCT International Preliminary Report on Patentability in International Appln. No. PCT/US2020/037860, dated Dec. 21, 2021, 6 pages.

PCT International Search Report and Written Opinion in International Appln. No. PCT/US2020/037860, dated Sep. 25, 2020, 8 pages.

Rajan et al., "Liposome-induced immunosuppression and tumor growth is mediated by macrophages and mitigated by liposome-encapsulated alendronate," J. Control. Release, Feb. 10, 2018, 271:139-148.

Reichel et al., "Biological Effects of Nanoparticles on Macrophage Polarization in the Tumor Microenvironment," Nanotheranostics, Jan. 2019, 3(1):66-88.

Rosenblum et al., "Progress and challenges towards targeted delivery of cancer therapeutics," Nat. Communications, Apr. 12, 2018, 9(1):1410, 12 pages.

Ryan et al., "Pancreatic Adenocarcinoma," N. Engl. J. Medicine, Sep. 11, 2014, 371(11):1039-1049.

Shen et al., "Local Blockade of Interleukin 10 and C-X-C Motif Chemokine Ligand 12 with Nano-Delivery Promotes Antitumor Response in Murine Cancers," ACS Nano, Oct. 23, 2018, 12(10):9830-9841.

Wang et al., "Epirubicin—Adsorbed Nanodiamonds Kill Chemoresistant Hepatic Cancer Stem Cells," ACS Nano, Dec. 23, 2014, 8(12):12151-12166.

Wang et al., "PEGylated nanodiamond for chemotherapeutic drug delivery," Diam. Relat. Materials, Jun. 2013, 36:26-34.

Xiao et al., "Nanodiamonds-mediated doxorubicin nuclear delivery to inhibit lung metastasis of breast cancer," Biomaterials, Dec. 2013, 34(37):9648-9656.

Zanganeh et al., "Iron oxide nanoparticles inhibit tumour growth by inducing pro-inflammatory macrophage polarization in tumour tissues," Nat. Nanotechnology, Nov. 2016, 11(11):986-994.

Zhao et al., "Stromal Modulation Reverses Primary Resistance to Immune Checkpoint Blockade in Pancreatic Cancer," ACS Nano, Oct. 23, 2018, 12(10):9881-9893.

Pal et al., "Co-delivery of everolimus and vinorelbine via a tumor-targeted liposomal formulation inhibits tumor growth and metastasis in RCC," Int. J. Nanomedicine, Jul. 2019, 14:5109-5123.

\* cited by examiner

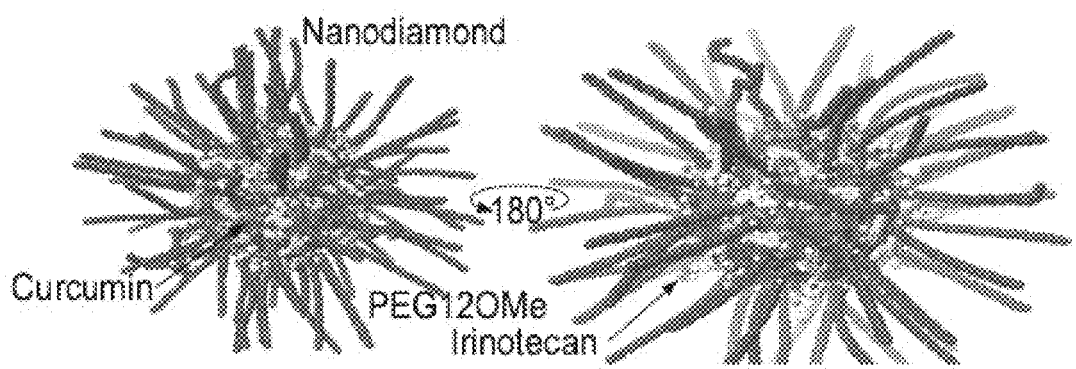
FIG. 16A  FIG. 16B
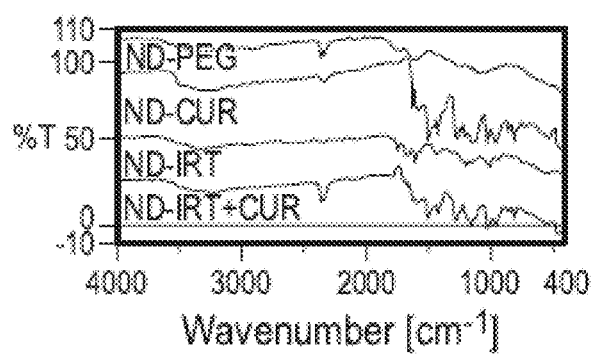 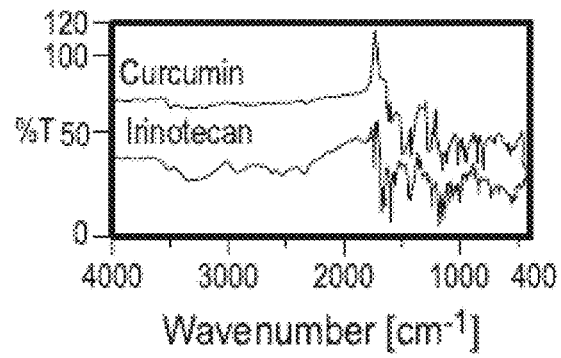
FIG. 16C  FIG. 16D
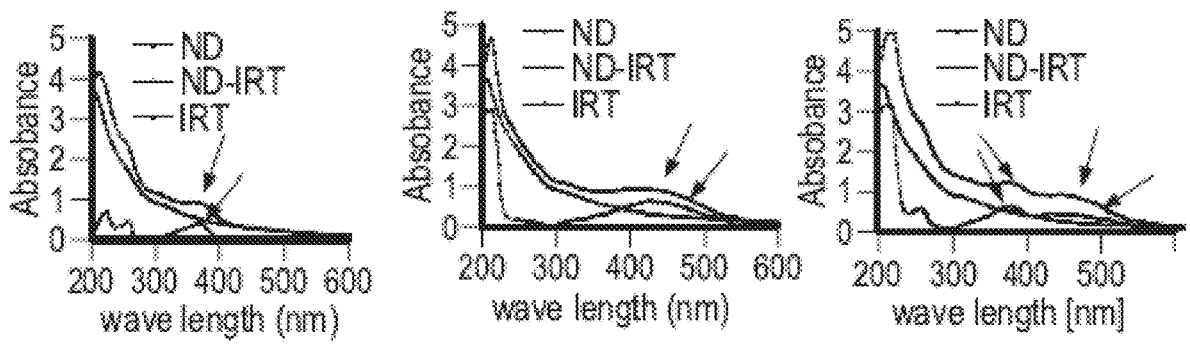
FIG. 16E  FIG. 16F  FIG. 16G

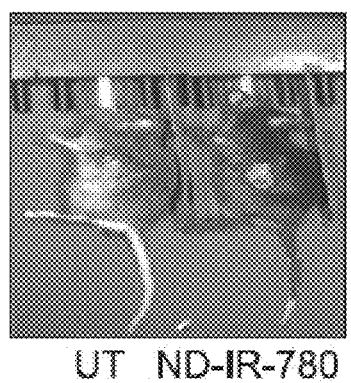
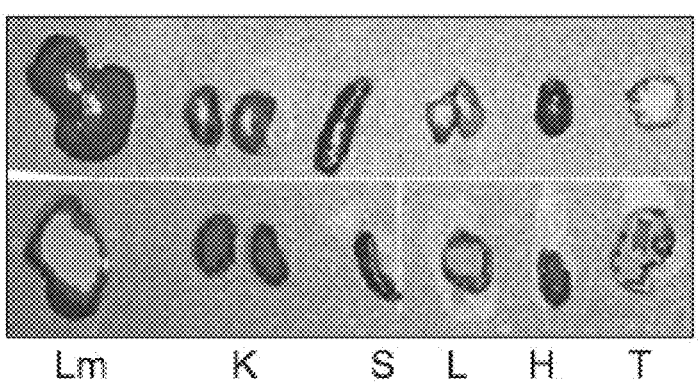
FIG. 18A    FIG. 18B
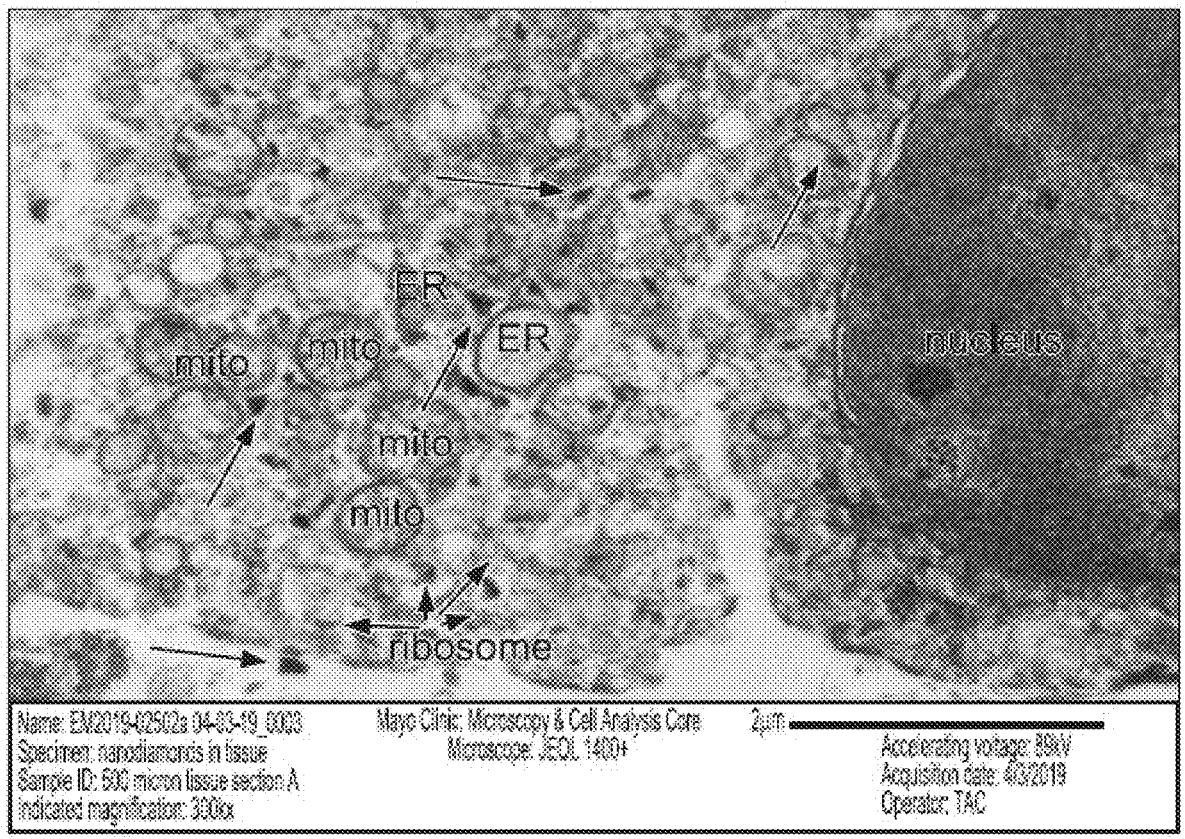
FIG. 18C

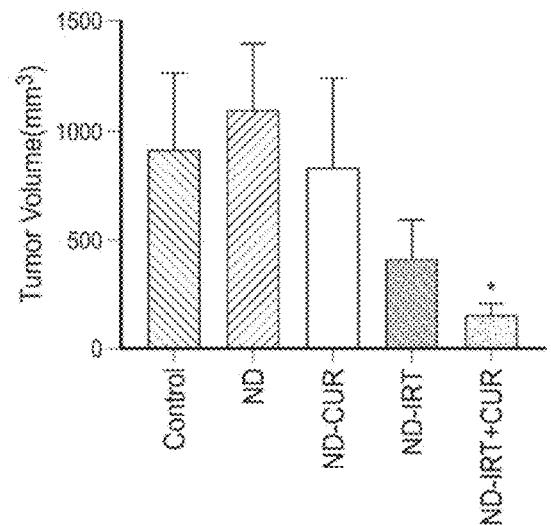
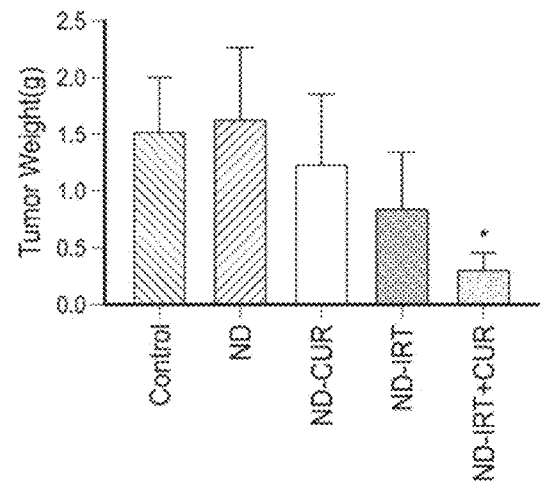
FIG. 19A                FIG. 19B
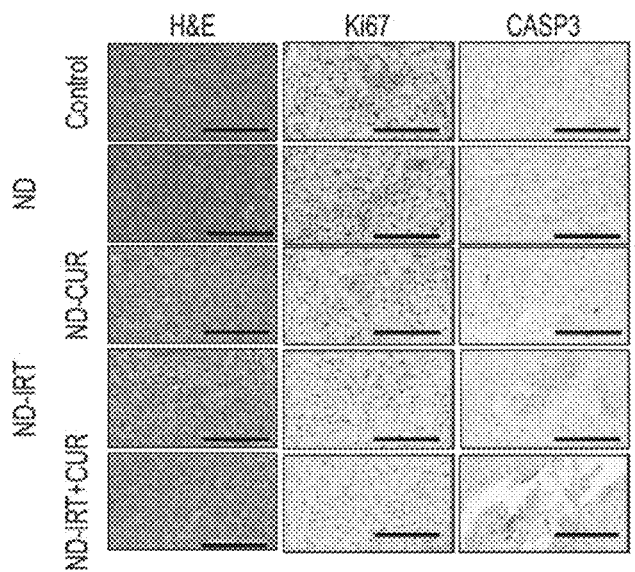
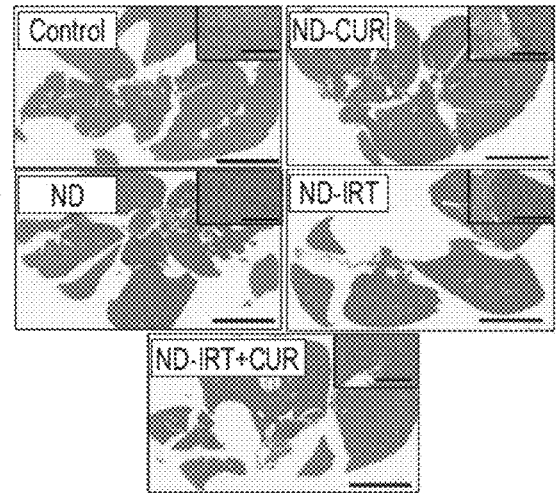
FIG. 19C                FIG. 19D

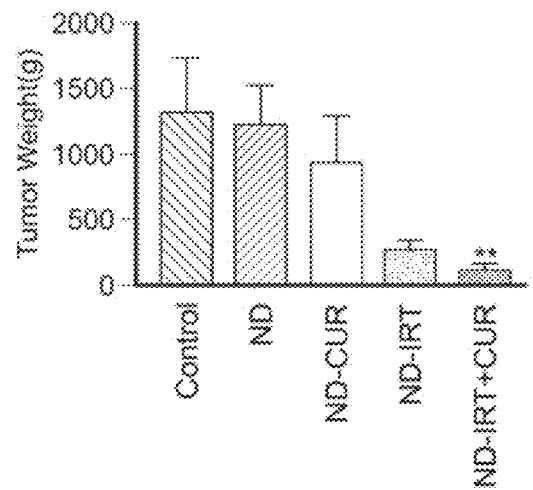
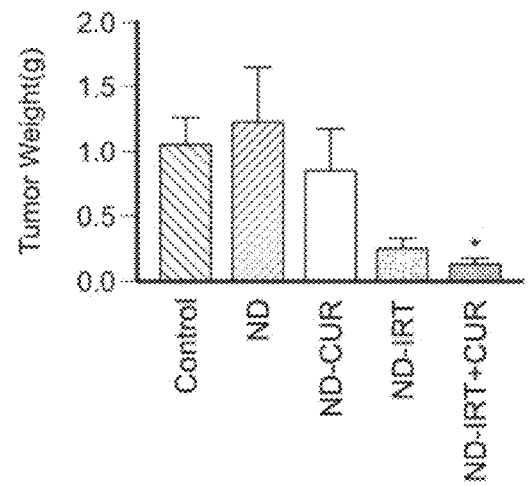
FIG. 22A
FIG. 22B
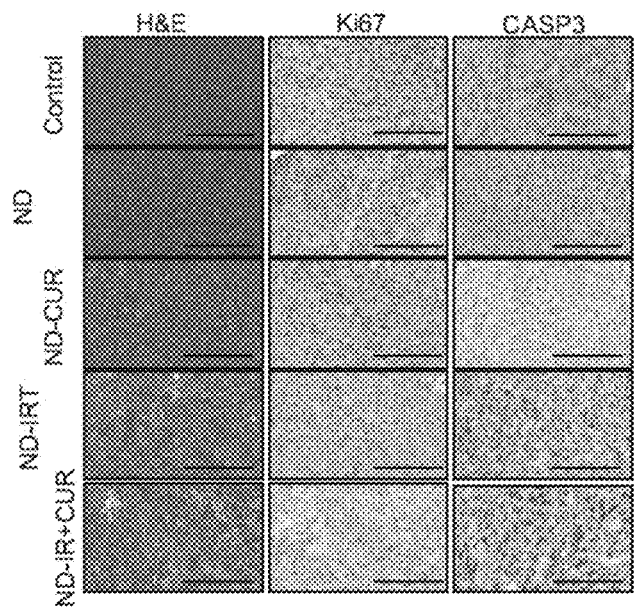
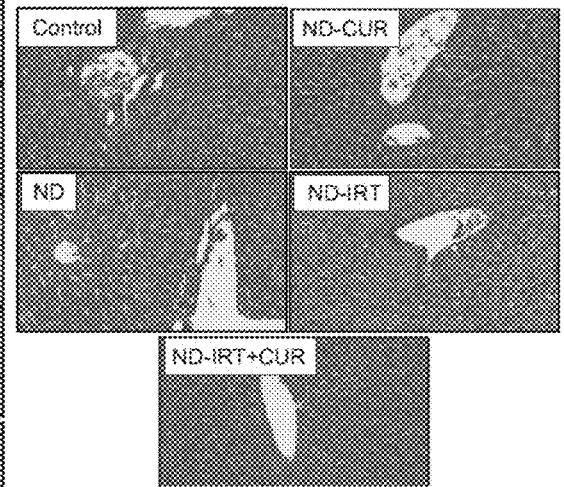
FIG. 22C
FIG. 22D

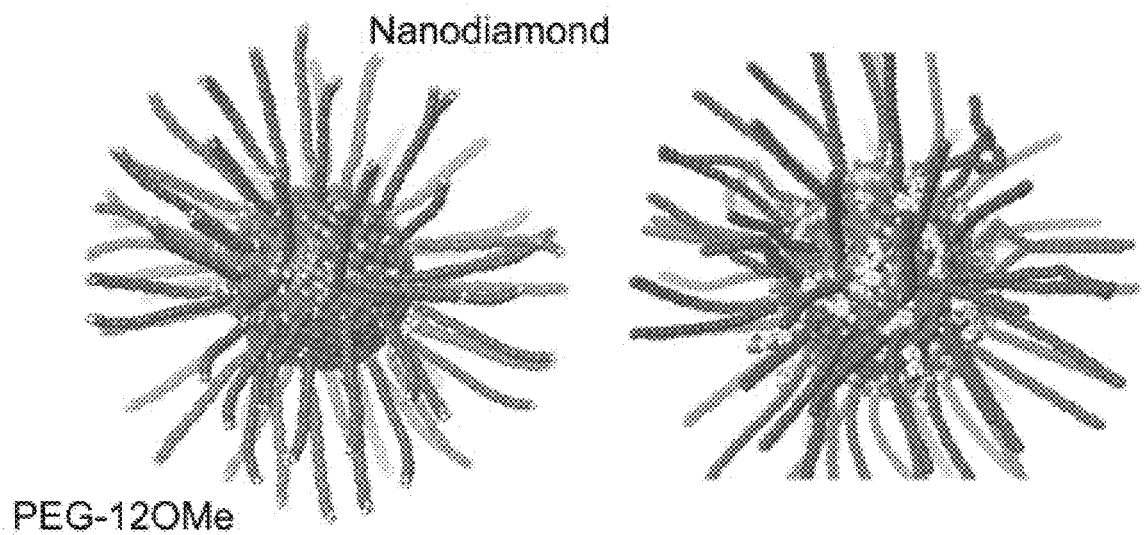
FIG. 24A        FIG. 24B
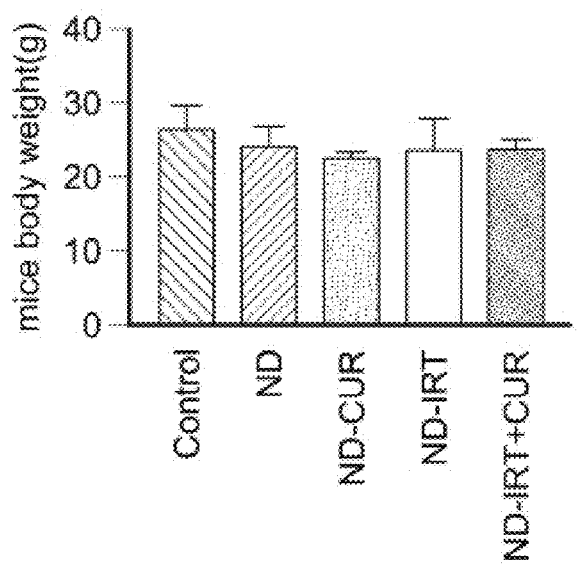      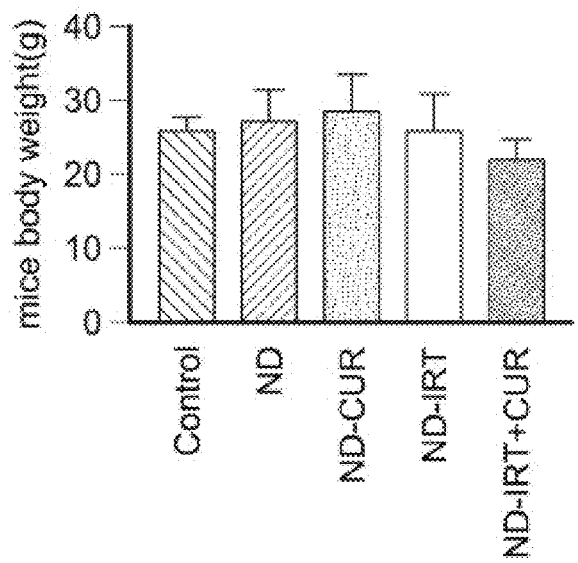
FIG. 25A        FIG. 25B

DRUG DELIVERY METHODS AND COMPOSITIONS

CROSS-REFERENCE TO RELATED APPLICATIONS

This application is a National Stage application under 35 U.S.C. § 371 of International Application No. PCT/US2020/037860, having an International Filing Date of Jun. 16, 2020, which claims the benefit of U.S. Provisional Application Ser. No. 62/862,525, filed Jun. 17, 2019. The disclosure of the prior application is considered part of (and is incorporated by reference in) the disclosure of this application.

FEDERALLY SPONSORED RESEARCH OR DEVELOPMENT

This invention was made with government support under CA078383 and CA150190 awarded by the National Institutes of Health. The government has certain rights in the invention.

TECHNICAL FIELD

This invention relates to tumor-targeting peptides, lipids modified with tumor-targeting peptides, and liposomes containing the lipids modified with the tumor-targeting peptides. In particular, the invention relates to tumor-targeting liposomes containing at least one anti-cancer agent, such as liposomes containing two anti-cancer agents. Suitable examples of these liposomes include a liposome containing everolimus and vinorelbine, a liposome containing everolimus and EG00229, a liposome containing gemcitabine and erlotinib, a liposome containing gemcitabine and paclitaxel, a liposome containing gemcitabine and XL-184, and a liposome containing paclitaxel and XL-184. This invention also relates to nanodiamonds suitable as carriers for therapeutic agents.

BACKGROUND

Cancer is one of the leading causes of death in contemporary society. The numbers of new cancer cases and deaths is increasing each year. Currently, cancer incidence is 454.8 cases of cancer per 100,000 men and women per year, while cancer mortality is 71.2 cancer deaths per 100,000 men and women per year. Currently, there is no cure for cancer, and new treatments are needed to combat this debilitating disease. The compounds and methods of the present disclosure help meet this need.

SUMMARY

Tumor-targeting liposomal drug delivery platforms specifically deliver the anti-cancer drugs to the tumor, thereby substantially reducing existing primary tumor and metastasis colonies. The presence of the tumor-targeting peptide in the liposome leads to tumor-specific accumulation of the drugs, as compared to healthy tissues. In addition, liposomal delivery results in increased cellular uptake of the anti-cancer drugs by the tumor cells, as compared to non-liposomal delivery platforms for the same anti-cancer agents.

In some embodiments, the present disclosure provides a polypeptide, or a pharmaceutically acceptable salt thereof, comprising an amino acid sequence:

KCLSPPRYPC (SEQ ID NO: 1).

In some embodiments, the polypeptide comprises an —S—S— bridge between cysteine (C) residues in the amino acid sequence SEQ ID NO: 1.

In some embodiments, the present disclosure provides a lipopeptide of formula (I):

$$A\text{-}L\text{-}B \qquad (I),$$

or pharmaceutically acceptable salt thereof, wherein:
A is a lipid;
L is a linker or a bond; and
B is a polypeptide of claim 1 or 2.

In some embodiments, the lipid is selected from a fatty acid, a fatty amine, a fatty amide, a saccharolipid, a prenol lipid, a sterol lipid, a sphingolipid, a glycerolipid, and a phospholipid.

In some embodiments, the linker comprises $C_{2\text{-}100}$ alkylene, which is optionally interrupted by 1-10 groups independently selected from O, NH, N($C_{1\text{-}6}$ alkyl), C(=O), a PEG moiety comprising —(OCH$_2$CH$_2$)$_n$— or —(CH$_2$CH$_2$O)$_n$—, and a PPG moiety comprising —(OCH(CH$_3$)CH$_2$)$_n$— or —(CH$_2$CH(CH$_3$)O)$_n$—, wherein n is an integer from 1 to 2,000.

In some embodiments, the linker comprises a group of formula:

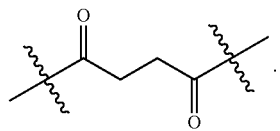 [SMILES: *C(=O)CCC(*)=O]

In some embodiments, L is bound to the N-terminus of the polypeptide.

In some embodiments, L is bound to the α-amino group of N-terminal amino acid (K) of the amino acid sequence SEQ ID NO: 1.

In some embodiments:
A is a fatty amine of formula:

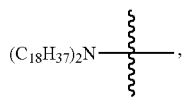

L is a linker of formula:

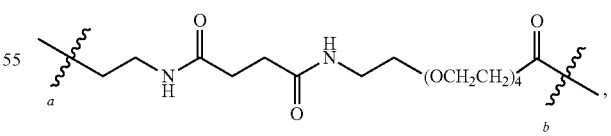

wherein a denotes a point of attachment to A, and b denotes a point of attachment to the α-amino group of the N-terminal amino acid (K) of the amino acid sequence SEQ ID NO: 1 of the polypeptide B.

In some embodiments, the present disclosure provides a liposome comprising a lipopeptide as described herein.

In some embodiments, the liposome further comprises a lipid bilayer stabilizing agent.

In some embodiments, the lipid bilayer stabilizing agent is cholesterol.

In some embodiments, the liposome further comprises one or more phospholipids.

In some embodiments, each phospholipid is independently selected from 1,2-dioleoyl-sn-glycero-3-phosphocholine (DOPC), 1,2-dioleoyl-sn-glycero-3-phosphoethanolamine (DOPE), 1,2-dipalmitoyl-sn-glycero-3-phosphocholine (DPPC), and 1,2-distearoyl-sn-glycero-3-phosphoethanolamine (DSPE).

In some embodiments, at least one phospholipid is derivatized with a hydrophilic polymer.

In some embodiments, the hydrophilic polymer is polyethylene glycol.

In some embodiments, the at least one phospholipid is DSPE-PEG$_{2000}$-OMe.

In some embodiments, the present disclosure provides a liposome comprising:
  a lipopeptide as described herein;
  a lipid bilayer stabilizing agent; and
  at least one phospholipid.

In some embodiments:
  the lipid bilayer stabilizing agent is cholesterol; and
  each phospholipid is independently selected from 1,2-dioleoyl-sn-glycero-3-phosphocholine (DOPC), 1,2-dioleoyl-sn-glycero-3-phosphoethanolamine (DOPE), and 1,2-dipalmitoyl-sn-glycero-3-phosphocholine (DPPC).

In some embodiments, the molar ratio between the lipopeptide, the lipid bilayer stabilizing agent, and the combined amount of the phospholipids in the liposome is about 0.1 to about 0.25 to about 1, respectively.

In some embodiments, the present disclosure provides a liposome comprising: a lipopeptide as described herein;
  at least one phospholipid; and
  a derivatized phospholipid comprising a hydrophilic polymer.

In some embodiments:
  each phospholipid is independently selected from 1,2-dioleoyl-sn-glycero-3-phosphocholine (DOPC), 1,2-dioleoyl-sn-glycero-3-phosphoethanolamine (DOPE), and 1,2-dipalmitoyl-sn-glycero-3-phosphocholine (DPPC); and
  the derivatized phospholipid is 1,2-distearoyl-sn-glycero-3-phosphoethanolamine (DSPE) comprising polyethylene glycol.

In some embodiments, the molar ratio between the lipopeptide, the derivatized phospholipid, and the combined amount of the phospholipids in the liposome is about 0.1 to about 0.01 to about 1.25, respectively.

In some embodiments, the present disclosure provides a liposome comprising:
  a lipopeptide as described herein;
  a lipid bilayer stabilizing agent;
  at least one phospholipid; and
  a derivatized phospholipid comprising a hydrophilic polymer.

In some embodiments:
  the lipid bilayer stabilizing agent is cholesterol;
  each phospholipid is independently selected from 1,2-dioleoyl-sn-glycero-3-phosphocholine (DOPC), 1,2-dioleoyl-sn-glycero-3-phosphoethanolamine (DOPE), and 1,2-dipalmitoyl-sn-glycero-3-phosphocholine (DPPC); and
  the derivatized phospholipid is 1,2-distearoyl-sn-glycero-3-phosphoethanolamine (DSPE) comprising polyethylene glycol.

In some embodiments, the molar ratio between the lipopeptide, the lipid bilayer stabilizing agent, the combined amount of the phospholipids, and the derivatized phospholipid in the liposome is selected from:
  about 0.1 to about 0.25 to about 1 to about 0.01, respectively;
  about 0.05 to about 0.5 to about 1 to about 0.01, respectively;
  about 0.1 to about 0.1 to about 1 to about 0.01, respectively; and
  about 0.1 to about 0.1 to about 1.25 to about 0.01, respectively.

In some embodiments, the liposome comprises at least one anti-cancer agent, or a pharmaceutically acceptable salt thereof.

In some embodiments, each anti-cancer agent is independently selected from an mTOR inhibitor, an NRP1 inhibitor, a mitosis inhibitor, an antimetabolite, an EGFR inhibitor, and an VEGFR2 inhibitor or a pharmaceutically acceptable salt thereof.

In some embodiments, the mTOR inhibitor is selected from everolimus, rapamycin, and temsirolimus, or a pharmaceutically acceptable salt thereof.

In some embodiments, the NRP1 inhibitor is selected from EG00229, EG01377, and MNRP1685A, or a pharmaceutically acceptable salt thereof.

In some embodiments, the mitosis inhibitor is selected from vinorelbine, paclitaxel, docetaxel, vinblastine, vincristine, vindesine, colchicine, podophyllotoxin, griseofulvin, and glaziovianin A, or pharmaceutically acceptable salt thereof.

In some embodiments, the EGFR inhibitor is selected from erlotinib, gefitinib, genistein, apatinib and afatinib, or a pharmaceutically acceptable salt thereof.

In some embodiments, the antimetabolite is selected from gemcitabine, 5-fluorouracil, 6-mercaptopurine, capecitabine, cytarabine, floxuridine, fludarabine, methotrexate, and pemetrexed, or a pharmaceutically acceptable salt thereof.

In some embodiments, the VEGFR2 inhibitor is selected from XL-184, sorafenib, sunitinib, and foretinib, or a pharmaceutically acceptable salt thereof.

In some embodiments, the liposome comprises a combination of two anti-cancer agents, or a pharmaceutically acceptable salt thereof.

In some embodiments, the liposome comprises an mTOR inhibitor, or a pharmaceutically acceptable salt thereof, and an NRP1 inhibitor, or a pharmaceutically acceptable salt thereof.

In some embodiments:
  the mTOR inhibitor is selected from everolimus, rapamycin, and temsirolimus, or a pharmaceutically acceptable salt thereof; and
  the NRP1 inhibitor is selected from EG00229, EG01377, and MNRP1685A, or a pharmaceutically acceptable salt thereof.

In some embodiments, the liposome comprises everolimus, or a pharmaceutically acceptable salt thereof, and EG00229, or a pharmaceutically acceptable salt thereof.

In some embodiments, the liposome comprises an mTOR inhibitor, or a pharmaceutically acceptable salt thereof, and a mitosis inhibitor, or a pharmaceutically acceptable salt thereof.

In some embodiments:
  the mTOR inhibitor is selected from everolimus, rapamycin, and temsirolimus, or a pharmaceutically acceptable salt thereof; and the mitosis inhibitor is selected from vinorelbine, paclitaxel, docetaxel, vinblastine, vincristine, vindesine, colchicine, podophyllotoxin, griseofulvin, and glazivianin A, or pharmaceutically acceptable salt thereof.

In some embodiments, the liposome comprises everolimus, or a pharmaceutically acceptable salt thereof, and vinorelbine, or a pharmaceutically acceptable salt thereof.

In some embodiments, the liposome comprises an antimetabolite, or a pharmaceutically acceptable salt thereof, and a mitosis inhibitor, or a pharmaceutically acceptable salt thereof.

In some embodiments:
the antimetabolite is selected from gemcitabine, 5-fluorouracil, 6-mercaptopurine, capecitabine, cytarabine, floxuridine, fludarabine, methotrexate, and pemetrexed, or a pharmaceutically acceptable salt thereof; and
the mitosis inhibitor is selected from vinorelbine, paclitaxel, docetaxel, vinblastine, vincristine, vindesine, colchicine, podophyllotoxin, griseofulvin, and glazivianin A, or pharmaceutically acceptable salt thereof.

In some embodiments, the liposome comprises gemcitabine, or a pharmaceutically acceptable salt thereof, and paclitaxel, or a pharmaceutically acceptable salt thereof.

In some embodiments, the liposome comprises an antimetabolite, or a pharmaceutically acceptable salt thereof, and an EGFR inhibitor, or a pharmaceutically acceptable salt thereof.

In some embodiments:
the antimetabolite is selected from gemcitabine, 5-fluorouracil, 6-mercaptopurine, capecitabine, cytarabine, floxuridine, fludarabine, methotrexate, and pemetrexed, or a pharmaceutically acceptable salt thereof; and
the EGFR inhibitor is selected from erlotinib, gefitinib, genistein, apatinib and afatinib, or a pharmaceutically acceptable salt thereof.

In some embodiments, the liposome comprises gemcitabine, or a pharmaceutically acceptable salt thereof, and erlotinib, or a pharmaceutically acceptable salt thereof.

In some embodiments, the liposome comprises an antimetabolite, or a pharmaceutically acceptable salt thereof, and a VEGFR2 inhibitor, or a pharmaceutically acceptable salt thereof.

In some embodiments:
the antimetabolite is selected from gemcitabine, 5-fluorouracil, 6-mercaptopurine, capecitabine, cytarabine, floxuridine, fludarabine, methotrexate, and pemetrexed, or a pharmaceutically acceptable salt thereof; and
the VEGFR2 inhibitor is selected from XL-184, sorafenib, sunitinib, and foretinib, or a pharmaceutically acceptable salt thereof.

In some embodiments, the liposome comprises gemcitabine, or a pharmaceutically acceptable salt thereof, and XL-184, or a pharmaceutically acceptable salt thereof.

In some embodiments, the liposome comprises a mitosis inhibitor, or a pharmaceutically acceptable salt thereof, and a VEGFR2 inhibitor, or a pharmaceutically acceptable salt thereof.

In some embodiments:
the mitosis inhibitor is selected from vinorelbine, paclitaxel, docetaxel, vinblastine, vincristine, vindesine, colchicine, podophyllotoxin, griseofulvin, and glazivianin A, or pharmaceutically acceptable salt thereof; and
the VEGFR2 inhibitor is selected from XL-184, sorafenib, sunitinib, and foretinib, or a pharmaceutically acceptable salt thereof.

In some embodiments, the liposome comprises paclitaxel, or a pharmaceutically acceptable salt thereof, and XL-184, or a pharmaceutically acceptable salt thereof.

In some embodiments, the present disclosure provides a liposome comprising a combination of two anti-cancer agents, or pharmaceutically acceptable salts thereof, wherein the combination is selected from:
everolimus, or a pharmaceutically acceptable salt thereof, and vinorelbine, or a pharmaceutically acceptable salt thereof,
everolimus, or a pharmaceutically acceptable salt thereof, and EG00229, or a pharmaceutically acceptable salt thereof,
gemcitabine, or a pharmaceutically acceptable salt thereof, and erlotinib, or a pharmaceutically acceptable salt thereof,
gemcitabine, or a pharmaceutically acceptable salt thereof, and paclitaxel, or a pharmaceutically acceptable salt thereof,
gemcitabine, or a pharmaceutically acceptable salt thereof, and XL-184, or a pharmaceutically acceptable salt thereof, and
paclitaxel, or a pharmaceutically acceptable salt thereof, and XL-184, or a pharmaceutically acceptable salt thereof.

In some embodiments, the present disclosure provides a pharmaceutical composition comprising a liposome as described herein, and a pharmaceutically acceptable carrier.

In some embodiments, the present disclosure provides a method of treating a cancer in a subject in need thereof, the method comprising administering to the subject a liposome as described herein, or a pharmaceutical composition comprising same.

In some embodiments, the cancer is selected from kidney cancer, pancreatic cancer, breast cancer, brain cancer, melanoma, and hematological cancer.

In some embodiments, cancer is brain cancer.

In some embodiments, the brain cancer is glioblastoma.

In some embodiments, the cancer is kidney cancer.

In some embodiments, the kidney cancer is renal cell carcinoma.

In some embodiments, the cancer is pancreatic cancer.

In some embodiments, the present disclosure provides a complex comprising
a nanodiamond conjugated with a hydrophilic polymer; and
an at least one anticancer therapeutic agent non-covalently bound to the surface of the nanodiamond.

In some embodiments, the hydrophilic polymer is polyethyleneglycol.

In some embodiments, the anticancer therapeutic agent is irinotecan, or a pharmaceutically acceptable salt thereof.

In some embodiments, the anticancer therapeutic agent is curcumin, or a pharmaceutically acceptable salt thereof.

In some embodiments, the complex comprises at least two anticancer therapeutic agents.

In some embodiments, the complex comprises irinotecan, or a pharmaceutically acceptable salt thereof, and curcumin, or a pharmaceutically acceptable salt thereof.

In some embodiments, the present disclosure provides a pharmaceutical composition comprising the complex comprising the nanodiamond as described herein, and a pharmaceutically acceptable carrier.

In some embodiments, the present disclosure provides a method of treating cancer, the method comprising administering to a subject in need thereof a therapeutically effective amount of a complex comprising a nanodiamond as described herein, or a pharmaceutical composition comprising same.

In some embodiments, the cancer is pancreatic cancer.

Unless otherwise defined, all technical and scientific terms used herein have the same meaning as commonly understood by one of ordinary skill in the art to which the present application belongs. Methods and materials are described herein for use in the present application; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the present application will be apparent from the following detailed description and figures, and from the claims.

DESCRIPTION OF DRAWINGS

FIG. 16 Drug binding to NDs. The ND complex with PEG-12-OMe arms with an inner diameter of 5.4 nm was generated for the capture of drugs (IRT and CUR) to study drug loading. (A) The entire ND is shown, where 9570 atoms comprise central core in the gray surface. VdW spheres for the PEG arms are shown. VdW spheres are shown for the drugs (IRT in white and CUR in yellow). (B) Labeled zoom with the rotation of the complex by 180° is shown. FTIR analysis was deployed to confirm (C) binding of drugs (irinotecan-IRT, and curcumin-CUR) on ND surfaces, and (D) drugs (IRT, CUR) alone without NDs. UV absorbance analysis was also used to confirm (E) IRT (F) CUR, and (G) IRT+CUR binding to NDs. The arrows denote representative peaks in each spectrum. (E-G). Computational modeling of PEGylated ND complexes used to study drug-loading phenomena.

FIG. 18. Tumor localization of NDs. (A) In vivo imaging of mice 24 h after i.p administration. (B) Tumors and major organs (T-tumor, S-spleen, K-kidney, L-lungs, Lm-liver with metastases, H-heart) were harvested 24 h after i.p. administration of NIR dye-loaded NDs and imaged ex vivo by IVIS imaging. Organs and tumor from an untreated mouse were included for fluorescence background correction. (C) TEM images are showing the presence of NDs in the tumor sections indicated with arrows. Scale bar=2 μm FIG. 19. In vivo antitumor activity of drug-loaded NDs in KPC mice. Tumors were initiated by orthotopically implanting Ca5Cre adenovirus in KPC mice. (A) and (B) depict tumor volume, and tumor weight, respectively, after 2×/wk treatment for four weeks with vehicle control, ND, ND-IRT (5 mg kg$^{-1}$ IRT equivalent), CUR (15 mg kg$^{-1}$ CUR equivalent) and ND-IRT+CUR (5 mg kg$^{-1}$ IRT equivalent+15 mg kg$^{-1}$ CUR equivalent). Statistical significance is shown with respect to ND-IRT treated group (p*<0.05). (C) H&E, Ki67, and cleaved caspase-3 staining of tumor sections of the indicated groups. (D) H&E staining of liver sections of the indicated groups. Scale bars 200 μm tumor sections & inbox liver metastasis sections and 5 mm for whole liver H&E sections.

FIG. 22. In vivo antitumor activity of drug-loaded NDs in p53 mutant KPC mice. Tumors were initiated by orthotopically implanting Ca5Cre adenovirus in KPC-p53$^{+/LSL-R172H}$ mice. (A) and (B) depict tumor volume, and tumor weight, respectively, after 2×/wk treatment for four weeks with vehicle control, ND, ND-IRT (5 mg kg$^{-1}$ IRT equivalent), CUR (15 mg kg$^{-1}$ CUR equivalent) and ND-IRT+CUR (5 mg kg$^{-1}$ IRT equivalent+15 mg kg$^{-1}$ CUR equivalent). (C) H&E, Ki67, and cleaved caspase-3 staining of tumor sections of the indicated groups. (D) H&E staining of liver sections of the indicated groups. Scale bars 200 μm. Statistical significance with respect to ND-IRT treated group (p*<0.05 and **<001).

FIG. 24. Molecular modeling studies of PEGylated nanodiamond and drugs absorbed PEGylated nanodiamond. (A) Computational modeling for PEGylated ND and (B) showing drug bound on ND surfaces.

FIG. 25. No abnormalities concerning body weight from in vivo studies. (A) Endpoint mice body weight in Ca5Cre adenovirus implanted orthotopically in KPC (P53 knockout) mice after 2×/wk treatment for four weeks with vehicle control, ND, ND-IRT (5 mg kg$^{-1}$ IRT equivalent), CUR (15 mg kg$^{-1}$ CUR equivalent) and ND-IRT+CUR (5 mg kg$^{-1}$ IRT equivalent+15 mg kg$^{-1}$ CUR equivalent). (B) The corresponding data for KPC—with mutant p53 mice with tumors initiated by orthotopically implanting Ca5Cre adenovirus. The data in (A) and (B) are shown as mean values±S.D. (n=5).

DETAILED DESCRIPTION

Figure 1:
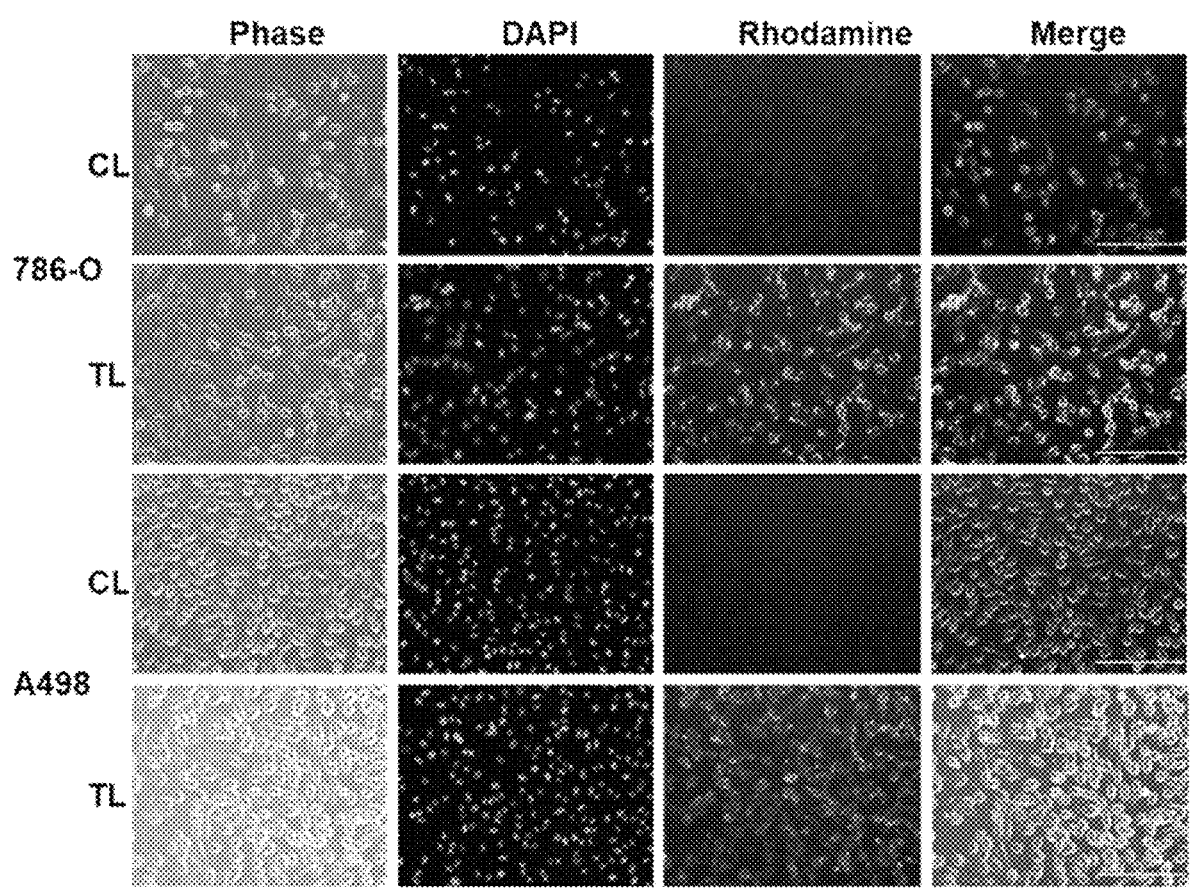
FIG. 1. In vitro cellular uptake of Rhodamine-PE labeled liposomes in RCC cell lines. 786-O and A498 cells were treated with Rhodamine-PE labeled control liposomes (CL) or TTP-conjugated Liposomes (TL) for 4 h. Nuclei of the cells were counterstained with Hoescht for the last 30 minutes. Finally, cells were washed three times with PBS and images were captured using EVOS fluorescence microscope under bright field, blue and red channel. TL treated cells showed significantly higher uptake of Rhodamine dye compared to CL-treated cells in all cell lines.

The present disclosure provides, inter alia, tumor targeting liposomes and formulations containing same that are capable of delivering a number of anti-cancer drugs, either alone or combination, to a variety of tumors. These drug-loaded liposomes and formulations are not only inhibiting the primary tumor growth but also are effective in reducing the metastatic burden. Hence, the liposomal drug delivery systems described herein are beneficial in treating cancer patients by increasing the progression-free survival as well as overall survival. Certain embodiments of the tumor-targeting liposomes, including the tumor-targeting peptides, and the lipids of the liposomal bilayer, are described in this application. Methods of making the liposomes, compositions containing the liposomes, methods of incorporating anti-cancer drugs within the liposomes, and methods of using the liposomes and compositions containing same to treat cancer in patients, are also described in this application.

Tumor-Targeting Polypeptide

In one general aspect, the present application provides a tumor-targeting peptide (e.g., polypeptide). In one example, the tumor-targeting peptide is a peptide (e.g., polypeptide) having an affinity to bind to fibroblast growth factor receptor (FGFR) on the surface of a cancer cell. Suitable examples of FGF receptors include FGFR1, FGFR2, FGFR3, FGFR4, FGFRL1, and FGFR6. In some embodiments, FGFR is expressed selectively on the surface of cancer cells as compared to healthy tissue cells. In some embodiments, the peptide comprises a fragment of a fibroblast growth factor (FGF). Suitable examples of FGF include FGF1 through FGF10, or variants thereof. In some embodiments, the peptide comprises an FGFR-binding domain of FGF. In some aspects of these embodiments, the tumor-targeting peptide comprises 90%, 80%, 70%, 60%, or 50% of amino acids of the FGFR-binding domain of FGF. In some embodiments, the tumor-targeting peptide comprises at least 5, at least 6, at least 7, at least 8, at least 9, or at least 10 amino acids independently selected from K, C, L, S, P, R, and Y In some embodiments, the tumor-targeting peptide comprises at least two C amino acid residues. In some embodiments, the tumor-targeting peptide is linear. In other embodiments, the tumor-targeting peptide is cyclic. In one example, when the peptide comprises two or more cysteine (C) residues, the peptide may be oxidized with an oxidizing agent to form an —S—S— bridge between the C residues of the peptide. In some embodiments, the peptide may comprise one, two, three, or more —S—S— bridges within its structure.

In some embodiments, the peptide (e.g., polypeptide), or a pharmaceutically acceptable salt thereof, comprises an amino acid sequence KCLSPPRYPC (SEQ ID NO: 1). In some aspects of these embodiments, the peptide comprises an —S—S— bridge between cysteine (C) residues in the amino acid sequence SEQ ID NO: 1. In some embodiments, the peptide of the SEQ ID NO: 1 has formula:

or a pharmaceutically acceptable salt thereof.

Tumor-Targeting Lipopeptide

In another general aspect, the present application provides a tumor-targeting lipopeptide. In some embodiments, the tumor-targeting lipopeptide is formula (I):

$$A\text{-}L\text{-}B \tag{I}$$

or pharmaceutically acceptable salt thereof, wherein:
A is a lipid;
L is a linker or a bond; and
B is a tumor-targeting polypeptide.

In some embodiments, the lipid is selected from a fatty acid, a fatty amine, a fatty amide, a saccharolipid, a prenol lipid, a sterol lipid, a sphingolipid, a glycerolipid, and a phospholipid.

Suitable examples of fatty acids include short-chain fatty acids ($C_{1-5}$), medium-chain fatty acids ($C_{6-12}$), long-chain fatty acids ($C_{13-21}$), and very long chain fatty acids ($C_{22}$ or higher).

In some embodiments, the fatty acid is saturated. Suitable examples of saturated fatty acids include caprylic acid ($CH_3(CH_2)_6COOH$); capric acid ($CH_3(CH_2)_8COOH$); lauric acid ($CH_3(CH_2)_{10}COOH$); myristic acid ($CH_3(CH_2)_{12}COOH$); palmitic acid ($CH_3(CH_2)_{14}COOH$); stearic acid ($CH_3(CH_2)_{16}COOH$); arachidic acid ($CH_3(CH_2)_{18}COOH$); behenic acid ($CH_3(CH_2)_{20}COOH$); lignoceric acid ($CH_3(CH_2)_{22}COOH$); and cerotic acid ($CH_3(CH_2)_{24}COOH$).

In some embodiments, the fatty acid is unsaturated. Suitable examples of unsaturated fatty acids include myristoleic acid ($CH_3(CH_2)_3CH=CH(CH_2)_7COOH$); palmitoleic acid ($CH_3(CH_2)_5CH=CH(CH_2)_7COOH$); sapienic acid ($CH_3(CH_2)_8CH=CH(CH_2)_4COOH$); oleic acid ($CH_3(CH_2)_7CH=CH(CH_2)_7COOH$); elaidic acid ($CH_3(CH_2)_7CH=CH(CH_2)_7COOH$); vaccenic acid ($CH_3(CH_2)_5CH=CH(CH_2)_9COOH$); linoleic acid ($CH_3(CH_2)_4CH=CHCH_2CH=CH(CH_2)_7COOH$); linoelaidic acid ($CH_3(CH_2)_4CH=CHCH_2CH=CH(CH_2)_7COOH$); α-linolenic acid ($CH_3CH_2CH=CHCH_2CH=CHCH_2CH=CH(CH_2)_7COOH$); arachidonic acid ($CH_3(CH_2)_4CH=CHCH_2CH=CHCH_2CH=CHCH_2CH=CH(CH_2)_3COOH$); eicosapentaenoic acid ($CH_3CH_2CH=CHCH_2CH=CHCH_2CH=CHCH_2CH=CHCH_2CH=CH(CH_2)_3COOH$); erucic acid ($CH_3(CH_2)_7CH=CH(CH_2)_{11}COOH$); and docosahexaenoic acid ($CH_3CH_2CH=CHCH_2CH=CHCH_2CH=CHCH_2CH=CHCH_2CH=CHCH_2CH=CH(CH_2)_2COOH$).

Suitable examples of fatty amines include compounds of formula $R_2NH$, wherein each R is independently selected from $C_{5-22}$ alkyl and $C_{5-22}$ alkenyl. In some embodiments, each $C_{5-22}$ alkyl is independently an aliphatic chain of any one of the saturated fatty acids described here. In some embodiments, each $C_{5-22}$ alkenyl is independently an aliphatic chain of any one of the unsaturated fatty acids described here. In some embodiments, an aliphatic amine is a compound of formula $(C_{18}H_{37})_2NH$.

Suitable examples of sphingolipids include the following compounds:

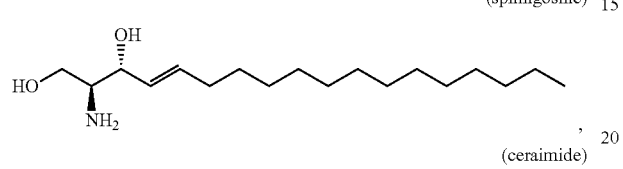
(sphingosine)

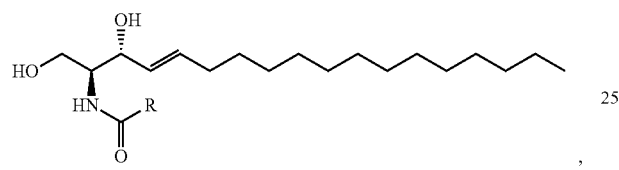
(ceraimide)

wherein R—C(═O) is a fatty acid residue, and

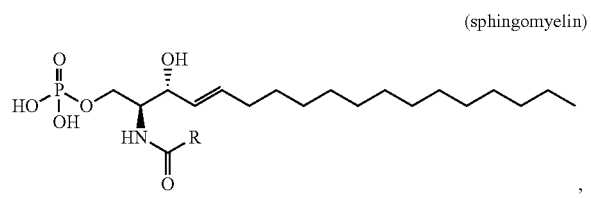
(sphingomyelin)

wherein R—C(═O) is a fatty acid residue, or a pharmaceutically acceptable salt thereof.

Suitable examples of prenol lipids include geraniol and carotenoids. Suitable examples of sterol lipids include estrogens, androgens, testosterone, androsterone, progestogens, glucocorticoids, mineralocorticoids, secosteroids, bile acids (cholic acid, taurocholic acid, glycocholic acid, chenodeoxycholic acid, or lithocholic acid), phytosterols (e.g., β-sitosterol, stigmasterol, and brassicasterol), and ergosterol. Suitable examples of saccharolipids include one or more of the fatty acids described here covalently linked to a sugar backbone, such as glucosamine, glucose, mannose, and other sugars or derivatives thereof. Suitable examples of glycerolipids include glycerols esterified with one or two fatty acids (e.g., two fatty acids independently selected from any one of the fatty acids described in the application). Examples of diglycerides include diester of lauric acid with glycerol, diester of octanoic acid with glycerol, and diester of tallow acid with glycerol.

Suitable examples of phospholipids include a compound of formula (ii) or formula (iii):

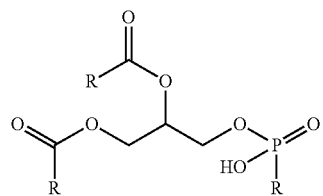
(ii)

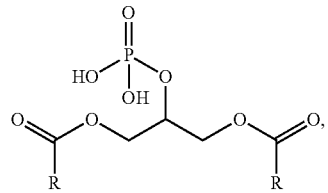
(iii)

or a pharmaceutically acceptable salt thereof, wherein each R—C(═O) is independently a residue of a fatty acid.

In some embodiments, L is a bond.

In some embodiments, L is a linker.

In some embodiments, L is $C_{2-100}$ alkylene, which is optionally interrupted by 1-10 groups independently selected from O, NH, N($C_{1-6}$ alkyl), C(═O), a PEG moiety comprising —(OCH$_2$CH$_2$)$_n$— or —(CH$_2$CH$_2$O)$_n$—, and a PPG moiety comprising —(OCH(CH$_3$)CH$_2$)$_n$— or —(CH$_2$CH(CH$_3$)O)$_n$—, wherein each n is independently an integer from 1 to 2,000.

In some embodiments, L is $C_{10-50}$ alkylene, which is optionally interrupted by 1-6 groups independently selected from O, NH, and C(═O). In some embodiments, L is $C_{10-20}$ alkylene, which is optionally interrupted by 1-6 groups independently selected from NH and C(═O). In some embodiments, L is $C_{2-100}$ alkylene interrupted by at least one PEG moiety of formula —(OCH$_2$CH$_2$)$_n$— or —(CH$_2$CH$_2$O)$_n$—, wherein n is an integer from 2 to 10. In some embodiments, L is $C_{2-100}$ alkylene interrupted by at least one PPG moiety of formula —(OCH(CH$_3$)CH$_2$)$_n$— or —(CH$_2$CH(CH$_3$)O)$_n$—, wherein n is an integer from 2 to 10. In some embodiments, L is $C_{2-100}$ alkylene interrupted by at least one PEG moiety of formula —(OCH$_2$CH$_2$)$_n$— or —(CH$_2$CH$_2$O)$_n$— and by at least one PPG moiety of formula —(OCH(CH$_3$)CH$_2$)$_n$— or —(CH$_2$CH(CH$_3$)O)$_n$—, wherein each n is independently an integer from 2 to 20.

In some embodiments, the linker comprises at least one group of formula:

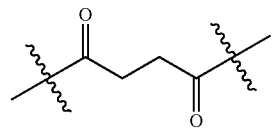

In some embodiments, L is a linker of formula:

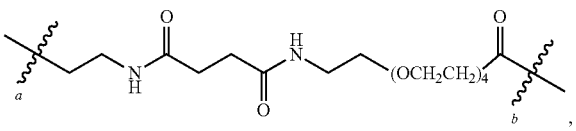

wherein a denotes a point of attachment to A, and b denotes a point of attachment to B.

In some embodiments, B is any one of the tumor-targeting polypeptides described herein. In one example, B is a tumor-targeting polypeptide comprising at least 50%, at least 60%, at least 70%, or at least 80% of an FGFR-binging domain of FGF. In another example, B is a tumor-targeting polypeptide having the affinity to bind FGFR. In yet another example, B is a tumor-targeting polypeptide of SEQ ID NO: 1, optionally having a —S—S— bridge between the C amino acid residues of the SEQ ID NO: 1.

In some embodiments of the lipopeptide of formula (I): A is fatty amine of formula:

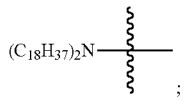

B is a polypeptide of SEQ ID NO: 1; and
L is a linker of formula:

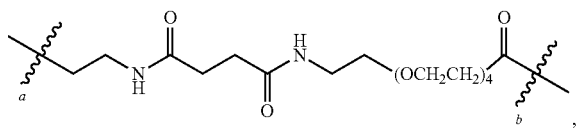

wherein a denotes a point of attachment to A, and b denotes a point of attachment to the α-amino group of the N-terminal amino acid (K) of the amino acid sequence SEQ ID NO: 1 of the polypeptide B.

In some embodiments, the lipopetide of formula (I) has formula:

or a pharmaceutically acceptable salt thereof, wherein NH is an α-amino group of N-terminal amino acid K of the polypeptide of SEQ ID NO: 1.

In some embodiments, the lipopetide of formula (I) has formula:

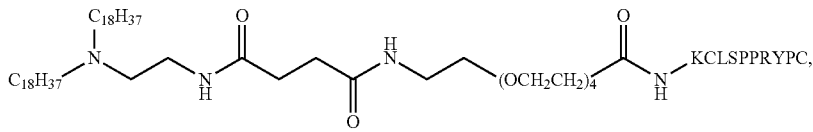

or a pharmaceutically acceptable salt thereof, wherein NH attached to K in the formula is an α-amino group of N-terminal amino acid K of the polypeptide of SEQ ID NO: 1.

Liposome

In another general aspect, the present application provides a liposome. In some embodiments, the liposome comprises at least one lipid bilayer (i.e., the liposome is unilamellar). In other embodiments, the liposome comprises two or more lipid bilayers (the liposome is multilamellar). In some embodiments, the liposome can be described, prepared, and/or classified as described in Akbarzadeh et al, *Nanoscale Res Lett,* 2013, 8 (1), 102, the disclosure of which is incorporated herein by reference in its entirety. In some embodiments, the lipid bilayer of the liposome comprises at least one phospholipid, and optionally a lipid bilayer stabilizing agent and/or any one of the lipids described herein (e.g., fatty acid, fatty amine, sterol lipid, a sphingolipid, or a glycerolipid).

In some embodiments, the liposome comprises a lipid bilayer stabilizing agent. Suitable examples of lipid bilayer stabilizing agents include cholesterol, a fatty acid ester of cholesterol, sitosterol, ergosterol, stigmasterol, 4,22-stigmastadien-3-one, stigmasterol acetate, lanosterol, or a combination thereof.

In some embodiments, the liposome comprises at least one phospholipid (e.g., at least one phospholipid, at least two independently selected phospholipids, at least three independently selected phospholipids, or at least four independently selected phospholipids). Suitable examples of phospholipids include fatty acid derivatives of phosphatidic acid, fatty acid derivatives of phosphatidylcholine, fatty acid derivatives of phosphatidylglycerol, fatty acid derivatives of phosphatidylethanolamine, and fatty acid derivatives of phosphatidylserine. In some embodiments, each phospholipid is independently selected from: 1,2-didecanoyl-sn-glycero-3-phosphocholine (DDPC), 1,2-dierucoyl-sn-glycero-3-phosphate (DEPA), 1,2-dierucoyl-sn-glycero-3-phosphocholine (DEPC), 1,2-dierucoyl-sn-glycero-3-phosphoethanolamine (DEPE), DEPG, 1,2-dilinoleoyl-sn-glycero-3-phosphocholine (DLOPC), 1,2-dilauroyl-sn-glycero-3-phosphate (DLPA), 1,2-dilauroyl-sn-glycero-3-phosphocholine (DLPC), 1,2-dilauroyl-sn-glycero-3-phosphoethanolamine (DLPE), DLPG, 1,2-dilauroyl-sn-glycero-3-phosphoserine (DLPS), 1,2-dimyristoyl-sn-glycero-3-phosphate (DMPA), 1,2-dimyristoyl-sn-glycero-3-phosphocholine (DMPC), 1,2-dimyristoyl-sn-glycero-3-phosphoethanolamine (DMPE), DMPG, 1,2-dimyristoyl-sn-glycero-3-phosphoserine (DMPS), 1,2-dioleoyl-sn-glycero-3-phosphate (DOPA), 1,2-dioleoyl-sn-glycero-3-phosphocholine (DOPC), 1,2-dioleoyl-sn-glycero-3-phosphoethanolamine (DOPE), DOPG, 1,2-dioleoyl-sn-glycero-3-phosphoserine (DOPS), 1,2-dipalmitoyl-sn-glycero-3-phosphate (DPPA), 1,2-dipalmitoyl-sn-glycero-3-phosphocholine (DPPC), 1,2-dipalmitoyl-sn-glycero-3-phosphoethanolamine (DPPE), DPPG, 1,2-dipalmitoyl-sn-glycero-3-phosphoserine (DPPS), 1,2-distearoyl-sn-glycero-3-phosphate (DSPA), 1,2-distearoyl-sn-glycero-3-phosphocholine (DSPC), 1,2-distearoyl-sn-glycero-3-phosphoethanolamine (DSPE), DSPG, 1,2-distearoyl-sn-glycero-3-phosphoserine (DSPS), 1-myristoyl-sn-glycero-3-phosphocholine, 1-palmitoyl-sn-glycero-3-phosphocholine, 1-stearoyl-sn-glycero-3-phosphocholine, 1-myristoyl-2-palmitoyl-sn-glycero 3-phosphocholine, 1-myristoyl-2-stearoyl-sn-glycero-3-phosphocholine (MSPC), 1-palmitoyl-2-myristoyl-sn-glycero-3-phosphocholine (PMPC), 1-palmitoyl-2-oleoyl-sn-glycero-3-phosphocholine (POPC), 1-palmitoyl-2-oleoyl-sn-glycero-3-phosphoethanolamine (POPE), 1-palmitoyl-2-stearoyl-sn-glycero-3-phosphocholine (PSPC), POPG, 1-stearoyl-2-myristoyl-sn-glycero-3-phosphocholine (SMPC), 1-stearoyl-2-oleoyl-sn-glycero-3- phosphocholine (SOPC), and 1-stearoyl-2-palmitoyl-sn-glycero-3-phosphocholine (SPPC).

In some embodiments, the phospholipid is derivatized with a hydrophilic polymer, such as polyethylene glycol and polypropylene glycol. In one example, the derivatized phospholipid is DSPE-PEG, such as DSPE-PEG$_{2000}$-OMe.

In some embodiments, the liposome comprises at least one lipid described herein, such as, for example, a fatty acid, a fatty amine, a fatty amide, a saccharolipid, a prenol lipid, a sterol lipid, a sphingolipid, and a glycerolipid, or any combination thereof.

In some embodiments, the liposome comprises a combination of two or more anti-cancer agents, or a pharmaceutically acceptable salt of either of both thereof (e.g., at least two, at least three, at least four, or at least five anti-cancer agents, or a pharmaceutically acceptable salt of either, some, or all thereof). In some embodiments, the liposome comprises a combination of two anti-cancer agents, or a pharmaceutically acceptable salt of either or both thereof. In some embodiments, one of the anti-cancer agents in the combination is hydrophilic, and the other on of the anti-cancer agents in the combination is hydrophobic. In some embodiments, both of the anti-cancer agents within the liposome are hydrophilic. In some embodiments, both of the anti-cancer agents within the liposome are hydrophobic. In any of these embodiments, hydrophobic anti-cancer agents are entrapped within the lipid bilayer of the liposome, and hydrophilic anti-cancer agents are entrapped within the aqueous compartment inside the lipid bilayer of the liposome. For example, about 50%, about 60%, about 70%, about 80%, about 90%, or about 95% of the total amount of the hydrophobic drug in the liposome is entrapped in the lipid bilayer of the liposome, and about 50%, about 60%, about 70%, about 80%, about 90%, or about 95% of the total amount of the hydrophobic drug in the liposome is entrapped in the aqueous environment inside the lipid bilayer of the liposome.

In some embodiments, each anti-cancer agent is independently selected from an mTOR inhibitor, an NRP1 inhibitor, a mitosis inhibitor, an antimetabolite, an EGFR inhibitor, and an VEGFR2 inhibitor, or a pharmaceutically acceptable salt of any, some, or all thereof. In some embodiments, mTOR inhibitor is selected from everolimus, rapamycin, and temsirolimus, or a pharmaceutically acceptable salt thereof. In some embodiments, the NRP1 inhibitor is selected from EG00229, EG01377, and MNRP1685A, or a pharmaceutically acceptable salt thereof. In some embodiments, the mitosis inhibitor is selected from vinorelbine, paclitaxel, docetaxel, vinblastine, vincristine, vindesine, colchicine, podophyllotoxin, griseofulvin, and glaziovianin A, or pharmaceutically acceptable salt thereof. In some embodiments, the EGFR inhibitor is selected from erlotinib, gefitinib, genistein, apatinib and afatinib, or a pharmaceutically acceptable salt thereof. In some embodiments, the antimetabolite is selected from gemcitabine, 5-fluorouracil, 6-mercaptopurine, capecitabine, cytarabine, floxuridine, fludarabine, methotrexate, and pemetrexed, or a pharmaceutically acceptable salt thereof. In some embodiments, the VEGFR2 inhibitor is selected from XL-184, sorafenib, sunitinib, and foretinib, or a pharmaceutically acceptable salt thereof.

In some embodiments, at least one of the anti-cancer agents within the liposome is an antibody is useful in treating cancer. In some embodiments, the antibody useful in treating cancer is abagovomab, adecatumumab, afutuzumab, alacizumab pegol, altumomab pentetate, amatuximab, anatumomab mafenatox, apolizumab, arcitumomab, bavituximab, bectumomab, belimumab, bevacizumab, bivatuzumab mertansine, blinatumomab, brentuximab vedotin, cantuzumab mertansine, cantuzumab ravtansine, capromab pendetide, cetuximab, citatuzumab bogatox, cixutumumab, clivatuzumab tetraxetan, dacetuzumab, demcizumab, detumomab, drozitumab, ecromeximab, eculizumab, elotuzumab, ensituximab, epratuzumab, etaracizumab, farletuzumab, figitumumab, flanvotumab, galiximab, gemtuzumab ozogamicin, girentuximab, ibritumomab tiuxetan, imgatuzumab, ipilimumab, labetuzumab, lexatumumab, lorvotuzumab mertansine, nimotuzumab, ofatumumab, oregovomab, panitumumab, pemtumomab, pertuzumab, tacatuzumab tetraxetan, tositumomab, trastuzumab, totumumab, or zalutumumab.

In some embodiments, the liposome comprises an mTOR inhibitor, or a pharmaceutically acceptable salt thereof, and an NRP1 inhibitor, or a pharmaceutically acceptable salt thereof. In some aspects of these embodiments, the mTOR inhibitor is selected from everolimus, rapamycin, and temsirolimus, or a pharmaceutically acceptable salt thereof; and the NRP1 inhibitor is selected from EG00229, EG01377, and MNRP1685A, or a pharmaceutically acceptable salt thereof. In some embodiments, the liposome comprises everolimus, or a pharmaceutically acceptable salt thereof, and EG00229, or a pharmaceutically acceptable salt thereof.

In some embodiments, the liposome comprises an mTOR inhibitor, or a pharmaceutically acceptable salt thereof, and a mitosis inhibitor, or a pharmaceutically acceptable salt thereof. In some aspects of these embodiments, the mTOR inhibitor is selected from everolimus, rapamycin, and temsirolimus, or a pharmaceutically acceptable salt thereof; and the mitosis inhibitor is selected from vinorelbine, paclitaxel, docetaxel, vinblastine, vincristine, vindesine, colchicine, podophyllotoxin, griseofulvin, and glaziovianin A, or pharmaceutically acceptable salt thereof. In some embodiments, the liposome comprises everolimus, or a pharmaceutically acceptable salt thereof, and vinorelbine, or a pharmaceutically acceptable salt thereof.

In some embodiments, the liposome comprises an antimetabolite, or a pharmaceutically acceptable salt thereof, and a mitosis inhibitor, or a pharmaceutically acceptable salt thereof. In some aspects of these embodiments, the antimetabolite is selected from gemcitabine, 5-fluorouracil, 6-mercaptopurine, capecitabine, cytarabine, floxuridine, fludarabine, methotrexate, and pemetrexed, or a pharmaceutically acceptable salt thereof; and the mitosis inhibitor is selected from vinorelbine, paclitaxel, docetaxel, vinblastine, vincristine, vindesine, colchicine, podophyllotoxin, griseofulvin, and glaziovianin A, or pharmaceutically acceptable salt thereof. In some embodiments, the liposome comprises gemcitabine, or a pharmaceutically acceptable salt thereof, and paclitaxel, or a pharmaceutically acceptable salt thereof. In some embodiments, the liposome comprises an antimetabolite, or a pharmaceutically acceptable salt thereof, and an EGFR inhibitor, or a pharmaceutically acceptable salt thereof. In some aspects of these embodiments, the antimetabolite is selected from gemcitabine, 5-fluorouracil, 6-mercaptopurine, capecitabine, cytarabine, floxuridine, fludarabine, methotrexate, and pemetrexed, or a pharmaceutically acceptable salt thereof; and the EGFR inhibitor is selected from erlotinib, gefitinib, genistein, apatinib and afatinib, or a pharmaceutically acceptable salt thereof. In some embodiments, the liposome comprises gemcitabine, or a pharmaceutically acceptable salt thereof, and erlotinib, or a pharmaceutically acceptable salt thereof.

In some embodiments, the liposome comprises an antimetabolite, or a pharmaceutically acceptable salt thereof, and a VEGFR2 inhibitor, or a pharmaceutically acceptable salt thereof. In some aspects of these embodiments, the antimetabolite is selected from gemcitabine, 5-fluorouracil, 6-mercaptopurine, capecitabine, cytarabine, floxuridine, fludarabine, methotrexate, and pemetrexed, or a pharmaceutically acceptable salt thereof; and the VEGFR2 inhibitor is selected from XL-184, sorafenib, sunitinib, and foretinib, or a pharmaceutically acceptable salt thereof. In some embodiments, the liposome comprises gemcitabine, or a pharmaceutically acceptable salt thereof, and XL-184, or a pharmaceutically acceptable salt thereof.

In some embodiments, the liposome comprises a mitosis inhibitor, or a pharmaceutically acceptable salt thereof, and a VEGFR2 inhibitor, or a pharmaceutically acceptable salt thereof. In some aspects of these embodiments, the mitosis inhibitor is selected from vinorelbine, paclitaxel, docetaxel, vinblastine, vincristine, vindesine, colchicine, podophyllotoxin, griseofulvin, and glaziovianin A, or pharmaceutically acceptable salt thereof, and the VEGFR2 inhibitor is selected from XL-184, sorafenib, sunitinib, and foretinib, or a pharmaceutically acceptable salt thereof. In some embodiments, the liposome comprises paclitaxel, or a pharmaceutically acceptable salt thereof, and XL-184, or a pharmaceutically acceptable salt thereof.

In some embodiments, the size of the liposome is from about 10 nm to about 100 nm, or from about 50 nm to about 100 nm. In some embodiments, zeta potential of the liposome is from about 10 mV to about 50 mV. In some embodiments, encapsulation efficiency of the liposome of the present disclosure is from about 10% to about 100%, or about 20%, about 30%, about 40%, about 50%, about 60%, about 70%, about 80%, or about 100%. In some embodiments, drug loading efficiency of the liposome of the present disclosure is from about 1% to about 50%, from about 1% to about 10%, or about 1%, about 2%, about 3%, about 4%, about 5%, about 6%, about 7%, about 8%, about 9%, or about 10%.

In some embodiments, the present disclosure provides a method of making a liposome, the method comprising (i) obtaining a solution of a phospholipid in an organic solvent; and (ii) combining the organic solution obtained in step (i) with water to obtain the liposome. In some embodiments, the organic solution comprises a lipid bilayer stabilizing agent. In some embodiments, the organic solution comprises at least one lipid described herein. In some embodiments, the organic solvent is ethanol. In some embodiments, the combining is carried out at elevated temperature (e.g., about 50° C., about 60° C., about 65° C., about 70° C., or about 75° C.). In some cases, when at least one of the anti-cancer drugs is hydrophobic, the organic solution also comprises the hydrophobic anti-cancer drug. In some embodiments, when at least one of the anti-cancer drugs is hydrophilic, the method of making a drug-loaded liposome comprises (i) obtaining a solution of a phospholipid in an organic solvent; (ii) obtaining a solution of a hydrophilic anti-cancer drug in water; and (iii) combining the organic solution and the aqueous drug solution to obtain the drug-loaded liposome.

Tumor-Targeting Liposome

In a general aspect, the present application provides a tumor-targeting liposome. In some embodiments, the tumor-targeting liposome comprises a tumor-targeting lipopeptide as described herein. Suitable examples of the tumor-targeting lipopeptides include any one of the lipopeptides of formula (I).

In some embodiments, the tumor-targeting liposome comprises a lipid bilayer stabilizing agent. Suitable examples of stabilizing agents are described for a liposome herein. In some embodiments, the tumor-targeting liposome comprises cholesterol.

In some embodiments, the tumor-targeting liposome comprises one or more phospholipids. Suitable examples of phospholipids are described for a liposome herein. In some embodiments, the phospholipids within the tumor-targeting liposomes are independently selected from 1,2-dioleoyl-sn-glycero-3-phosphocholine (DOPC), 1,2-dioleoyl-sn-glycero-3-phosphoethanolamine (DOPE), 1,2-dipalmitoyl-sn-glycero-3-phosphocholine (DPPC), and 1,2-distearoyl-sn-glycero-3-phosphoethanolamine (DSPE).

In some embodiments, at least one phospholipid within the tumor-targeting liposome is derivatized with a hydrophilic polymer. In some aspects of these embodiments, the hydrophilic polymer is PEG (polyethylene glycol). In some embodiments, the derivatized phospholipid within the tumor-targeting liposome is DSPE-PEG, such as, for example, DSPE-PEG$_{2000}$-OMe.

In some embodiments, the tumor-targeting liposome comprises a tumor-targeting lipopeptide, a lipid bilayer stabilizing agent, and at least one phospholipid. In some aspects of these embodiments, the tumor-targeting lipopeptide comprises a compound of formula (I), the lipid bilayer stabilizing agent is cholesterol; and each phospholipid is independently selected from 1,2-dioleoyl-sn-glycero-3-phosphocholine (DOPC), 1,2-dioleoyl-sn-glycero-3-phosphoethanolamine (DOPE), and 1,2-dipalmitoyl-sn-glycero-3-phosphocholine (DPPC). In other aspects of these embodiments, the molar ratio between the lipopeptide, the lipid bilayer stabilizing agent, and the combined amount of the phospholipids in the liposome is about 0.1 to about 0.25 to about 1, respectively.

In some embodiments, the tumor-targeting liposome comprises a tumor-targeting lipopeptide, at least one phospholipid, and a derivatized phospholipid comprising a hydrophilic polymer. In some aspects of these embodiments, the tumor-targeting lipopeptide comprises a compound of formula (I), each phospholipid is independently selected from 1,2-dioleoyl-sn-glycero-3-phosphocholine (DOPC), 1,2-dioleoyl-sn-glycero-3-phosphoethanolamine (DOPE), and 1,2-dipalmitoyl-sn-glycero-3-phosphocholine (DPPC); and the derivatized phospholipid is 1,2-distearoyl-sn-glycero-3-phosphoethanolamine (DSPE) comprising polyethylene glycol. In other aspects of these embodiments, the molar ratio between the lipopeptide, the derivatized phospholipid, and the combined amount of the phospholipids in the liposome is about 0.1 to about 0.01 to about 1.25, respectively.

In some embodiments, the tumor-targeting liposome comprises a tumor-targeting lipopeptide, a lipid bilayer stabilizing agent; at least one phospholipid; and a derivatized phospholipid comprising a hydrophilic polymer. In some aspects of these embodiments, the tumor-targeting lipopeptide comprises a compound of formula (I), the lipid bilayer stabilizing agent is cholesterol; each phospholipid is independently selected from 1,2-dioleoyl-sn-glycero-3-phosphocholine (DOPC), 1,2-dioleoyl-sn-glycero-3-phosphoethanolamine (DOPE), and 1,2-dipalmitoyl-sn-glycero-3-phosphocholine (DPPC); and the derivatized phospholipid is 1,2-distearoyl-sn-glycero-3-phosphoethanolamine (DSPE) comprising polyethylene glycol. In some aspects of these embodiments, the molar ratio between the lipopeptide, the lipid bilayer stabilizing agent, the combined amount of the phospholipids, and the derivatized phospholipid in the liposome is about 0.1 to about 0.25 to about 1 to about 0.01, respectively. In some aspects of these embodiments, the molar ratio between the lipopeptide, the lipid bilayer stabilizing agent, the combined amount of the phospholipids, and the derivatized phospholipid in the liposome is about 0.05 to about 0.5 to about 1 to about 0.01, respectively. In some aspects of these embodiments, the molar ratio between the lipopeptide, the lipid bilayer stabilizing agent, the combined amount of the phospholipids, and the derivatized phospholipid in the liposome is about 0.1 to about 0.1 to about 1 to about 0.01, respectively. In some aspects of these embodiments, the molar ratio between the lipopeptide, the lipid bilayer stabilizing agent, the combined amount of the phospholipids, and the derivatized phospholipid in the liposome is about 0.1 to about 0.1 to about 1.25 to about 0.01, respectively.

In some embodiments, the tumor-targeting liposome comprises at least one anti-cancer agent, or a pharmaceutically acceptable salt thereof. In some aspects of these embodiments, each anti-cancer agent is independently selected from an mTOR inhibitor, an NRP1 inhibitor, a mitosis inhibitor, an antimetabolite, an EGFR inhibitor, and an VEGFR2 inhibitor or a pharmaceutically acceptable salt thereof. In some aspects of these embodiments, the mTOR inhibitor is selected from everolimus, rapamycin, and temsirolimus, or a pharmaceutically acceptable salt thereof. In some aspects of these embodiments, the NRP1 inhibitor is selected from EG00229, EG01377, and MNRP1685A, or a pharmaceutically acceptable salt thereof. In some aspects of these embodiments, the mitosis inhibitor is selected from vinorelbine, paclitaxel, docetaxel, vinblastine, vincristine, vindesine, colchicine, podophyllotoxin, griseofulvin, and glaziovianin A, or pharmaceutically acceptable salt thereof. In some aspects of these embodiments, the EGFR inhibitor is selected from erlotinib, gefitinib, genistein, apatinib and afatinib, or a pharmaceutically acceptable salt thereof. In some aspects of these embodiments, the antimetabolite is selected from gemcitabine, 5-fluorouracil, 6-mercaptopurine, capecitabine, cytarabine, floxuridine, fludarabine, methotrexate, and pemetrexed, or a pharmaceutically acceptable salt thereof. In some aspects of these embodiments, the VEGFR2 inhibitor is selected from XL-184, sorafenib, sunitinib, and foretinib, or a pharmaceutically acceptable salt thereof.

In some embodiments, the tumor-targeting liposome comprises an antibody useful in treating cancer. In some embodiments, the antibody useful in treating cancer is abagovomab, adecatumumab, afutuzumab, alacizumab pegol, altumomab pentetate, amatuximab, anatumomab mafenatox, apolizumab, arcitumomab, bavituximab, bectumomab, belimumab, bevacizumab, bivatuzumab mertansine, blinatumomab, brentuximab vedotin, cantuzumab mertansine, cantuzumab ravtansine, capromab pendetide, cetuximab, citatuzumab bogatox, cixutumumab, clivatuzumab tetraxetan, dacetuzumab, demcizumab, detumomab, drozitumab, ecromeximab, eculizumab, elotuzumab, ensituximab, epratuzumab, etaracizumab, farletuzumab, figitumumab, flanvotumab, galiximab, gemtuzumab ozogamicin, girentuximab, ibritumomab tiuxetan, imgatuzumab, ipilimumab, labetuzumab, lexatumumab, lorvotuzumab mertansine, nimotuzumab, ofatumumab, oregovomab, panitumumab, pemtumomab, pertuzumab, tacatuzumab tetraxetan, tositumomab, trastuzumab, totumumab, or zalutumumab.

In some embodiments, the tumor-targeting liposome comprises a combination of two anti-cancer agents, or a pharmaceutically acceptable salt of either or both thereof. In some embodiments, one of the anti-cancer agents in the combination is hydrophilic, and the other on of the anti-cancer agents in the combination is hydrophobic. In some embodiments, both of the anti-cancer agents within the tumor-targeting liposome are hydrophilic. In some embodiments, both of the anti-cancer agents within the tumor-targeting liposome are hydrophobic. In any of these embodiments, hydrophobic anti-cancer agents are entrapped within the lipid bilayer of the tumor-targeting liposome, and hydrophilic anti-cancer agents are entrapped within the aqueous compartment inside the lipid bilayer of the tumor-targeting liposome. For example, about 50%, about 60%, about 70%, about 80%, about 90%, or about 95% of the total amount of the hydrophobic drug in the tumor-targeting liposome is entrapped in the lipid bilayer of the liposome, and about 50%, about 60%, about 70%, about 80%, about 90%, or about 95% of the total amount of the hydrophobic drug in the tumor-targeting liposome is entrapped in the aqueous environment inside the lipid bilayer of the tumor-targeting liposome.

In some embodiments, each anti-cancer agent of the combination of the two anti-cancer agents in the tumor-targeting liposome is independently selected from an mTOR inhibitor, an NRP1 inhibitor, a mitosis inhibitor, an antimetabolite, an EGFR inhibitor, and an VEGFR2 inhibitor, or a pharmaceutically acceptable salt of any, some, or all thereof.

In some embodiments, the tumor-targeting liposome comprises an mTOR inhibitor, or a pharmaceutically acceptable salt thereof, and an NRP1 inhibitor, or a pharmaceutically acceptable salt thereof. In some aspects of these embodiments, the mTOR inhibitor is selected from everolimus, rapamycin, and temsirolimus, or a pharmaceutically acceptable salt thereof; and the NRP1 inhibitor is selected from EG00229, EG01377, and MNRP1685A, or a pharmaceutically acceptable salt thereof. In some embodiments, the tumor-targeting liposome comprises everolimus, or a pharmaceutically acceptable salt thereof, and EG00229, or a pharmaceutically acceptable salt thereof.

In some embodiments, the tumor-targeting liposome comprises an mTOR inhibitor, or a pharmaceutically acceptable salt thereof, and a mitosis inhibitor, or a pharmaceutically acceptable salt thereof. In some aspects of these embodiments, the mTOR inhibitor is selected from everolimus, rapamycin, and temsirolimus, or a pharmaceutically acceptable salt thereof; and the mitosis inhibitor is selected from vinorelbine, paclitaxel, docetaxel, vinblastine, vincristine, vindesine, colchicine, podophyllotoxin, griseofulvin, and glaziovianin A, or pharmaceutically acceptable salt thereof. In some embodiments, the tumor-targeting liposome comprises everolimus, or a pharmaceutically acceptable salt thereof, and vinorelbine, or a pharmaceutically acceptable salt thereof.

In some embodiments, the tumor-targeting liposome comprises an antimetabolite, or a pharmaceutically acceptable salt thereof, and a mitosis inhibitor, or a pharmaceutically acceptable salt thereof. In some aspects of these embodiments, the antimetabolite is selected from gemcitabine, 5-fluorouracil, 6-mercaptopurine, capecitabine, cytarabine, floxuridine, fludarabine, methotrexate, and pemetrexed, or a pharmaceutically acceptable salt thereof; and the mitosis inhibitor is selected from vinorelbine, paclitaxel, docetaxel, vinblastine, vincristine, vindesine, colchicine, podophyllotoxin, griseofulvin, and glaziovianin A, or pharmaceutically acceptable salt thereof. In some embodiments, the tumor-targeting liposome comprises gemcitabine, or a pharmaceutically acceptable salt thereof, and paclitaxel, or a pharmaceutically acceptable salt thereof.

In some embodiments, the tumor-targeting liposome comprises an antimetabolite, or a pharmaceutically acceptable salt thereof, and an EGFR inhibitor, or a pharmaceutically acceptable salt thereof. In some aspects of these embodiments, the antimetabolite is selected from gemcitabine, 5-fluorouracil, 6-mercaptopurine, capecitabine, cytarabine, floxuridine, fludarabine, methotrexate, and pemetrexed, or a pharmaceutically acceptable salt thereof; and the EGFR inhibitor is selected from erlotinib, gefitinib, genistein, apatinib and afatinib, or a pharmaceutically acceptable salt thereof. In some embodiments, the tumor-targeting liposome comprises gemcitabine, or a pharmaceutically acceptable salt thereof, and erlotinib, or a pharmaceutically acceptable salt thereof.

In some embodiments, the tumor-targeting liposome comprises an antimetabolite, or a pharmaceutically acceptable salt thereof, and a VEGFR2 inhibitor, or a pharmaceutically acceptable salt thereof. In some aspects of these embodiments, the antimetabolite is selected from gemcitabine, 5-fluorouracil, 6-mercaptopurine, capecitabine, cytarabine, floxuridine, fludarabine, methotrexate, and pemetrexed, or a pharmaceutically acceptable salt thereof, and the VEGFR2 inhibitor is selected from XL-184, sorafenib, sunitinib, and foretinib, or a pharmaceutically acceptable salt thereof. In some embodiments, the tumor-targeting liposome comprises gemcitabine, or a pharmaceutically acceptable salt thereof, and XL-184, or a pharmaceutically acceptable salt thereof.

In some embodiments, the tumor-targeting liposome comprises a mitosis inhibitor, or a pharmaceutically acceptable salt thereof, and a VEGFR2 inhibitor, or a pharmaceutically acceptable salt thereof. In some aspects of these embodiments, the mitosis inhibitor is selected from vinorelbine, paclitaxel, docetaxel, vinblastine, vincristine, vindesine, colchicine, podophyllotoxin, griseofulvin, and glaziovianin A, or pharmaceutically acceptable salt thereof, and the VEGFR2 inhibitor is selected from XL-184, sorafenib, sunitinib, and foretinib, or a pharmaceutically acceptable salt thereof. In some embodiments, the tumor-targeting liposome comprises paclitaxel, or a pharmaceutically acceptable salt thereof, and XL-184, or a pharmaceutically acceptable salt thereof.

In some embodiments, the size of the tumor-targeting liposome is from about 10 nm to about 100 nm, or from about 50 nm to about 100 nm. In some embodiments, zeta potential of the tumor-targeting liposome is from about 10 mV to about 50 mV. In some embodiments, encapsulation efficiency of the tumor-targeting liposome of the present disclosure is from about 10% to about 100%, or about 20%, about 30%, about 40%, about 50%, about 60%, about 70%, about 80%, or about 100%. In some embodiments, drug loading efficiency of the tumor-targeting liposome of the present disclosure is from about 1% to about 50%, from about 1% to about 10%, or about 1%, about 2%, about 3%, about 4%, about 5%, about 6%, about 7%, about 8%, about 9%, or about 10%.

In some embodiments, the present disclosure provides a method of making a tumor-targeting liposome, the method comprising (i) obtaining a solution of a tumor-targeting lipopeptide in an organic solvent; and (ii) combining the organic solution obtained in step (i) with water to obtain the tumor-targeting liposome. In some embodiments, the organic solution comprises a phospholipid. In some embodiments, the organic solution comprises a lipid bilayer stabilizing agent. In some embodiments, the organic solution comprises at least one lipid described herein. In some embodiments, the organic solvent is ethanol. In some embodiments, the combining is carried out at elevated temperature (e.g., about 50° C., about 60° C., about 65° C., about 70° C., or about 75° C.). In some cases, when at least one of the anti-cancer drugs is hydrophobic, the organic solution also comprises the hydrophobic anti-cancer drug. In some embodiments, when at least one of the anti-cancer drugs is hydrophilic, the method of making a drug-loaded tumor-targeting liposome comprises (i) obtaining a solution of a tumor-targeting lipopeptide in an organic solvent; (ii) obtaining a solution of a hydrophilic anti-cancer drug in water; and (iii) combining the organic solution and the aqueous drug solution to obtain the drug-loaded tumor-targeting liposome.

Pharmaceutically Acceptable Salts

In some embodiments, a salt of any one of the compounds disclosed herein (e.g., a tumor-targeting peptide, a tumor-targeting lipopeptide, or an anti-cancer agent) is formed between an acid and a basic group of the compound, such as an amino functional group, or a base and an acidic group of the compound, such as a carboxyl functional group. According to another embodiment, the compound is a pharmaceutically acceptable acid addition salt.

In some embodiments, acids commonly employed to form pharmaceutically acceptable salts of any one of the compounds of the present disclosure include inorganic acids such as hydrogen bisulfide, hydrochloric acid, hydrobromic acid, hydroiodic acid, sulfuric acid and phosphoric acid, as well as organic acids such as para-toluenesulfonic acid, salicylic acid, tartaric acid, bitartaric acid, ascorbic acid, maleic acid, besylic acid, fumaric acid, gluconic acid, glucuronic acid, formic acid, glutamic acid, methanesulfonic acid, ethanesulfonic acid, benzenesulfonic acid, lactic acid, oxalic acid, para-bromophenylsulfonic acid, carbonic acid, succinic acid, citric acid, benzoic acid and acetic acid, as well as related inorganic and organic acids. Such pharmaceutically acceptable salts thus include sulfate, pyrosulfate, bisulfate, sulfite, bisulfite, phosphate, monohydrogenphosphate, dihydrogenphosphate, metaphosphate, pyrophosphate, chloride, bromide, iodide, acetate, propionate, decanoate, caprylate, acrylate, formate, isobutyrate, caprate, heptanoate, propiolate, oxalate, malonate, succinate, suberate, sebacate, fumarate, maleate, butyne-1,4-dioate, hexyne-1,6-dioate, benzoate, chlorobenzoate, methylbenzoate, dinitrobenzoate, hydroxybenzoate, methoxybenzoate, phthalate, terephthalate, sulfonate, xylene sulfonate, phenylacetate, phenylpropionate, phenylbutyrate, citrate, lactate, β-hydroxybutyrate, glycolate, maleate, tartrate, methanesulfonate, propanesulfonate, naphthalene-1-sulfonate, naphthalene-2-sulfonate, mandelate and other salts. In one embodiment, pharmaceutically acceptable acid addition salts include those formed with mineral acids such as hydrochloric acid and hydrobromic acid, and those formed with organic acids such as maleic acid.

In some embodiments, bases commonly employed to form pharmaceutically acceptable salts of any one of the compounds disclosed herein include hydroxides of alkali metals, including sodium, potassium, and lithium; hydroxides of alkaline earth metals such as calcium and magnesium; hydroxides of other metals, such as aluminum and zinc; ammonia, organic amines such as unsubstituted or hydroxyl-substituted mono-, di-, or tri-alkylamines, dicyclohexylamine; tributyl amine; pyridine; N-methyl, N-ethylamine; diethylamine; triethylamine; mono-, bis-, or tris-(2-OH—(C1-C6)-alkylamine), such as N,N-dimethyl-N-(2-hydroxyethyl)amine or tri-(2-hydroxyethyl)amine; N-methyl-D-glucamine; morpholine; thiomorpholine; piperidine; pyrrolidine; and amino acids such as arginine, lysine, and the like.

Nanodiamond Particles and Complexes

The present disclosure also provides a complex comprising a nanodiamond conjugated with a hydrophilic polymer;

and an at least one anticancer therapeutic agent non-covalently bound to the surface of the nanodiamond.

The present disclosure also provides a complex comprising a nanodiamond covalently attached to a hydrophilic polymer; and an at least one anticancer therapeutic agent non-covalently bound to the surface of the nanodiamond.

The present disclosure also provides a complex comprising a nanodiamond comprising a surface that is covalently modified with a hydrophilic polymer; and an at least one anticancer therapeutic agent non-covalently bound to the surface of the nanodiamond.

The present disclosure also provides a complex comprising a nanodiamond particle (e.g., nanoparticle) comprising a surface that is covalently modified with a hydrophilic polymer; and an at least one anticancer therapeutic agent non-covalently bound to the surface of the nanodiamond.

The present disclosure also provides a particle comprising a core comprising a nanodiamond; a shell comprising a hydrophilic polymer, wherein the nanodiamond is covalently modified with the hydrophilic polymer of the shell; and an at least one anticancer therapeutic agent non-covalently bound to the surface of the nanodiamond core. In some embodiments, the core comprises a surface (e.g., the surface of the nanodiamond within the core is covalently modified with the hydrophilic polymer).

The present disclosure also provides a particle comprising a core comprising a carbon particle (e.g., wherein carbon is a diamond); a shell comprising a hydrophilic polymer, wherein the carbon particle is covalently modified with the hydrophilic polymer of the shell; and an at least one anticancer therapeutic agent non-covalently bound to the surface of the carbon particle core. In some embodiments, the core comprises a surface (e.g., the surface of the carbon particle within the core is covalently modified with the hydrophilic polymer).

As used herein, the term "non-covalently bound" refers to binding in which the bonds are non-covalent bonds (e.g., weak bonds such as hydrogen bonds, electrostatic effects, π-effects, hydrophobic effects and Van der Waals forces).

A hydrophilic polymer, as described herein, can be branched or linear. For example, a polymer can have from 2 to 100 termini (e.g., 2 to 80, 2 to 75, 2 to 60, 2 to 50, 2 to 40, 2 to 35, 2 to 25, 2 to 10, 2 to 5, 4 to 20, 5 to 25, 10 to 50, 25 to 75, 3 to 6, 5 to 15 termini). In some embodiments, a polymer can have from 2 to 5, 4 to 6, 5 to 6, or 3 to 6 termini. In some embodiments, a polymer is linear and therefore has 2 termini. In some embodiments, one termini of a polymer is covalently bonded to surface of the nanodiamond.

A hydrophilic polymer can be, for example, poly(alkylene glycol), poly(oxyethylated polyol), poly(olefinic alcohol), poly(β-hydroxy acid), poly(vinyl alcohol), polyoxazoline, or a copolymer thereof. A polyalkylene glycol includes linear or branched polymeric polyether polyols. Such polyalkylene glycols, include, but are not limited to, polyethylene glycol (PEG), polypropylene glycol, polybutylene glycol, and derivatives thereof. Other exemplary embodiments are listed, for example, in commercial supplier catalogs, such as Shearwater Corporation's catalog "Polyethylene glycol and Derivatives for Biomedical Applications" (2001).

In some embodiments, such polymeric polyether polyols have average molecular weights between about 0.1 kDa to about 100 kDa. For example, such polymeric polyether polyols include, but are not limited to, between about 500 Da and about 100,000 Da or more. The molecular weight of the polymer may be between about 500 Da and about 100,000 Da. For example, a polymer used herein can have a molecular weight of about 100,000 Da, 95,000 Da, 90,000 Da, 85,000 Da, 80,000 Da, 75,000 Da, 70,000 Da, 65,000 Da, 60,000 Da, 55,000 Da, 50,000 Da, 45,000 Da, 40,000 Da, 35,000 Da, 30,000 Da, 25,000 Da, 20,000 Da, 15,000 Da, 10,000 Da, 9,000 Da, 8,000 Da, 7,000 Da, 6,000 Da, 5,000 Da, 4,000 Da, 3,000 Da, 2,000 Da, 1,000 Da, 900 Da, 800 Da, 700 Da, 600 Da, and 500 Da. In some embodiments, the molecular weight of the polymer is between about 500 Da and about 50,000 Da. In some embodiments, the molecular weight of the polymer is between about 500 Da and about 40,000 Da. In some embodiments, the molecular weight of the polymer is between about 1,000 Da and about 40,000 Da. In some embodiments, the molecular weight of the polymer is between about 5,000 Da and about 40,000 Da. In some embodiments, the molecular weight of the polymer is between about 10,000 Da and about 40,000 Da.

In some embodiments, a hydrophilic polymer is a linear or branched poly(ethylene glycol).

In some embodiments, the poly(ethylene glycol) molecule is a linear polymer. Linear PEG can be alkylated (e.g., methylated or ethylated), at one termini, but they can by incorporated to the conjugate of any one of the formulae disclosed herein using the free terminus in the non-derivatized hydroxyl form. The molecular weight of the linear chain PEG may be between about 1,000 Da and about 100,000 Da. For example, a linear chain PEG used herein can have a molecular weight of about 100,000 Da, 95,000 Da, 90,000 Da, 85,000 Da, 80,000 Da, 75,000 Da, 70,000 Da, 65,000 Da, 60,000 Da, 55,000 Da, 50,000 Da, 45,000 Da, 40,000 Da, 35,000 Da, 30,000 Da, 25,000 Da, 20,000 Da, 15,000 Da, 10,000 Da, 9,000 Da, 8,000 Da, 7,000 Da, 6,000 Da, 5,000 Da, 4,000 Da, 3,000 Da, 2,000 Da, and 1,000 Da. In some embodiments, the molecular weight of the linear chain PEG is between about 1,000 Da and about 50,000 Da. In some embodiments, the molecular weight of the linear chain PEG is between about 1,000 Da and about 40,000 Da. In some embodiments, the molecular weight of the linear chain PEG is between about 5,000 Da and about 40,000 Da. In some embodiments, the molecular weight of the linear chain PEG is between about 5,000 Da and about 20,000 Da.

In some embodiments, the poly(ethylene glycol) molecule is a branched polymer. For example, branched PEG can be V-shaped, or T-shaped, depending on the method by which PEG has been synthesized. The molecular weight of the branched chain PEG may be between about 1,000 Da and about 100,000 Da. For example, a branched chain PEG used herein can have a molecular weight of about 100,000 Da, 95,000 Da, 90,000 Da, 85,000 Da, 80,000 Da, 75,000 Da, 70,000 Da, 65,000 Da, 60,000 Da, 55,000 Da, 50,000 Da, 45,000 Da, 40,000 Da, 35,000 Da, 30,000 Da, 25,000 Da, 20,000 Da, 15,000 Da, 10,000 Da, 9,000 Da, 8,000 Da, 7,000 Da, 6,000 Da, 5,000 Da, 4,000 Da, 3,000 Da, 2,000 Da, and 1,000 Da. In some embodiments, the molecular weight of the branched chain PEG is between about 1,000 Da and about 50,000 Da. In some embodiments, the molecular weight of the branched chain PEG is between about 1,000 Da and about 40,000 Da. In some embodiments, the molecular weight of the branched chain PEG is between about 5,000 Da and about 40,000 Da. In some embodiments, the molecular weight of the branched chain PEG is between about 5,000 Da and about 20,000 Da.

In some embodiments, the polyethylene glycol (linear or branched) has an average molecular weight from about 500 Da to about 40,000 Da, from about 1,000 Da to about 30,000 Da, from about 1,000 Da to about 20,000 Da, from about 5,000 Da to about 20,000 Da.

In some embodiments, the hydrophilic polymer (e.g., the polyethylene glycol) as provided herein has the following structural formula:

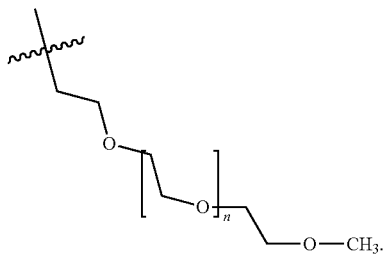

In some embodiments, n is an integer from 1 to 1,000, from 1 to 800, from 1 to 300, or from 1 to 100. In some embodiments, n is selected from 10, 20, 50, 100, 200, 250, 300, 500, 600, and 1000.

In some embodiments, the weight ratio between the modified nanodiamond, the one anticancer agent, and the other anticancer agent in the complex or the particle is from about 10:3:9 to about 10:0.05:0.15. In some embodiments, the ratio is about 10:0.25:0.75.

In some embodiments, the anticancer agent in the nanodiamond complex or the particle is any one of the anticancer agents described herein for the liposomal formulation. Examples include irinotecan and/or curcumin, or a pharmaceutically acceptable salt thereof. The complexes and particles can be administered to a subject in a form of a composition (e.g., a pharmaceutical composition as described herein for the liposomal formulations). The complexes, particles, and pharmaceutical composition are useful to treat cancer (e.g., any one of cancers described herein for the liposomal formulations), such as pancreatic cancer.

Methods of Treatment

In another general aspect, the present disclosure provides a method of treating a cancer in a subject (e.g., a subject in need of treatment), comprising administering to the subject a liposome comprising at least one anti-cancer drug, or a pharmaceutically acceptable salt thereof, or a tumor-targeting liposome comprising at least one anti-cancer drug, or a pharmaceutically acceptable salt thereof, or a pharmaceutical composition comprising the liposome or the tumor-targeting liposome.

In some embodiments, cancer is selected from the group selected from sarcoma, angiosarcoma, fibrosarcoma, rhabdomyosarcoma, liposarcoma, myxoma, rhabdomyoma, fibroma, lipoma, teratoma, lung cancer, bronchogenic carcinoma squamous cell, undifferentiated small cell, undifferentiated large cell, adenocarcinoma, alveolar bronchiolar carcinoma, bronchial adenoma, sarcoma, lymphoma, chondromatous hamartoma, mesothelioma, gastrointestinal cancer, cancer of the esophagus, squamous cell carcinoma, adenocarcinoma, leiomyosarcoma, lymphoma, cancer of the stomach, carcinoma, lymphoma, leiomyosarcoma, cancer of the pancreas, ductal adenocarcinoma, insulinoma, glucagonoma, gastrinoma, carcinoid tumor, vipoma, cancer of the small bowel, adenocarcinoma, lymphoma, carcinoid tumors, Kaposi's sarcoma, leiomyoma, hemangioma, lipoma, neurofibroma, fibroma, cancer of the large bowel or colon, tubular adenoma, villous adenoma, hamartoma, leiomyoma, genitourinary tract cancer, cancer of the kidney adenocarcinoma, Wilm's tumor (nephroblastoma), lymphoma, leukemia, cancer of the bladder, cancer of the urethra, squamous cell carcinoma, transitional cell carcinoma, cancer of the prostate, cancer of the testis, seminoma, teratoma, embryonal carcinoma, teratocarcinoma, choriocarcinoma, sarcoma, interstitial cell carcinoma, fibroma, fibroadenoma, adenomatoid tumors, lipoma, liver cancer, hepatoma hepatocellular carcinoma, cholangiocarcinoma, hepatoblastoma, angiosarcoma, hepatocellular adenoma, hemangioma, bone cancer, osteogenic sarcoma (osteosarcoma), fibrosarcoma, malignant fibrous histiocytoma, chondrosarcoma, Ewing's sarcoma, malignant lymphoma (reticulum cell sarcoma), multiple myeloma, malignant giant cell tumor, chordoma, osteochrondroma (osteocartilaginous exostoses), benign chondroma, chondroblastoma, chondromyxofibroma, osteoid osteoma giant cell tumor, nervous system cancer, cancer of the skull, osteoma, hemangioma, granuloma, xanthoma, osteitis deformans, cancer of the meninges meningioma, meningiosarcoma, gliomatosis, cancer of the brain, astrocytoma, medulloblastoma, glioma, ependymoma, germinoma (pinealoma), glioblastoma multiforme, oligodendroglioma, schwannoma, retinoblastoma, congenital tumors, cancer of the spinal cord, neurofibroma, meningioma, glioma, sarcoma, gynecological cancer, cancer of the uterus, endometrial carcinoma, cancer of the cervix, cervical carcinoma, pre tumor cervical dysplasia, cancer of the ovaries, ovarian carcinoma, serous cystadenocarcinoma, mucinous cystadenocarcinoma, unclassified carcinoma, granulosa-theca cell tumor, Sertoli Leydig cell tumor, dysgerminoma, malignant teratoma, cancer of the vulva, squamous cell carcinoma, intraepithelial carcinoma, adenocarcinoma, fibrosarcoma, melanoma, cancer of the vagina, clear cell carcinoma, squamous cell carcinoma, botryoid sarcoma, embryonal rhabdomyosarcoma, cancer of the fallopian tubes, hematologic cancer, cancer of the blood, acute myeloid leukemia (AML), chronic myeloid leukemia (CML), acute lymphoblastic leukemia (ALL), chronic lymphoblastic leukemia, chronic lymphocytic leukemia, myeloproliferative diseases, multiple myeloma, myelodysplastic syndrome, Hodgkin's lymphoma, non-Hodgkin's lymphoma (malignant lymphoma), Waldenstrom's macroglobulinemia, skin cancer, malignant melanoma, basal cell carcinoma, squamous cell carcinoma, Kaposi's sarcoma, moles dysplastic nevi, lipoma, angioma, dermatofibroma, keloids, psoriasis, adrenal gland cancer, and neuroblastoma.

In some embodiments, the cancer is selected from kidney cancer, pancreatic cancer, breast cancer, brain cancer, melanoma, and hematological cancer. In some embodiments, cancer is brain cancer. In some embodiments, the brain cancer is glioblastoma. In some embodiments, the cancer is kidney cancer. In some embodiments, the kidney cancer is renal cell carcinoma. In some embodiments, the cancer is pancreatic cancer. In some embodiments, the cancer is pancreatic ductal adenocarcinoma.

Pharmaceutical Compositions and Formulations

This document also provides pharmaceutical compositions comprising an effective amount of a liposome disclosed herein, and a pharmaceutically acceptable carrier. The pharmaceutical composition also can comprise any one of the additional therapeutic agents and/or therapeutic molecules described herein. The carrier(s) are "acceptable" in the sense of being compatible with the other ingredients of the formulation and, in the case of a pharmaceutically acceptable carrier, not deleterious to the recipient thereof in an amount used in the medicament.

Pharmaceutically acceptable carriers, adjuvants, and vehicles that can be used in the pharmaceutical compositions provided herein include, without limitation, ion exchangers, alumina, aluminum stearate, lecithin, serum proteins (e.g., human serum albumin), buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol, and wool fat.

The compositions or dosage forms can contain any one or more of the liposomes described herein in the range of 0.005 percent to 100 percent with the balance made up from the suitable pharmaceutically acceptable carriers or excipients. The contemplated compositions can contain from about 0.001 percent to about 100 percent (e.g., from about 0.1 percent to about 95 percent, from about 75 percent to about 85 percent, or from about 20 percent to about 80 percent) of any one of the liposomes provided herein, wherein the balance can be made up of any pharmaceutically acceptable carrier or excipient described herein, or any combination of these carriers or excipients.

Routes of Administration and Dosage Forms

The liposomes provided herein (e.g., a composition containing one or more liposomes) can include those suitable for any acceptable route of administration. Acceptable routes of administration include, without limitation, buccal, cutaneous, endocervical, endosinusial, endotracheal, enteral, epidural, interstitial, intra-abdominal, intra-arterial, intrabronchial, intrabursal, intracerebral, intracisternal, intracoronary, intradermal, intracranial, intraductal, intraduodenal, intradural, intraepidermal, intraesophageal, intragastric, intragingival, intraileal, intralymphatic, intramedullary, intrameningeal, intramuscular, intranasal, intraovarian, intraperitoneal, intraprostatic, intrapulmonary, intrasinal, intraspinal, intrasynovial, intratesticular, intrathecal, intratubular, intratumoral, intrauterine, intravascular, intravenous, nasal, nasogastric, oral, parenteral, percutaneous, peridural, rectal, respiratory (inhalation), subcutaneous, sublingual, submucosal, topical, transdermal, transmucosal, transtracheal, ureteral, urethral, vaginal, intravitreal, subretinal or other intraocular routes of administrations.

Compositions and formulations described herein can conveniently be presented in a unit dosage form, e.g., tablets, sustained release capsules, and can be prepared by any methods well known in the art of pharmacy. See, for example, Remington: The Science and Practice of Pharmacy, Lippincott Williams & Wilkins, Baltimore, MD (20th ed. 2000). Such preparative methods include, without limitation, the step of bringing into association with the molecule to be administered ingredients such as a carrier that constitutes one or more accessory ingredients. In general, the compositions can be prepared by uniformly and intimately bringing into association the active ingredients with liquid carriers, or finely divided solid carriers, or both, and then, if necessary, shaping the product.

In some embodiments, any one or more of the liposomes or formulations containing the liposomes described herein can be administered orally. Compositions described herein that are suitable for oral administration can be presented as discrete units such as capsules, sachets, granules, or tablets each containing a predetermined amount (e.g., effective amount) of the active ingredient(s); a powder or granules; a solution or a suspension in an aqueous liquid or a non-aqueous liquid; an oil-in-water liquid emulsion; a water-in-oil liquid emulsion; packed in liposomes; or as a bolus. Soft gelatin capsules can be useful for containing such suspensions, which can beneficially increase the rate of compound absorption. In the case of tablets for oral use, carriers that are commonly used include, without limitation, lactose, sucrose, glucose, mannitol, silicic acid, and starches. Other acceptable excipients can include, without limitation, (a) fillers or extenders such as starches, lactose, sucrose, glucose, mannitol, and silicic acid, (b) binders such as carboxymethylcellulose, alginates, gelatin, polyvinylpyrrolidone, sucrose, and acacia, (c) humectants such as glycerol, (d) disintegrating agents such as agar-agar, calcium carbonate, potato or tapioca starch, alginic acid, certain silicates, and sodium carbonate, (e) solution retarding agents such as paraffin, (f) absorption accelerators such as quaternary ammonium compounds, (g) wetting agents such as cetyl alcohol and glycerol monostearate, (h) absorbents such as kaolin and bentonite clay, and (i) lubricants such as talc, calcium stearate, magnesium stearate, solid polyethylene glycols, sodium lauryl sulfate, and mixtures thereof. For oral administration in a capsule form, useful diluents include, without limitation, lactose and dried cornstarch. When aqueous suspensions are administered orally, the liposomes can be combined with emulsifying and suspending agents. If desired, certain sweetening and/or flavoring and/or coloring agents can be added. Compositions suitable for oral administration include, without limitation, lozenges comprising ingredients in a flavored basis, usually sucrose and acacia or tragacanth; and pastilles comprising the active ingredient(s) in an inert basis such as gelatin and glycerin, or sucrose and acacia.

Compositions suitable for parenteral administration include, without limitation, aqueous and non-aqueous sterile injection solutions or infusion solutions that may contain antioxidants, buffers, bacteriostats, and solutes that render the formulation isotonic with the blood of the intended recipient; and aqueous and non-aqueous sterile suspensions that may include suspending agents and thickening agents. The formulations can be presented in unit-dose or multi-dose containers, for example, sealed ampules and vials, and may be stored in a freeze dried (lyophilized) condition requiring only the addition of the sterile liquid carrier, for example water, for injections, saline (e.g., 0.9% saline solution), or 5% dextrose solution, immediately prior to use. Extemporaneous injection solutions and suspensions can be prepared from sterile powders, granules, and tablets. The injection solutions can be in the form of, for example, a sterile injectable aqueous or oleaginous suspension. This suspension can be formulated according to techniques known in the art using suitable dispersing or wetting agents and suspending agents. A sterile injectable preparation also can be a sterile injectable solution or suspension in a non-toxic parenterally-acceptable diluent or solvent, for example, as a solution in 1,3-butanediol. Among the acceptable vehicles and solvents that can be employed are mannitol, water, Ringer's solution, and isotonic sodium chloride solution. In addition, sterile, fixed oils can be used as a solvent or suspending medium. For this purpose, any bland fixed oil can be used including, without limitation, synthetic mono- or diglycerides. Fatty acids such as oleic acid and its glyceride derivatives can be used to prepare injectables. In some cases, natural pharmaceutically acceptable oils such as olive oil or castor oil, especially in their polyoxyethylated versions, can be used to prepare injectables. These oil solutions or suspensions also can contain a long-chain alcohol diluent or dispersant.

In some cases, a liposome and/or pharmaceutical composition provided herein can be administered in the form of suppository for rectal administration. These compositions can be prepared by mixing a compound described herein (e.g., a compound of Formula (I), or a pharmaceutically acceptable salt thereof) with a suitable non-irritating excipient that is solid at room temperature but liquid at the rectal temperature and therefore will melt in the rectum to release the active component(s). Such materials include, without limitation, cocoa butter, beeswax, and polyethylene glycols.

In some cases, a liposome and/or pharmaceutical composition provided herein can be administered by nasal aerosol or inhalation. Such compositions can be prepared according to techniques well known in the art of pharmaceutical formulation and can be prepared as solutions in saline, employing benzyl alcohol or other suitable preservatives, absorption promoters to enhance bioavailability, fluorocarbons, and/or other solubilizing or dispersing agents known in the art. See, for example, U.S. Pat. No. 6,803,031. Additional formulations and methods for intranasal administration are found in Ilium, L., *J. Pharm. Pharmacol.,* 56:3-17 (2004); and Ilium, L., *Eur. J. Pharm. Sci.,* 11:1-18 (2000).

In some cases, a liposome and/or pharmaceutical composition provided herein can be prepared as a topical composition and used in the form of an aerosol spray, cream, emulsion, solid, liquid, dispersion, foam, oil, gel, hydrogel, lotion, mousse, ointment, powder, patch, pomade, solution, pump spray, stick, towelette, soap, or other forms commonly employed in the art of topical administration and/or cosmetic and skin care formulation. The topical compositions can be in an emulsion form. Topical administration of a liposome and/or pharmaceutical composition provided herein can be useful when the desired treatment involves areas or organs readily accessible by topical application. In some cases, a topical composition can include a combination of any one or more of the liposomes, and one or more additional ingredients, carriers, excipients, or diluents including, without limitation, absorbents, anti-irritants, anti-acne agents, preservatives, antioxidants, coloring agents/pigments, emollients (moisturizers), emulsifiers, film-forming/holding agents, fragrances, leave-on exfoliants, prescription drugs, preservatives, scrub agents, silicones, skin-identical/repairing agents, slip agents, sunscreen actives, surfactants/detergent cleansing agents, penetration enhancers, and thickeners.

In some cases, one or more liposomes described herein can be incorporated into a composition for coating an implantable medical device such as a prosthesis, artificial valve, vascular graft, stent, or catheter. Suitable coatings and the general preparation of coated implantable devices are known in the art and are exemplified in U.S. Pat. Nos. 6,099,562; 5,886,026; and 5,304,121. The coatings can be biocompatible polymeric materials such as a hydrogel polymer, polymethyldisiloxane, polycaprolactone, polyethylene glycol, polylactic acid, ethylene vinyl acetate, or mixture thereof. In some cases, the coating can optionally be further covered by a suitable topcoat of fluorosilicone, polysaccharides, polyethylene glycol, phospholipids or combinations thereof to impart controlled release characteristics in the composition.

Dosages and Regimens

A composition (e.g., pharmaceutical compositions provided herein) containing a liposome containing at least one anti-cancer drug can include that anti-cancer drug(s) in an effective amount (e.g., a therapeutically effective amount).

Effective doses can vary, depending on the disease, disorder, or condition being treated (or prevented), the severity of the disease, disorder, or condition, the route of administration, the sex, age and general health condition of the subject, excipient usage, the possibility of co-usage with other therapeutic treatments such as use of other agents, and the judgment of the treating physician.

In some embodiments, an effective amount of an anti-cancer drug(s), or a pharmaceutically acceptable salt thereof, can range, for example, from about 0.1 mg to about 1000 mg. In some cases, the effective amount can be from about 0.5 mg to about 500 mg of a compound disclosed herein, or any amount in between these two values, for example, one of about 0.5 mg, about 1 mg, about 2 mg, about 5 mg, about 10 mg, about 20 mg, about 50 mg, about 100 mg, about 200 mg, about 250 mg, about 300 mg, about 400 mg, or about 500 mg. The effective amount can be an amount sufficient to alleviate or reduce one or more of the symptoms associated with a disease, disorder, or condition being treated (or prevented) as described herein.

In some cases, an effective amount of an anti-cancer drug(s), or a pharmaceutically acceptable salt thereof, can range, for example, from about 0.001 mg/kg to about 500 mg/kg (e.g., from about 0.001 mg/kg to about 200 mg/kg; from about 0.01 mg/kg to about 200 mg/kg; from about 0.01 mg/kg to about 150 mg/kg; from about 0.01 mg/kg to about 100 mg/kg; from about 0.01 mg/kg to about 50 mg/kg; from about 0.01 mg/kg to about 10 mg/kg; from about 0.01 mg/kg to about 5 mg/kg; from about 0.01 mg/kg to about 1 mg/kg; from about 0.01 mg/kg to about 0.5 mg/kg; from about 0.01 mg/kg to about 0.1 mg/kg; from about 0.1 mg/kg to about 200 mg/kg; from about 0.1 mg/kg to about 150 mg/kg; from about 0.1 mg/kg to about 100 mg/kg; from about 0.1 mg/kg to about 50 mg/kg; from about 0.1 mg/kg to about 10 mg/kg; from about 0.1 mg/kg to about 5 mg/kg; from about 0.1 mg/kg to about 2 mg/kg; from about 0.1 mg/kg to about 1 mg/kg; from about 0.1 mg/kg to about 0.5 mg/kg, or from about 0.5 mg/kg to about 500 mg/kg).

In some cases, an effective amount of an anti-cancer drug(s), or a pharmaceutically acceptable salt thereof, can be about 0.1 mg/kg, about 0.5 mg/kg, about 1 mg/kg, about 2 mg/kg, or about 5 mg/kg.

The foregoing dosages can be administered on a daily basis (e.g., as a single dose or as two or more divided doses, e.g., once daily, twice daily, thrice daily) or on a non-daily basis (e.g., every other day, every two days, every three days, once weekly, twice weekly, once every two weeks, or once a month). In some cases, the dosages can be administered every 4 hours, 6 hours, 8 hours, 12 hours, or 24 hours.

Kits

This document also provides pharmaceutical kits useful, for example, to treat or prevent a disease, disorder, or condition referred to herein. Such pharmaceutical kits can include one or more containers containing a pharmaceutical composition that includes a therapeutically effective amount of an anti-cancer drug within a liposome. In some cases, such kits can further include, if desired, one or more of various conventional pharmaceutical kit components such as containers with one or more pharmaceutically acceptable carriers. Instructions, either as inserts or as labels, indicating quantities of the components to be administered, guidelines for administration, and/or guidelines for mixing the components also can be included in a kit provided herein. In some embodiments, the kit comprising at least one additional therapeutic agent as described herein, or a pharmaceutically acceptable salt thereof, or a pharmaceutical composition comprising same.

Combination Therapies

In some cases, one or more liposomes containing an anti-cancer drug(s) can be combined with one or more additional therapies to treat cancer. Examples of such therapies include radiation therapy, surgical removal of cancer, and a chemotherapy administered by means other than liposomes of the present application.

Suitable examples of additional chemotherapeutic agents that can be administered with the liposomes of the present disclosure include folic acid antagonists, pyrimidine analogs, purine analogs, adenosine deaminase inhibitors, methotrexate, 5-fluorouracil, floxuridine, cytarabine, 6-mercaptopurine, 6-thioguanine, fludarabine phosphate, pentostatine, gemcitabine, nitrogen mustards, ethylenimine derivatives, alkyl sulfonates, nitrosoureas, triazenes, uracil mustard, chlormethine, cyclophosphamide, ifosfamide, melphalan, chlorambucil, pipobroman, triethylene-melamine, triethylenethiophosphoramine, busulfan, carmustine, lomustine, streptozocin, dacarbazine, and temozolomide.

Additional examples of therapeutic molecules that can be used in combination with liposomes provided herein include, without limitation, anti-inflammatory agents (e.g., NSAIDs, steroids and antibodies against IL-6 or TNF-alpha) and antimicrobial agents (e.g., antibiotics, anti-mycobacterial drugs, and anti-viral agents).

One or more liposomes and formulations containing same, and the one or more chemotherapeutic molecules can be administered to a patient in any order or simultaneously. If simultaneously administered, they can be provided in a single, unified, form or in multiple forms (e.g., either as a single pill or as two separate pills). One of the items can be given in multiple doses, or both can be given as multiple doses. If not simultaneous, the timing between the multiple doses can vary from more than zero weeks to less than four weeks.

Definitions

Unless defined otherwise, all technical and scientific terms used herein have the same meaning as is commonly understood by one of ordinary skill in the art to which this disclosure belongs.

As used herein, the singular forms "a," "an," and "the" include plural referents unless the context clearly dictates otherwise.

As used herein, the term "about" means "approximately" (e.g., plus or minus approximately 10% of the indicated value).

The term "compound" as used herein is meant to include all stereoisomers, geometric isomers, tautomers, and isotopes of the structures depicted. Compounds herein identified by name or structure as one particular tautomeric form are intended to include other tautomeric forms unless otherwise specified.

Throughout the definitions, the term "$C_{n-m}$" indicates a range which includes the endpoints, wherein n and m are integers and indicate the number of carbons. Examples include $C_{1-4}$, $C_{1-6}$, and the like.

As used herein, the term "$C_{n-m}$ alkyl", employed alone or in combination with other terms, refers to a saturated hydrocarbon group that may be straight-chain or branched, having n to m carbons. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, and the like. In some embodiments, the alkyl group contains from 1 to 6 carbon atoms, from 1 to 4 carbon atoms, from 1 to 3 carbon atoms, or 1 to 2 carbon atoms.

As used herein, the term "$C_{n-m}$ alkylene", employed alone or in combination with other terms, refers to a divalent alkyl linking group having n to m carbons. Examples of alkylene groups include, but are not limited to, ethan-1,1-diyl, ethan-1,2-diyl, propan-1,1,-diyl, propan-1,3-diyl, propan-1,2-diyl, butan-1,4-diyl, butan-1,3-diyl, butan-1,2-diyl, 2-methyl-propan-1,3-diyl, and the like. In some embodiments, the alkylene moiety contains 2 to 6, 2 to 4, 2 to 3, 1 to 6, 1 to 4, or 1 to 2 carbon atoms.

As used herein, "$C_{n-m}$ alkenyl" refers to an alkyl group having one or more double carbon-carbon bonds and having n to m carbons. Example alkenyl groups include, but are not limited to, ethenyl, n-propenyl, isopropenyl, n-butenyl, sec-butenyl, and the like. In some embodiments, the alkenyl moiety contains 2 to 6, 2 to 4, or 2 to 3 carbon atoms.

As used herein, the term "amino acid" generally refers to organic compounds containing amine (—$NH_2$) and carboxyl (—COOH) functional groups, along with a side chain (R group) specific to each amino acid. The side chain may be hydrophobic or hydrophilic, charged or neutral, as well as aliphatic or aromatic. In natural amino acids, the amine and carboxyl functional groups attached to the same carbon atom, i.e., an amino group is attached to the carbon in α-position relative to carboxyl group. Any of the amino acids described herein may be in L configuration or in D configuration. In some embodiments, the amino acid is in L configuration. In some embodiments, the amino acid is in D configuration. The 20 natural amino acids are abbreviated herein as shown in Table A:

TABLE A

| Three-letter abbreviation | One-letter abbreviation | Amino acid name |
| --- | --- | --- |
| Ala | A | Alanine |
| Arg | R | Arginine |
| Asn | N | Asparagine |
| Asp | D | Aspartic acid |
| Cys | C | Cysteine |
| Gln | Q | Glutamine |
| Glu | E | Glutamic acid |
| Gly | G | Glycine |
| His | H | Histidine |
| Ile | I | Isoleucine |
| Leu | L | Leucine |
| Lys | K | Lysine |
| Met | M | Methionine |
| Phe | F | Phenylalanine |
| Pro | P | Proline |
| Ser | S | Serine |
| Thr | T | Threonine |
| Trp | W | Tryptophan |
| Tyr | Y | Tyrosine |
| Val | V | Valine |

The term "particle" as used herein refers to a composition having a size from about 1 nm to about 1000 μm.

The term "nanoparticle" as used herein refers to a particle having a size (e.g., equivalent spherical diameter) from about 1 nm to about 1000 nm.

The term "liposome size" as used herein refers to the median size in a distribution of the liposomes. The median size is determined from the average linear dimension of individual liposomes, for example, the diameter of a spherical liposome.

Size may be determined by any number of methods in the art, including dynamic light scattering (DLS) and transmission electron microscopy (TEM) techniques.

The terms "incorporation efficiency" or "encapsulation efficiency" as used herein refer to the ratio of the amount of anti-cancer drug that is incorporated into the liposome of the present disclosure to the initial amount of the anti-cancer drug used in preparation of the liposome.

The terms "loading capacity" and "loading efficiency" are used herein interchangeably and refer to the fraction of the amount of the anti-cancer drug that is encapsulated in the liposome to the amount of other components of the liposome (e.g., lipids of the bilayer).

As used herein, the term "aqueous solvent" refer to a liquid comprising at least 50%, at least 60%, at least 70%, at least 90% or at least 95% of water. In some embodiments, aqueous solvent is water. In some embodiments, aqueous solvent is a buffer solution (e.g., 50% Dulbecco's Phosphate-Buffered Saline (PBS)).

As used herein, "room temperature" refers to ambient indoor temperature, typically a temperature from about 15° C. to about 25° C. In some embodiments, room temperature is 18° C.

As used herein, the term "cell" is meant to refer to a cell that is in vitro, ex vivo or in vivo. In some embodiments, an ex vivo cell can be part of a tissue sample excised from an organism such as a mammal. In some embodiments, an in vitro cell can be a cell in a cell culture. In some embodiments, an in vivo cell is a cell living in an organism such as a mammal. In some embodiments, the cell is a red blood cell. In some embodiments, the cell is a myocardial cell. In some embodiments, the cell is a nerve cell (e.g., a neuron).

As used herein, the term "contacting" refers to the bringing together of indicated moieties in an in vitro system or an in vivo system. For example, "contacting" the MIF with a compound of the invention includes the administration of a compound of the present invention to an individual or patient, such as a human, having MIF, as well as, for example, introducing a compound of the invention into a sample containing a cellular or purified preparation containing the MIF.

As used herein, the term "individual", "patient", or "subject" used interchangeably, refers to any animal, including mammals, preferably mice, rats, other rodents, rabbits, dogs, cats, swine, cattle, sheep, horses, or primates, and most preferably humans. A patient "in need of treatment", as used herein, refers to a patient that is being diagnosed as having cancer by a treating physician. In some embodiments, a method of treating a patient "in need thereof" includes a step of diagnosing the patient with cancer. This may include, for example, a biopsy procedure. During biopsy, a physician (e.g., a treating physician) removes a small amount of tissue to examine under a microscope to determine whether the tissue is a cancerous tumor (e.g., malignant tumor).

As used herein, the phrase "effective amount" or "therapeutically effective amount" refers to the amount of active compound or pharmaceutical agent that elicits the biological or medicinal response in a tissue, system, animal, individual or human that is being sought by a researcher, veterinarian, medical doctor or other clinician.

As used herein the term "treating" or "treatment" refers to 1) inhibiting the disease; for example, inhibiting a disease, condition or disorder in an individual who is experiencing or displaying the pathology or symptomatology of the disease, condition or disorder (i.e., arresting further development of the pathology and/or symptomatology), or 2) ameliorating the disease; for example, ameliorating a disease, condition or disorder in an individual who is experiencing or displaying the pathology or symptomatology of the disease, condition or disorder (i.e., reversing the pathology and/or symptomatology).

As used herein, the term "preventing" or "prevention" of a disease, condition or disorder refers to decreasing the risk of occurrence of the disease, condition or disorder in a subject or group of subjects (e.g., a subject or group of subjects predisposed to or susceptible to the disease, condition or disorder). In some embodiments, preventing a disease, condition or disorder refers to decreasing the possibility of acquiring the disease, condition or disorder and/or its associated symptoms. In some embodiments, preventing a disease, condition or disorder refers to completely or almost completely stopping the disease, condition or disorder from occurring.

EXAMPLES

Materials and Methods

Reagents: Phospholipids including DOPC and DSPE-PEG-OMe were purchased from Avanti Polar Lipids. Cholesterol was purchased from sigma. Cell Culture: 786-O, A498, AsPC-1, PANC-1 cells were purchased from American Type Culture Collection. No authentication of the cell lines was done by the authors. 786-O, A498 and PANC-1 Cells were maintained in Dulbecco's Modified Eagle Medium (DMEM; Life Technologies) supplemented with 10% FBS (Fisher Scientific) and 1% penicillin-streptomycin (Invitrogen) at 37° C. in a humidified atmosphere with 5% $CO_2$. AsPC-1 cells were maintained in RPMI-1640 medium (Life Technologies) supplemented with 10% FBS (Fisher Scientific) and 10% penicillin-streptomycin (Invitrogen) at 37° C. in a humidified atmosphere with 5% $CO_2$. Cultures of 85% to 90% confluency were used for all of the experiments.

Synthesis of tumor-targeting-peptide (TTP)-conjugated lipopeptide: Novel TTP-conjugated lipopeptide was synthesized using Fmoc-strategy based solid phase peptide synthesis method.

Preparation of empty liposomes: Liposomes were prepared by a modified ethanol injection method. An ethanolic solution of required amounts of TTP-conjugated lipopeptide, phospholipids and cholesterol was warmed in a 65° C. water bath for 5 minutes and injected slowly into milli-Q water pre-heated to 65° C. under vortex. Spontaneous liposome formation occurred as soon as ethanolic lipid solution was in contact with the aqueous phase. Vortex was continued for another 1 minute at room temperature. Then, ethanol and a part of water were removed by rotary evaporation under reduced pressure and volume was made up with milli-Q water.

Preparation of drug-loaded liposomes: Drug-loaded liposomes were prepared as described above. The hydrophilic drug (e.g. vinorelbine, Gemcitabine) was added to the aqueous phase, while the lipophilic drug (e.g. everolimus, paclitaxel) was added to the ethanolic solution of lipids. Both single drug and combined drug-loaded liposomes were prepared. Unentrapped drugs were removed by amicon ultra centrifugal filters with a cut off size of 3 kD. The obtained liposome concentrates were collected; volume was made up with PBS and the liposomes were stored at 4° C.

Liposome size and zeta potential analysis: Mean hydrodynamic diameter and zeta potential of empty and drug-loaded liposomes were determined by dynamic light scattering (DLS) measurements using a Malvern Zetasizer (Malvern, UK), after sample dilution in deionized water. All measures were performed in triplicate at 25° C.

Analysis of encapsulation efficiency and drug loading efficiency: Liposome-encapsulation efficiency was measured by determining the amount of entrapped drugs. Briefly, the drug-loaded liposome sample was centrifuged in an amicon ultra centrifugal filter with a cut off size of 3 kD in order to separate the unentrapped drug. Total ($T_{drug}$) and unentrapped drug ($UE_{drug}$) amounts were determined by measuring the absorbance at $\lambda_x$ of respective drugs and comparing with corresponding standard curves. The encapsulated drug ($E_{drug}$) amount was calculated by subtracting the amount of unentrapped drugs ($UE_{drug}$) from total drug ($T_{drug}$) amount. The drug-encapsulation efficiency (EE %) was expressed as the percentage of the encapsulated amount ($E_{drug}$) to the total amount ($T_{drug}$). Drug loading efficiency was expressed as the percentage of encapsulated drug ($E_{drug}$) to the total lipid amount ($T_{lipid}$).

In vitro cellular uptake of liposomes: Cell uptake was investigated by using Rhodamine-PE labelled fluorescent liposomes by means of EVOS FL Auto fluorescence microscope. Toward this aim, some liposome suspensions were prepared by adding Rhodamine PE (Avani Polar Lipids) to the organic phase. 786-O and A498 human clear cell renal cell carcinoma (ccRCC) cells were grown on 96 well plates at a density of $1 \times 10^4$ cells/well for 24 hours at 37° C. Then, the cells were incubated in the presence of fluorescent liposomes. A control liposome (CL) without any targeting peptide was used to discern the targeting efficiency. After 4 hours of incubation in the presence of the fluorescent liposomes, the cells were rinsed with PBS (pH 7.4) twice and then overlaid with 100 μL PBS. The cells were immediately imaged with EVOS FL Auto fluorescent microscope under bright field and red channel.

In vitro cytotoxicity assay: Approximately, $5 \times 10^3$ cells were seeded in 96-well plates. After 24 hours, cells were treated with increasing doses of empty liposome or liposomes containing everolimus, vinorelbine and a combination thereof diluted in respective media and incubated for further 72 hours. At the end of the incubation, cell viability was measured using Celltiter 96 Aqueous One Solution Cell Proliferation Assay (Promega) as per the manufacturer's protocol. Briefly, the media containing the treatments were aspirated from the plate and washed with PBS. Then 100 μL media containing 20 μL One Solution reagent was added to each well. The plate was incubated at 37° C. for 30 minutes and absorbance at 492 nm was measured using Spectramax i3x. Percentage viability is calculated as follows: Viability (%)=$100 \times (A_{Treated} - A_{Blank})/(A_{untreated} - A_{Blank})$.

In vivo biodistribution of liposomes: Six- to eight-week-old male SCID mice were obtained from in house breeding and housed in the institutional animal facilities. All animal work was performed under protocols approved by the Mayo Clinic Institutional Animal Care and Use Committee. To establish tumor growth in mice, $5 \times 10^6$ 786-O or A498 cells, resuspended in 100 μL of 50% matrigel in PBS, were injected subcutaneously into the right flank. Tumors were allowed to grow for 6-7 weeks without treatment until the average size of tumors reached 300-500 mm³. Then either control (CL) or targeted (TL) liposomes containing IR-780-Dye were administered via intravenous route. Mice were imaged using IVIS imager 24 and 48 hours after administration. Finally, mice were sacrificed; tumors and major organs were collected and imaged. Similar biodistribution experiments were performed in orthotopic pancreatic tumor and glioblastoma multiforme (GBM)-bearing mice.

In vivo single mouse trial (SMT): A single mouse trial was used to assess the in vivo tumor regression efficacy of the drug-loaded liposomes in 786-O xenografts as described previously. Mice with ~300-500 mm³ tumors were treated with empty liposome, liposome containing everolimus, vinorelbine and a combination thereof three times a week via intravenous route. The liposome amount among treatments was kept constant in such a way that the E-Liposome and EV-Liposome treated mouse gets 20 μg of Everolimus each. Tumors were measured weekly and plotted to obtain a tumor growth curve. After completion of experiment, all tumor-bearing mice were euthanized with $CO_2$; tumors were removed, weighed, and prepared for immunochemistry. The single mouse trial with key treatment groups was repeated in A498 xenografts. A single mouse trial has also been performed in orthotopic AsPC-1 xenografts with liposomes having the following drugs and their combinations-Gemcitabine (G), Paclitaxel (P), Erlotinib (E), and XL-184 (X), a c-met inhibitor.

In vivo tumor regression experiment: To validate the results obtained from the SMT, the experiment in 786-O tumor bearing mice with 5 mice per group was repeated. However, empty liposome and V-Liposome from the validation study were omitted since significant tumor regression in those mice in SMT was not observed. Immunohistochemistry: Tumors and organs were removed and fixed in neutral buffered 10% formalin at room temperature for 24 hours before embedding in paraffin and sectioning. Sections were deparaffinized and then subjected to hematoxylin and eosin (H&E), Kspcadherin, and Ki67 immunochemistry according to the manufacturer's instructions (DAB 150; Millipore). Stable diaminobenzidine was used as a chromogen substrate, and the sections were counterstained with a hematoxylin solution. Photographs of the entire cross-section were digitized using Aperio AT2 slide scanner (Leica). Images were analyzed using Imagescope software (Leica).

Example 1—Experimental Results

Preparation of Tumor-Targeting Lipopeptides:

Preparation of the lipopeptides were performed using standard Fmoc-based solid-phase peptide synthesis (SPPS) methods, as illustrated by the following. Pre-loaded Fmoc-Cys (Acm)-Wang resin was swollen in DMF for 30 min, then drained. This was followed by initial Fmoc deprotection (20% piperidine/DMF, shaken for 2×15 min; drained; washed, shaken for 1 min with 3×DMF with 2×methanol and finally with 2×DMF).

After DMF wash, sequential coupling of the remaining residues began starting with Fmoc-Pro-OH. This involved adding the appropriate Fmoc amino acid (2-fold excess) pre-activated with HBTU (2-fold excess); HOBT (2-fold excess) and DIPEA (4-fold excess) in DMF to the resin. Finally, the loaded resin was allowed to swollen for 3 h. After DMF wash (shaken for 1 min; drained, repeated twice) the previous piperidine deprotection conditions were used. These steps were repeated for each added amino acid. For secondary amine having amino acid like proline next amino acid reaction was done twice for better yield. After completing the sequence, S—S cyclisation reaction was performed using TTA (2-fold excess) in DMF for 1 h and repeated twice; washed with DMF, DCM, methanol and finally again DMF. Last amino acid (Fmoc-Lys (Boc)-OH reaction was done similarly above mentioned sequential procedure.

The resin is treated with Fmoc-(PEG)$_4$-COOH (3-fold excess) that was pre-activated with HBTU (3-fold excess), HOBT (2-fold excess), and DIPEA (6-fold excess) in DMF, and the resin was allowed to swell overnight. The resin was washed by shaking for 1 min with 3×DMF with 2×methanol and finally with 2×DMF.

After final Fmoc deprotection, the resin was reacted with succinic anhydride (4-fold excess) and DMAP (4-fold excess) overnight. The resin containing terminal succinic acid group was activated with HBTU (2-fold excess), treated with HOBT (2-fold excess) and DIPEA (4-fold excess) in DMF for 30 min, and then with a lipid (N,N-di-n-octadecyl-N-2-aminoethylamine) (2-fold excess). The resin was allowed to swell overnight. As a final step, the resin was sequentially washed with DMF, methanol, and DCM (3× each).

Peptide removal from the resin with global deprotection was accomplished by treating resin with a resin cleavage solution consisting of TFA, water, thioanisole and triisopropylsilane, in a volume ratio of 85:5:5:5 for 4 h while cooling with ice. The volatile components were removed with nitrogen flush and under reduced pressure to afford crude solid peptide. Crude deprotected peptide was purified by ether precipitation to remove soluble impurities. The poorly soluble lipopeptide was collected by centrifugation and resuspended in methanol before use.

Preparation of Liposomes:

Liposomes (empty or drug-loaded) were prepared as described above. The below table summarizes composition of liposomes prepared by the methods described in this application.

TABLE

Liposome lipid composition

|   | $^1$A | $^2$B | $^3$C | $^4$D | $^5$E | $^6$F |
|---|------|------|------|------|------|------|
| 1 | 1 | 0.25 | — | — | — | 0.1 |
|   | 1 | 0.25 | — | — | 0.01 | 0.1 |
| 2 | 1 | 0.5 | — | — | 0.01 | 0.05 |
| 3 | 1 | 0.1 | 0.25 | — | 0.01 | 0.1 |
| 4 |   | 0.1 | — | 1 | 0.01 | 0.1 |
| 5 | 1 |     | 0.25 | — | 0.01 | 0.1 |
| 6 | 1 | 0.1 | 0.25 | — | 0.01 | 0.1 |
| 7 | 1 | — | — | 0.25 | 0.01 | 0.1 |
| 8 | 0.75 | 0.25 | 0.25 | — | 0.01 | 0.1 |
| 9 | 0.75 | 0.25 | — | 0.25 | 0.01 | 0.1 |
| 10 | 0.25 | 0.1 | 0.75 | — | 0.01 | 0.1 |

$^1$A: DOPC (mM)
$^2$B: CHOL (mM)
$^3$C: DOPE (mM)
$^4$D: DPPC (mM)
$^5$E: DSPE-PEG2000-OMe (mM)
$^6$F: Lipopeptide (mM)

Characterization of liposomes: The physico-chemical characteristics of empty liposome (L) along with liposome containing everolimus (E), vinorelbine (V) and a combination of both (EV) are consolidated in Table 1.

TABLE 1

Characterization of liposomal drug formulations

| No. | Liposome | Size (nm) | PDI | Zeta (mV) |
|---|---|---|---|---|
| 1 | L | 72.73 | 0.178 | 23.1 |
| 2 | E | 70.16 | 0.244 | 12.5 |
| 3 | G | 95.35 | 0.334 | 22.4 |
| 4 | V | 60.91 | 0.160 | 35.26 |
| 5 | EG | 71.86 | 0.351 | 47.53 |
| 6 | EV | 65.95 | 0.198 | 26.6 |

Referring to Table 1, hydrodynamic size, polydispersity index (PDI) and zeta potential of Liposome only (L), or liposomes containing everolimus (E), EG00229 (G), vinorelbine (V), combination of everolimus and EG00229 (EG), and combination of everolimus and vinorelbine (EV). All the measurements were performed in deionized water at 25° C.

The entrapment of drugs caused mostly minor changes in the size and PDI of the liposomes except for encapsulation of everolimus (E) where the PDI of the liposomes increased significantly. On the contrary, encapsulation of vinorelbine (V) or a combination of everolimus and vinorelbine (EV) did not affect the PDI much. Everolimus is water insoluble, so it is entrapped in the liposome bilayer. This results in significant change in the bilayer properties causing higher variability in liposome size distribution that is reflected by an increased polydispersity index. In contrast, vinorelbine, being highly water soluble, is entrapped in the aqueous core of the liposome, thereby not exerting any significant effect on the liposome bilayer. However, the zeta potentials were significantly different among the liposomes. The empty liposomes had a zeta potential of 23.1 mV. Encapsulation of everolimus decreased the zeta potential to 12.5 mV whereas encapsulation of vinorelbine increased to 35.26 mV. The liposomes encapsulating both drugs had more or less similar zeta potential (26.6 mV) compared to the empty liposome.

Encapsulation efficiency and Drug Loading efficiency: The initial lipid and drug amounts along with encapsulation efficiency (EE) and drug loading efficiency values for both single drug-loaded and dual drug-loaded liposomes are consolidated in Tables 2A and 2B (Encapsulation efficiency and drug loading efficiency of the liposomes).

TABLE 2A

| Sample | A$^1$ | B$^2$ | C$^3$ | D$^4$ | E$^5$ | F$^6$ | G$^7$ | H$^8$ |
|---|---|---|---|---|---|---|---|---|
| E | 3.93 | 0.965 | 0.140 | 0.452 | 0.4 |  | 7.29 | 100 |
| V | 3.93 | 0.965 | 0.140 | 0.452 |  | 0.19 | 3.5 | 23.7 |
| EV | 3.93 | 0.965 | 0.140 | 0.452 | 0.4 | 0.19 | 7.29 (E), 3.5 (V) | 100( E), 23.7 (V) |

TABLE 2B

| Sample | A$^1$ | B$^2$ | C$^3$ | D$^4$ | E$^5$ | I$^9$ | G$^7$ | H$^8$ |
|---|---|---|---|---|---|---|---|---|
| E | 3.93 | 0.965 | 0.140 | 0.452 | 0.4 |  | 7.29 | 100 |
| G | 3.93 | 0.965 | 0.140 | 0.452 |  | 0.120 | 2.2 | 30 |
| EG | 3.93 | 0.965 | 0.140 | 0.452 | 0.2 | 0.120 | 3.65 (E), 2.2 (G) | 100 (E), 30 (G) |

$^1$A: DOPC (mg/mL)
$^2$B: Cholesterol (mg/mL)
$^3$C: DSPE(PEG)2000-OMe (mg/mL)
$^4$D: Tumor targeted lipopeptide (TTP) (mg/mL)
$^5$E: Everolimus (V) (mg/mL)
$^6$F: Vinorelbine (V) (mg/mL)
$^7$G: % of Total drug loading w.r.t Total lipid
$^8$H: Encapsulation efficiencies (%)
$^9$I: EG00229 (G) (mg/mL)

Referring to Tables 2A and 2B: encapsulation efficiency and drug loading efficiency of (A) liposomes containing everolimus (E), vinorelbine (V), combination of and combination of everolimus and vinorelbine (EV); and (B) everolimus (E) EG00229 (G), everolimus and EG00229 (EG).

For lipophilic drugs such as everolimus the encapsulation efficiency was ~100% since they are water insoluble and as such incorporated completely in the liposome bilayer. For hydrophilic drugs the encapsulation efficiency varied from 20-30%. For vinorelbine the encapsulation efficiency was 23.7% whereas for EG00229, 30% of the added amount was encapsulated. The drug loading efficiency of everolimus, vinorelbine and EG00229 were 7.29%, 3.5% and 2.2% respectively. The encapsulation efficiency and drug loading efficiency did not change in case of dual drug loading, since the drugs have completely separate spatial distribution inside the liposome and therefore do not compete for accommodation.

In vitro cellular uptake of liposomes in RCC cell lines: in vitro cellular uptake of rhodamine-PE labelled liposomes was then analyzed. As can be seen from FIG. 1, after 4 hours treatment, cellular uptake of the TTP-conjugated liposomes (TL) were considerably higher in both 786-O and A498 RCC cell lines than that of control liposome prepared using same ratio of lipids except TTP-conjugated lipopeptide. This demonstrates the excellent targeting efficiency of TTP-conjugated liposomal formulation.

Figure 2A:
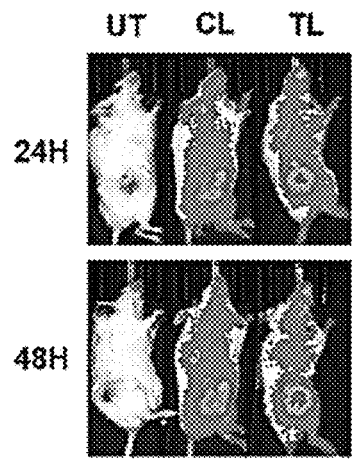
FIG. 2. In vivo biodistribution of IR-780-dye labeled liposomes in RCC xenografts. IVIS imaging showing higher tumor accumulation of IR-780 dye labeled TTP-conjugated liposomes (TL) compared to control liposomes (CL) at 24 h (upper panel) and 48 h (lower panel) after IV administration into mice bearing subcutaneous 786-O (A) and A498 tumors (B). One untreated mouse (UT) was used for background correction. Ex vivo imaging of 786-O (C) and A498 (D) tumors and major organs respectively, harvested at 48 hours demonstrated significant higher tumor uptake of TL compared to CL. Interestingly, significantly higher lung accumulation of CL was observed compared to TL.
Figure 2C:
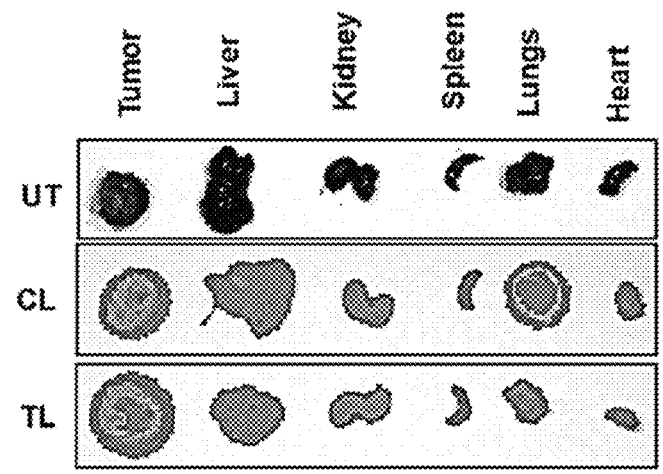
Figure 2B:
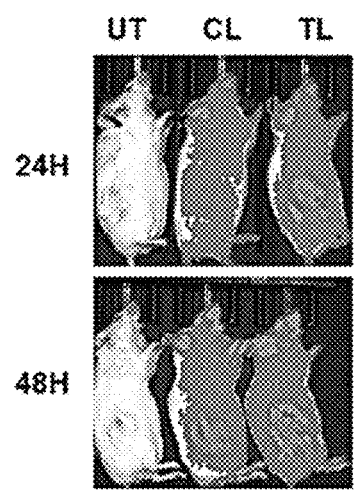
Figure 2D:
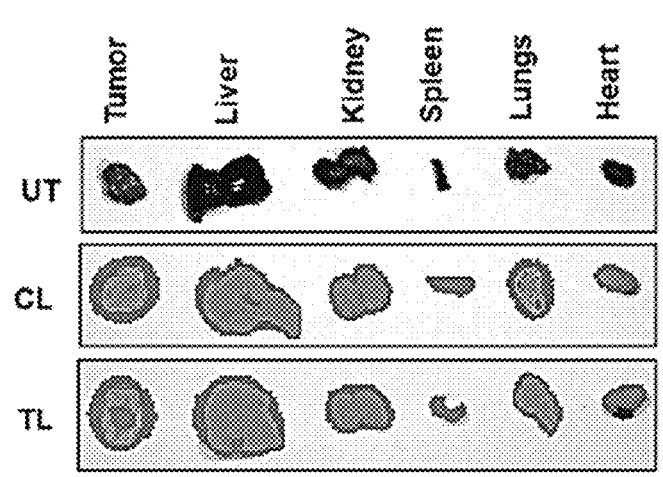

In vivo biodistribution of liposomes in RCC xenograft bearing mice: in vivo biodistribution of the liposomes in RCC tumor bearing mice was also analyzed. For this experiment, subcutaneous 786-O or A498 tumors in male scid mice were developed and injected IR-780-dye labelled liposomes via intravenous route. IR-780-dye was used in this experiment, since it absorbs and emits in IR region of the spectrum that is less absorbed by living tissue. There is no autofluorescence interfering with the signal intensity from mice fur in this region as well. As demonstrated in FIGS. 2A-B, TL showed higher tumor specific signal compared to CL in both 786-O and A498 xenografts at 24 hours and 48 hours after administration. The ex vivo imaging of the tumors and major organs corroborate with in vivo imaging (FIGS. 2C-D). Interestingly, lungs from mice treated with CL showed stronger signal compared to the lungs of TL treated mice. This suggests that the addition of TTP helped to reduce nonspecific accumulation of the liposomes in the lungs.

Figure 3:
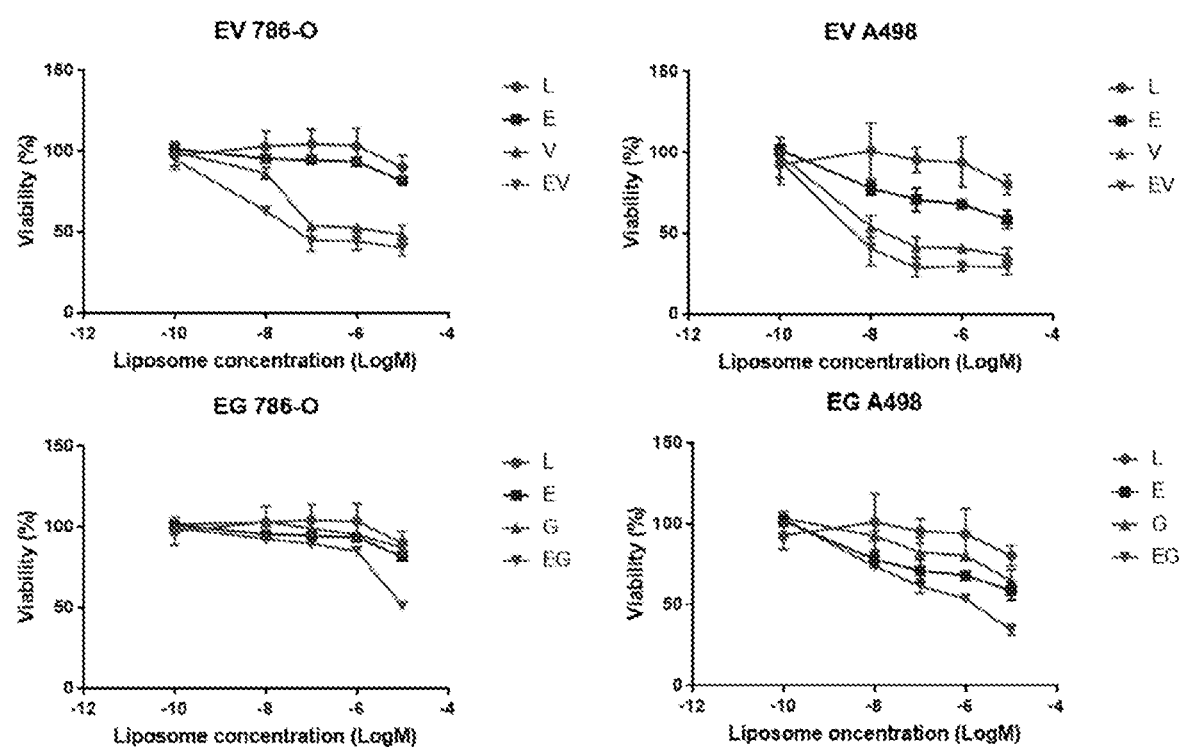
FIG. 3. In vitro cytotoxicity of drug-loaded liposomes in RCC cell lines. 786-O and A498 cells were treated with various drug-loaded TTP-conjugated Liposomes for 72 h. Then cell viability was determined with MTS assay. Dual-drug loaded liposomes showed higher reduction in cell viability compared to single drug loaded liposomes in all cell lines.

In vitro efficacy of drug-loaded liposomes in RCC: Since TL showed significantly higher in vitro cellular uptake and in vivo tumor targeting compared to CL, TL was used for all further efficacy studies described in this application. The drug-loaded liposomal formulations were tested for their efficacy in reducing in vitro cell viability in 786-O and A498 cells. The results are consolidated in FIG. 3. The dual drug loaded liposomes had better efficacy in all experiments. However, the difference was not so prominent between V and EV in both the cell lines. EG, on the other hand, was considerably more effective in both the cells lines compared to E or G alone. Nonetheless, the above experiments demonstrated that dual drug loaded liposomes were better in decreasing cell viability.

Figure 4:
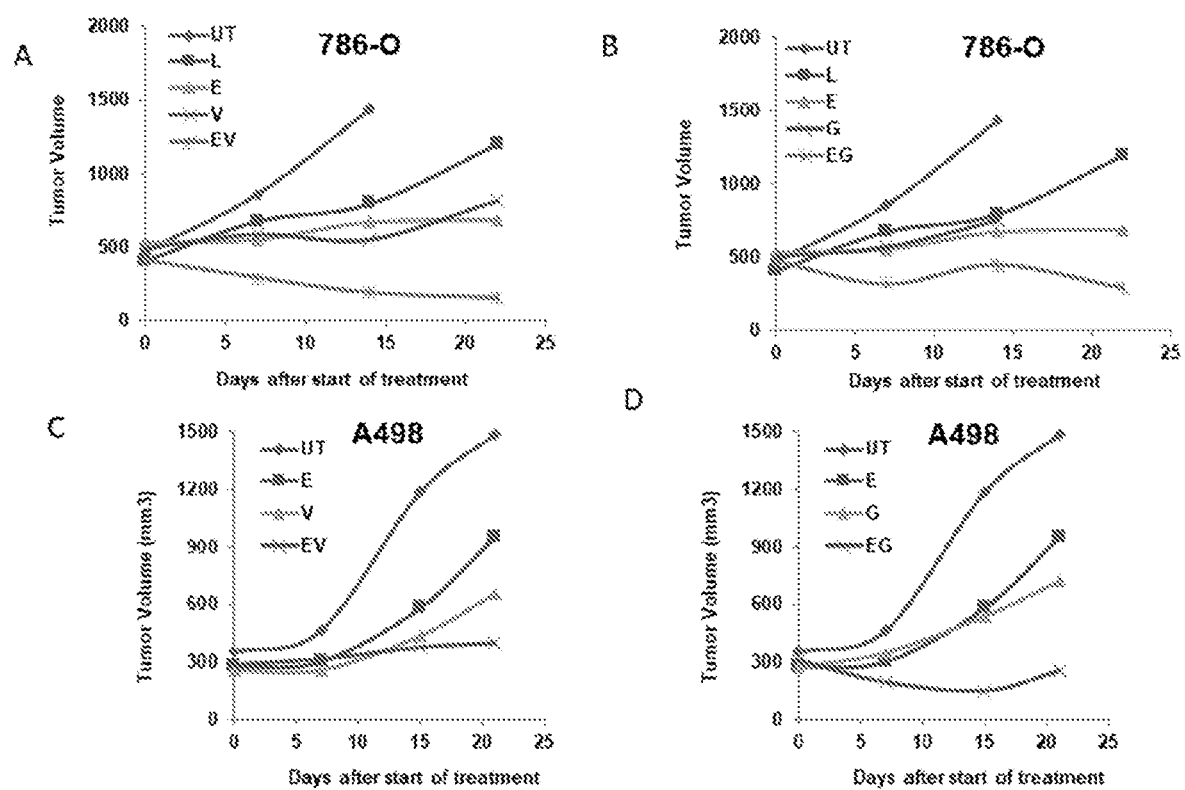
FIG. 4. In vivo single mouse trial of drug-loaded liposomes in RCC xenografts. A and B: $5 \times 10^6$ 786-O cells were subcutaneously injected into the right flanks of 8 weeks old male SCID mice. Tumors were allowed to grow until the average tumor size is ~400-500 mm³. Then mice were treated with drug loaded liposomes (one mouse per treatment group) 3x/wk for 3 weeks. Tumors were measured weekly and tumor volume is plotted to obtain the respective growth curves. In both cases dual-drug loaded liposomes demonstrated significant inhibition compared to single drug loaded liposomes. Some of the mice was sacrificed before the completion of experiment due to ulceration of tumors. C and D: Similar results were obtained in A498 xenografts.
Figure 5:
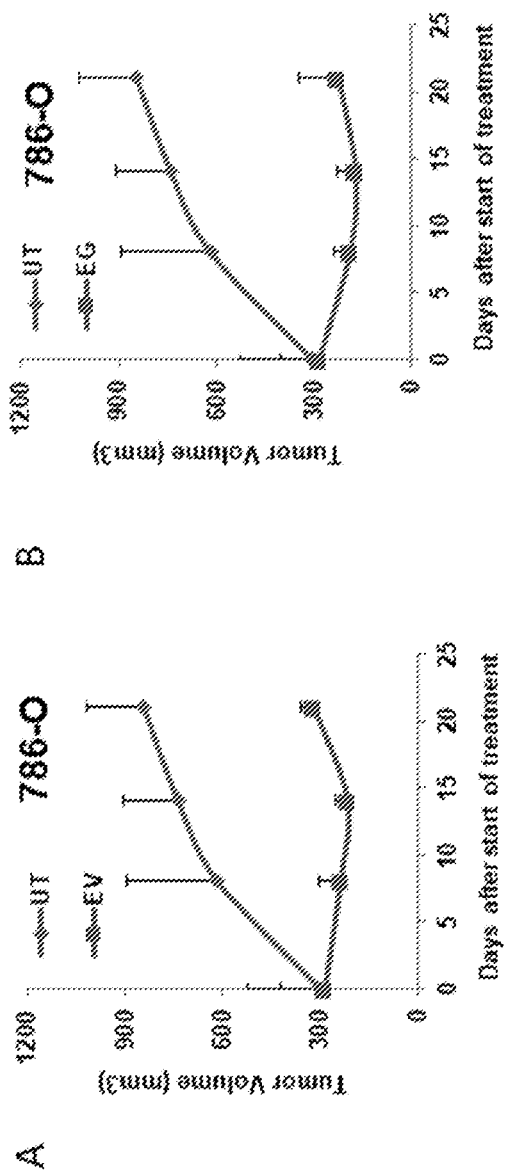
FIG. 5. Validation of the result obtained from single mouse trial in cohorts of 5 mice. The best formulation from each experiment was chosen for validation in a cohort of 5 mice bearing 786-O subcutaneous xenografts. Similar to the single mouse trial, 3x/wk treatment of dual drug loaded liposomes A. EV and B. EG for 3 weeks demonstrated strong tumor inhibition.

In vivo efficacy of drug-loaded liposomes in RCC xenografts: A recently popular concept of single mouse trial was the utilized to analyze the efficacy of the drug-loaded liposomes. This approach has been well accepted by various research groups as well as Charles River Laboratories for PDX models. This approach employs a single mouse per treatment arm, thus reducing the cost of animal experiments. By measuring longitudinal growth of the tumors, the most effective treatment can be reliably identified in a cost-effective manner. The treatment began when the tumors became 300-500 mm$^3$ which is significantly higher than described in majority of published literature. As can be seen from FIGS. 4A-B, not only EV and EG were better than the single drug loaded liposomes, but also are capable of actually decreasing the tumor volume from the starting volume in 786-O xenografts. Similar experiments in A498 xenografts also identified EV and EG as the most potent formulations among the treatment groups (FIGS. 4C-D). In order to confirm whether these observations are reproducible, the formulations EV and EG were selected for further validation studies in cohorts of 5 mice (FIGS. 5A-B). More or less similar results were obtained with the single mouse trials. This demonstrates the usefulness of the single mouse trial in identifying the best treatment strategy of combating cancer.

Figure 6:
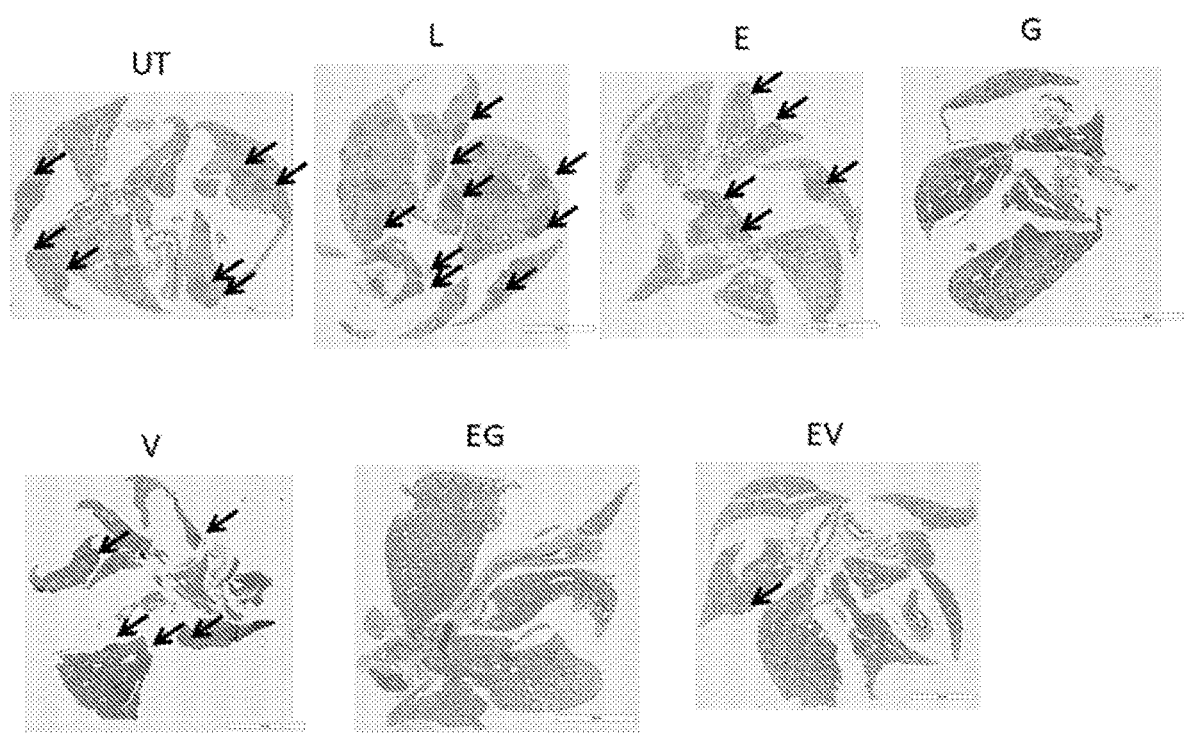
FIG. 6. Inhibition of lung metastasis in 786-O xenografted mice. The dual drug loaded liposomes significantly inhibited lung metastasis in mice bearing 786-O subcutaneous tumors compared to untreated, liposome only of single drug loaded liposomes. Metastatic nodules were indicated by black arrows.

Inhibition of lung metastases: RCC tumors are well known for their high levels of lung metastases. The present application shows that the drug-loaded liposomal formulations are capable of reducing the lung metastases. The H&E staining of the lung sections from the experimental mice showed a large number of metastatic nodules in the untreated mouse or mice treated with liposome only (L) or liposomes loaded with everolimus (E) or vinorelbine (V). In contrast EV showed only a few nodules whereas G and EG did not show any (FIG. 6). However, the mouse treated with G was sacrificed one week earlier due to ulceration of the tumor, and this may explain the absence of any metastatic nodules. Nevertheless, the present disclosure demonstrated that EV and EG were capable of reducing the lung metastases of RCC tumors.

Figure 7:
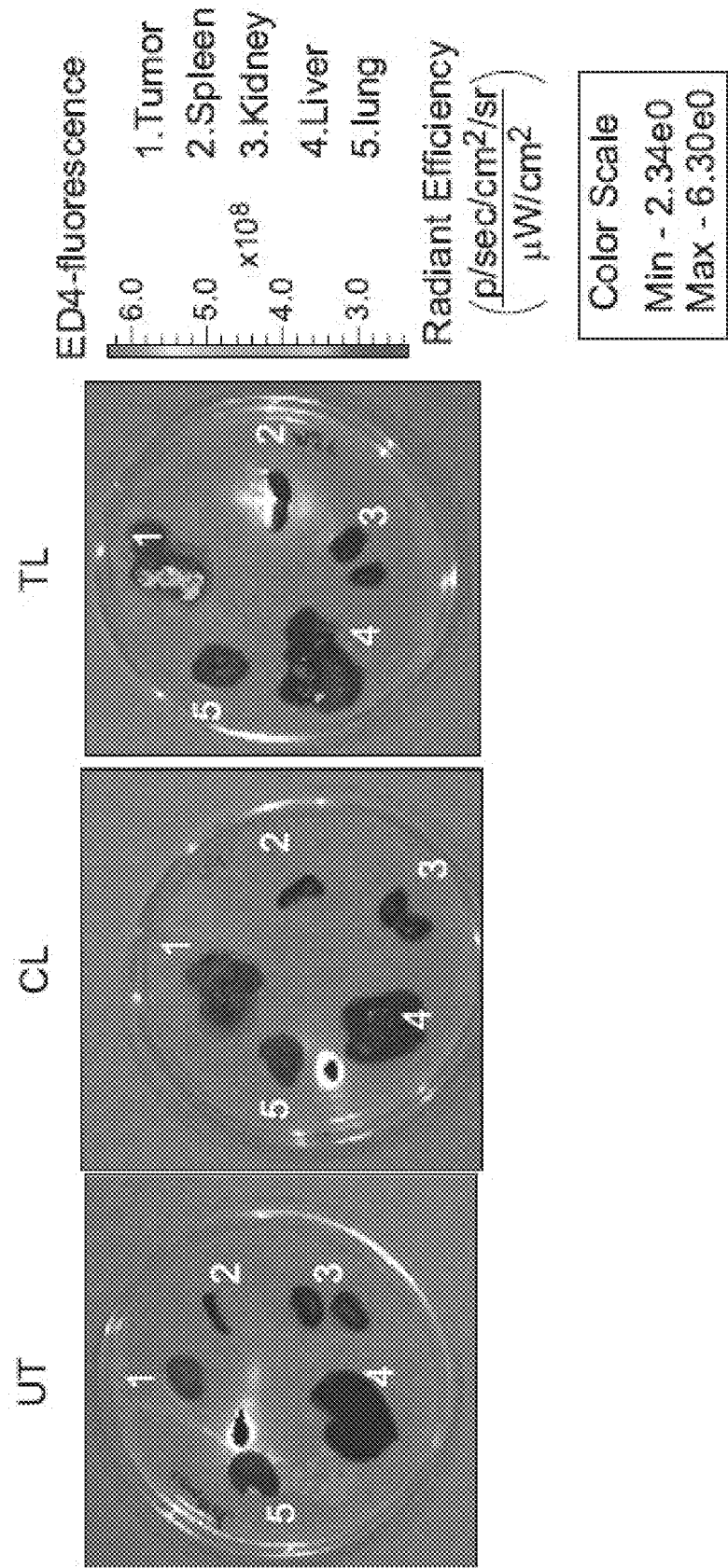
FIG. 7. In vivo biodistribution of Rhodamine-PE labeled liposomes in PANC-1 xenografts. Ex-vivo IVIS imaging of tumors and major organs showing higher tumor accumulation of Rhodamine-PE labeled TTP-conjugated liposomes (TL) compared to control liposomes (CL) at 48 h after IV administration into mice bearing orthotopic PANC-1 tumors. One untreated mouse (UT) was used for background correction.
Figure 8:
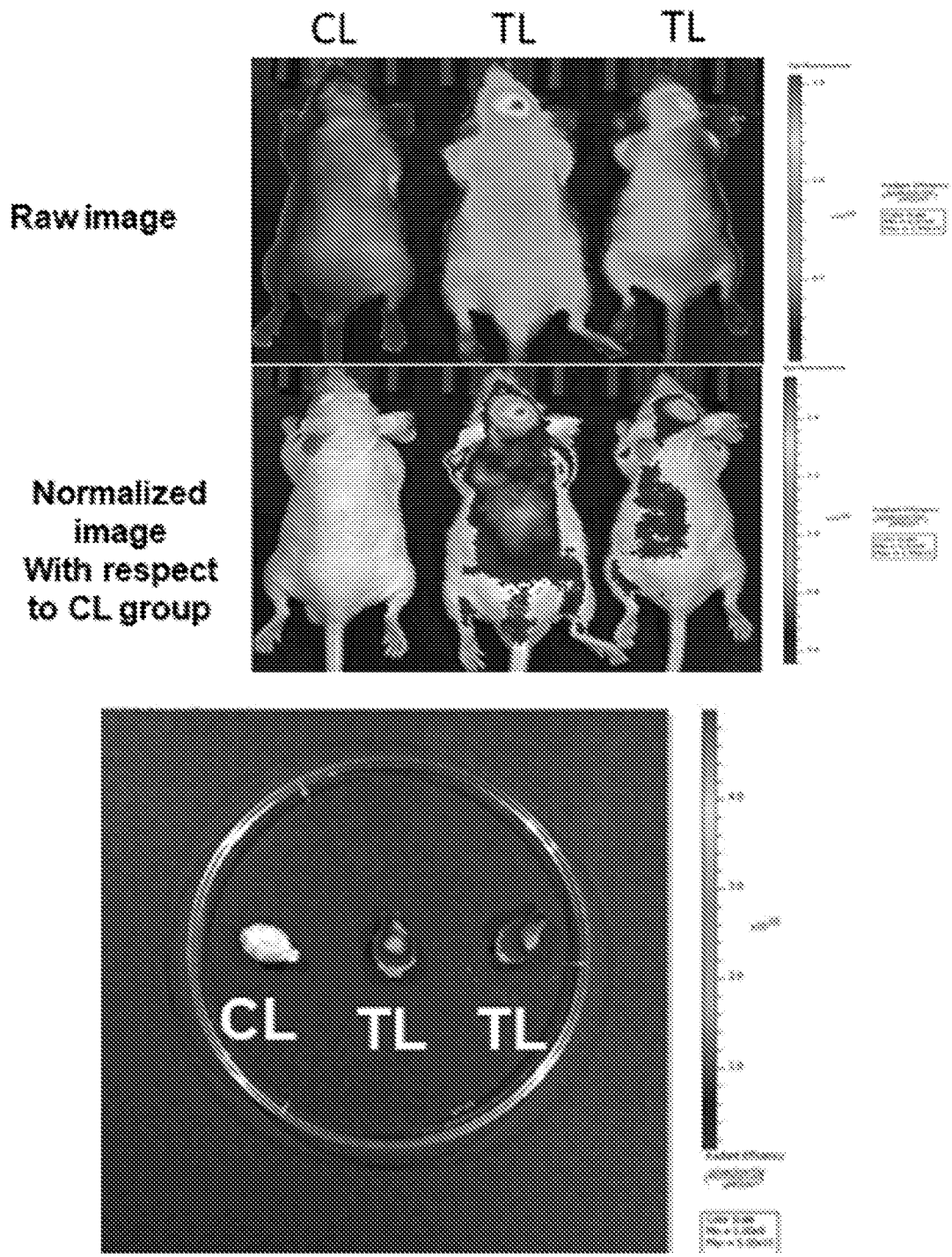
FIG. 8. In vivo biodistribution of IR-780-dye labeled liposomes in Glioblastoma multiforme (GBM) xenografts. A. IVIS imaging showing higher tumor accumulation of IR-780 dye labeled TTP-conjugated liposomes (TL) compared to control liposomes (CL) at 24 h (lower panel) after IV administration into mice bearing orthotopic 1A GBM xenografts. B. Ex vivo imaging of the tumors harvested at 24 hours demonstrated significant higher tumor uptake of TL compared to CL.
Figure 9:
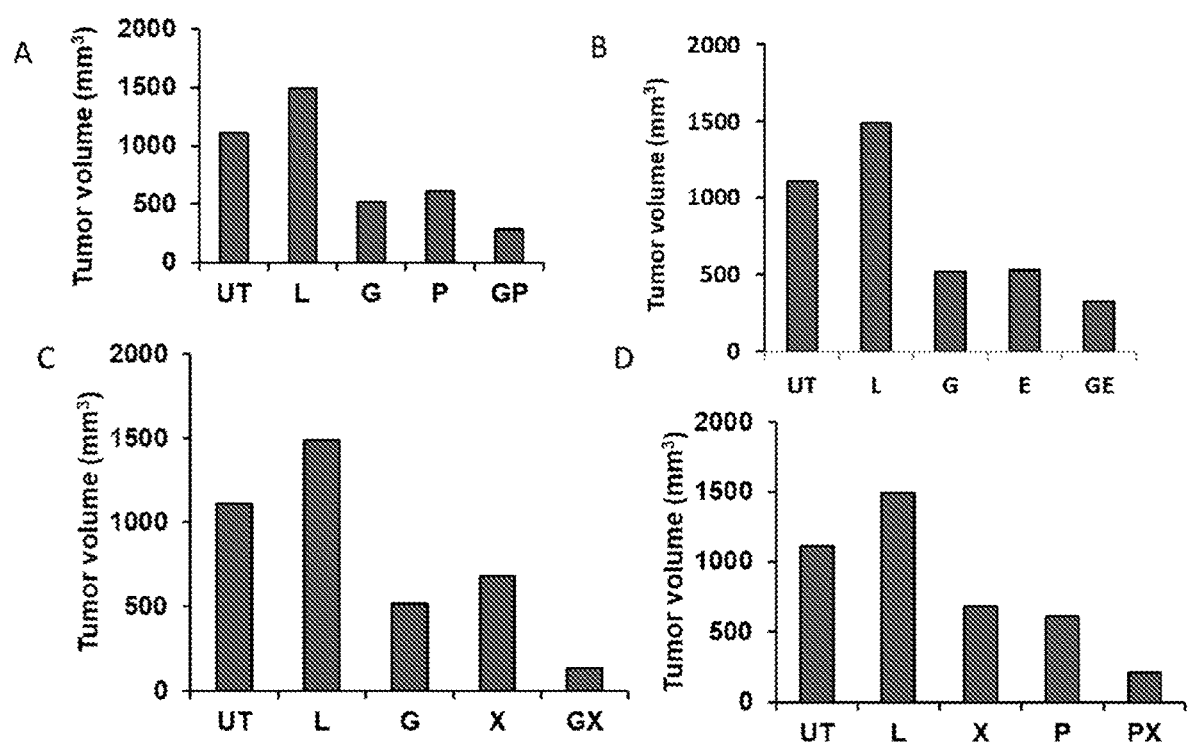
FIG. 9. In vivo single mouse trial of drug-loaded liposomes in AsPC-1 xenografts. $1 \times 10^6$ AsPC-1 cells were orthotopically injected into the pancreas head of 8 weeks old female SCID mice. After 9 days, mice were treated with drug loaded liposomes (one mouse per treatment group) 2x/wk for 3 weeks. Then mice were sacrificed, tumors were harvested and tumor volumes were measured. In all cases dual-drug loaded liposomes demonstrated higher inhibition compared to single drug loaded liposomes. A. UT-untreated control, L-liposome only, G-liposomal gemcitabine, P-liposomal paclitaxel, GP-liposome loaded with both gemcitabine and paclitaxel B. E-liposomal erlotinib, GE-liposome loaded with both gemcitabine and erlotinib C. X-liposomal XL-184, GX-liposome loaded with both gemcitabine and XL-184 D. PX-liposome loaded with both paclitaxel and XL-184.
Figure 10:
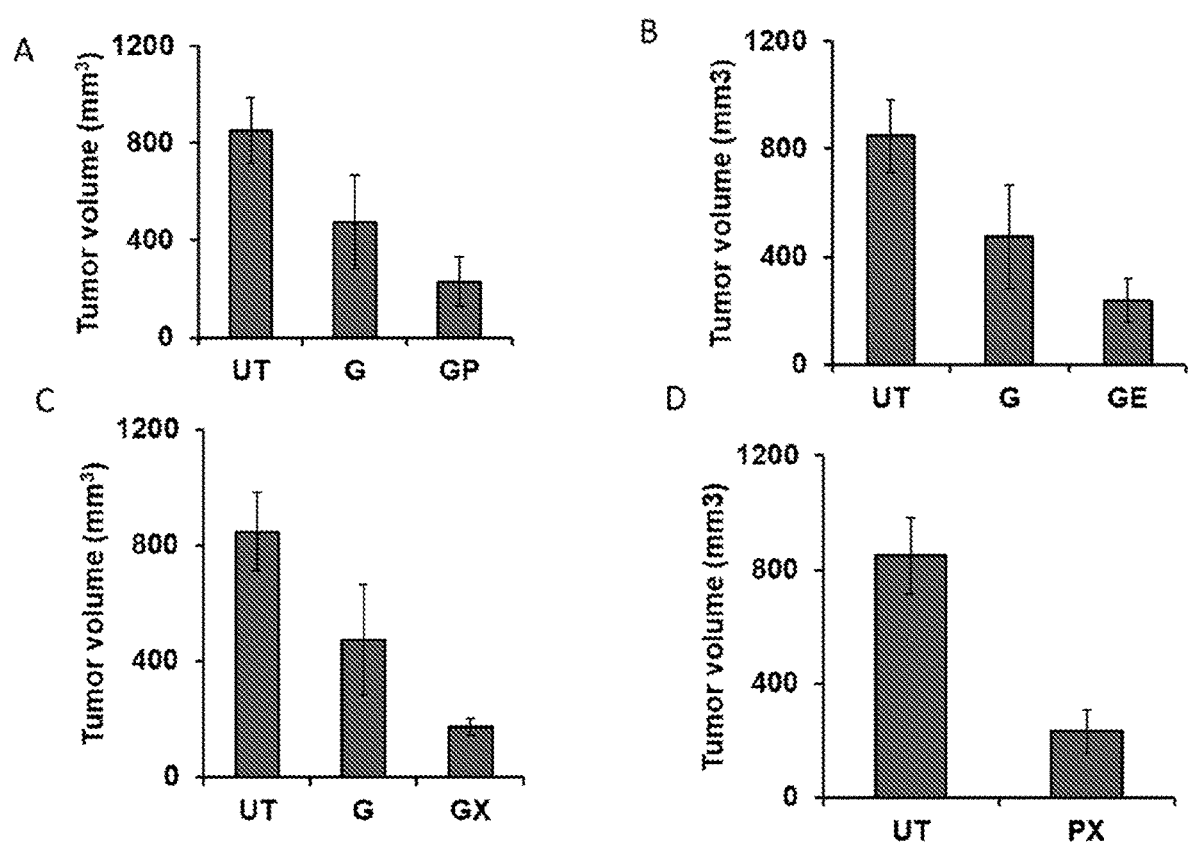
FIG. 10. Validation of the result obtained from single mouse trial in cohorts of 5 mice. The best formulation from each experiment was chosen for validation in a cohort of 5 mice bearing AsPC-1 orthotopic xenografts. Similar to the single mouse trial, 2x/wk treatment of dual drug loaded liposomes A. GP and B. GE C. GX and D. PX for 3 weeks demonstrated strong tumor inhibition. In experiments with dual liposomes having gemcitabine as one of the drugs, a gemcitabine-loaded liposome was included for comparison.

In vivo biodistribution in orthotopic pancreatic and glioblastoma multiforme (GBM) tumor bearing mice: the biodistribution of the Rhodamine-PE labelled liposomes in PANC-1 tumor bearing mice was analyzed and demonstrated highly tumor specific uptake of TL compared to CL (FIG. 7). Similarly, IR-780-dye loaded liposomes demonstrated tumor-specific uptake of TL in mice bearing orthotopic 1A GBM xenografts (FIG. 8). These results demonstrate that TTP-conjugated liposomes are capable of delivering drugs in tumor-specific manner across a diverse set of tumors.

In vivo efficacy of drug-loaded liposomes in orthotopic pancreatic cancer xenografts: a single mouse trial as described above was utilized to identify most potent drug formulations effective against orthotopic AsPC-1 xenografts. AsPC-1 were selected for these studies since these tumors are very aggressive in nature. Liposomes having the following drugs and their combinations were used in these experiments-gemcitabine (G), paclitaxel (P), trlotinib (E), and XL-184 (X), a c-met inhibitor. The dual-drug loaded liposomes were more effective in reducing the tumor volume compared to the single drug loaded liposomes (FIGS. 9A-D). A similar validation experiment was also performed in a cohort of 5 mice per treatment group and showed similar results (FIGS. 10A-D).

Conclusion: In conclusion, the present application describes the development of tumor targeting liposomal formulations that are capable of delivering a number of drugs, either single or combination, to a variety of tumors. Some of the drug loaded liposomal formulations are not only inhibiting the primary tumor growth but also are equally effective in reducing the metastatic burden. Therefore, liposomal formulations of the present disclosure are beneficial in treating various cancer patients by enhancing the progression-free survival as well as overall survival.

Example 2 A Novel Liposomal Formulation for Tumor-Targeted Delivery of Genetic Cargo Materials and Methods Cell Culture: The human pancreatic ductal adenocarcinoma cell line PANC-1 was maintained in Dulbecco's Modified Eagle Medium supplemented with 10% fetal bovine serum (FBS), 1% antibiotic-antimycotic (anti-anti; Gibco), and 0.02% plasmocin (Invivogen, USA). Human pancreatic adenocarcinoma cell lines AsPC-1 was maintained in RPMI 1640 medium supplemented with 10% FBS, 1% anti-anti, and 0.02% plasmocin. 10% tetracyclin-free FBS was used for preparing the medium for maintaining GIPC-1-inducible cell lines.

Antibodies. Antibody for β-actin and horseradish peroxidase-conjugated secondary antibodies were purchased from Santa Cruz Biotechnology. Anti-GIPC antibody was purchased from Thermo Fisher, USA. shRNA Transfection. The plasmids for Tet-on-inducible GIPC1 shRNA were purchased from Dharmacon, US. Lentivirus stocks for GIPC1 shRNA were prepared and infected into the target cells following standard procedures. After infection, 2 µg/mL of puromycin was added to the medium for antibiotic selection. For the Tet-On-inducible GIPC shRNA, 0.4 µg/mL of doxycycline was used to induce shRNA expression in the stably infected cells.

In vitro cytotoxicity assay: Approximately, $5 \times 10^3$ cells were seeded in 384-well plates. After 18-24 h, cells were treated with increasing concentrations of gemcitabine and incubated for further 72 h. At the end of the incubation, cell viability was measured using CellTiter-Glo® 2.0 Assay (Promega) as per the manufacturer's protocol. Briefly, 24 µL of reagent was added to each well. The plate was incubated at RT for 10 minutes and luminescence signals were measured using Spectramax i3x. Percentage viability is calculated as follows: Viability (%)=$100 \times (A_{Treated} - A_{Blank})/(A_{Untreated} - A_{Blank})$.

Preparation of Whole-Cell Extracts. Cells were washed 3 times with ice-cold phosphate-buffered saline (PBS, pH 7.4; Gibco) and lysed with ice-cold NP-40 lysis buffer (50 mM Tris-HCl, 150 mM NaCl, T % NP-40, and 5 mM EDTA, pH 7.4±0.2) with 1% protease inhibitor cocktail (Sigma-Aldrich, St. Louis, MO) and 1% Halt phosphatase inhibitor cocktail (Pierce, USA). Lysates were centrifuged at 14,000 rpm at 4° C. for 10 minutes. The supernatant was collected, and protein concentration was measured by the bicinchoninic acid assay (BCA assay) [Pierce BCA Protein Assay Kit, MA, USA].

Western Blot. Proteins were denatured by adding 6× Laemmli SDS sample buffer and heating for 5 minutes. SDS gel electrophoresis was performed with equal amount of protein in each lane, followed by wet transfer of the protein to PVDF membrane. The membrane was blocked in TBS-T buffer (50 mmol/L Tris-HCl, pH 7.4, 150 mmol/L NaCl, and 0.05% TWEEN-20®) containing 5% nonfat milk or BSA. The membrane was incubated overnight at 4° C. with primary antibody diluted in TBS-T containing 5% nonfat milk or BSA, followed by incubation for 1 hour at room temperature with the horseradish peroxidase-conjugated secondary antibody (Santa Cruz Biotechnology) diluted in TBS-T. The Super Signal West Pico Chemiluminescent Substrate (Thermo Scientific, USA) was used for immunodetection.

In vivo biodistribution of FAM-siRNA and NIR dye loaded D1XP liposomes: Six- to eight-week-old male SCID mice were obtained from in-house breeding and housed in the institutional animal facilities. All animal work was performed under protocols approved by the Mayo Clinic Institutional Animal Care and Use Committee. To establish orthotopic pancreatic tumor approximately, $1 \times 10^6$ luciferase-labeled PANC-1 cells resuspended in 100 µL of PBS-were injected into the pancreas of each mouse. Tumors were allowed to grow for 4 weeks without treatment. Then tumor-targeted liposomes (D1XP) loaded with IR-780-dye and complexed with FAM-siRNA were administered via i.p. route. Mice were imaged using IVIS imager 24 and 48 hours after administration.

In vivo tumor growth inhibition experiment: A single mouse trial (SMT) was used to assess the in vivo tumor inhibition study in combination with GIPC-1 knockdown plus gemcitabine treatment. This strategy is currently being used in 'Avatar' models for the development of personalized therapy for various diseases. These 'Avatar' models are developed by implanting patient tumor samples in mice for subsequent drug efficacy studies. Each tumor-bearing mouse is treated with a different therapeutic regimen to identify the most effective regimen, thereby reducing the cost and toxicity associated with non-targeted therapy. We used the same strategy in our SMT. All procedures were performed according to the approved guidelines. For the pancreatic cancer orthotopic model, 6-8-week-old female SCID mice were obtained from in-house breeding. Approximately, $1 \times 10^6$ luciferase-labeled Tet-inducible GIPC-1 shRNA vector-transfected AsPC-1 or PANC-1 cells, resuspended in 100 µL of PBS were injected into the pancreas of each mouse. After three days of cell inoculation, GIPC-1 knockdown was induced by adding doxycycline (0.5 mg/mL) in drinking water for the remainder of the study. After substantial tumor growth was confirmed by bioluminescence imaging, mice were treated with gemcitabine (10 mg/kg) twice a week for four weeks. After completion of the experiment, all tumor-bearing mice were euthanized with $CO_2$; tumors were harvested, and tumor volumes and weights were measured. We also performed a validation study to confirm the results obtained from the SMT in AsPC-1 tumor-bearing mice with 5 mice per group.

In Vivo Tumor Growth Inhibition Study with GIPC-1 siRNA and Gemcitabine.

To harness the therapeutic efficacy of GIPC-1 knockdown in vivo, we developed a novel liposomal siRNA delivery system with tumor targeting ligand (D1XP). Luciferase-labelled PANC-1 cells were used to develop orthotopic PDAC xenografts in 6-8 weeks old female SCID mice following similar procedure described above. After 4 weeks, tumor growth was confirmed by bioluminescence imaging and tumor-bearing mice divided into five groups (n=5). The mice were i.p. administered with: D1XP, GIPC-1 siRNA (0.5 mg/kg) complexed with D1XP, gemcitabine (10 mg/kg), and a combination of both twice a week for three weeks. The untreated group was used as a control. The D1XP-complexed siRNA and gemcitabine treatments were performed two days apart. After completion of the experiment, all tumor-bearing mice were euthanized with $CO_2$; tumors were harvested for morphologic analysis and immunostaining.

Bioluminescent Imaging. Tumor growth of orthotopic tumors were analyzed by bioluminescent imaging. Sodium-D-Luciferin (Gold Biotechnology) was injected intraperitoneally at 150 mg/kg in PBS 15 minutes before imaging. Mice were anesthetized with 2% isoflurane and imaged once a week with a cooled CCD camera (IVIS system, Xenogen, USA). The exposure time was 1 second to 1 minute. Signal was displayed as photons/second/cm2/steradian and was quantified using the Living Image software (Caliper Life Sciences, USA) using the IVIS system 200 series (Xenogen Corp).

Statistical Analysis. Statistical significance between treatment groups was performed using an unpaired t-test with GraphPad software. Statistical significance was defined as $P < 0.05$, and a high level of statistical significance was defined as $P < 0.01$.

Figure 11:
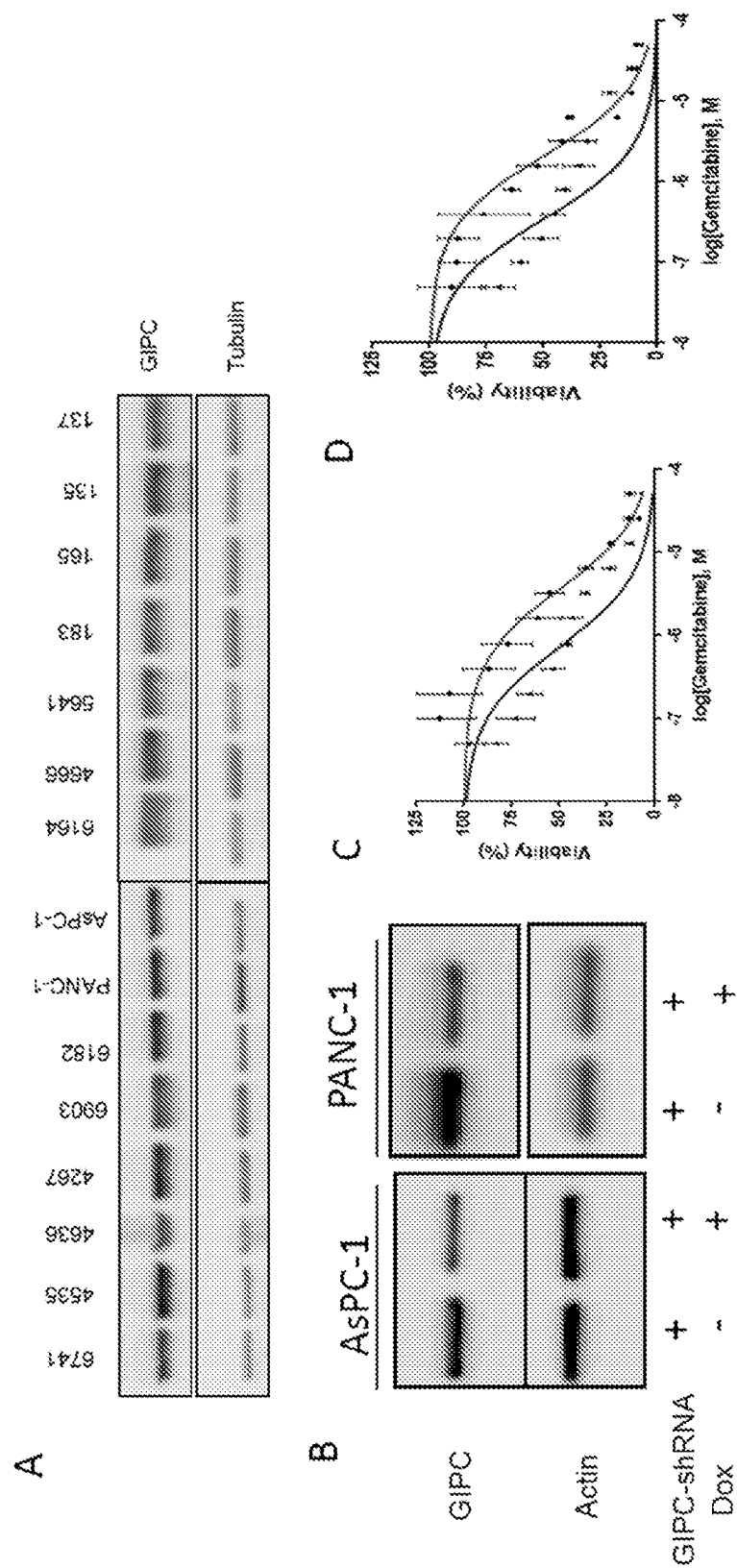
FIG. 11 in vitro GIPC depletion ameliorates drug sensitivity in pancreatic cancer cells A. Western blots showing native expression levels of GIPC in the pancreatic cancer PDX, PANC-1 and AsPC-1 cell lines. B. Western blot analysis confirmed GIPC expression after Tet inducible shRNA knockdown treating with doxycycline (400 ng/mL) for 72 h in both AsPC-1 and PANC-1 cells Actin used as loading control. GIPC knockdown pancreatic cancer cells (C) AsPC-1 and (D) PANC-1 sensitizes Gemcitabine in in-vitro cell proliferation as assessed through an cell titer glow assay.

Results
GIPC-Depletion In Vitro Sensitizes Pancreatic Cancer Cells Towards Gemcitabine Prior to performing any experiment to evaluate the effect of GIPC-depletion in sensitizing pancreatic cancer cells towards chemotherapeutic drugs, we analyzed the GIPC expression levels in AsPC-1, PANC-1, and a number of PDX cell lines. As shown in FIG. 11A, GIPC expression could be seen in all the cell lines corroborating with previous notion that GIPC is a very important survival gene in pancreatic cancer. Next, we intended to see whether GIPC depletion in pancreatic cancer cells can increase their sensitivity towards chemotherapeutic drugs such as gemcitabine. Towards this end, we utilized lentiviral-based GIPC shRNA plasmids to perform GIPC knockdown in four cell lines. Unfortunately, we failed to generate stable clones of GIPC-depleted PCA cell lines since the growth of the cells was not adequate to generate stable cell lines. Therefore, we had to use the Tet-on inducible smart-GIPC shRNA system. We analyzed three different clones of Tet-on inducible GIPC shRNA for their GIPC knockdown efficacy in AsPC-1 GFP-Luciferase cells and selected the best clone demonstrating highest knockdown after induction with 400 ng/ml doxycycline for 72 h for further in vitro drug sensitivity experiments (FIG. 11B). For these experiments, we added increasing concentrations of gemcitabine to doxycycline-pre-treated or untreated AsPC-1 and PANC-1 cells across a concentration range from 0.5 µM to 50 µM. MTS assay was performed after 72 h. GIPC-depleted cells exhibited a steeper growth inhibition curve compared to the control cells suggesting that GIPC-depletion sensitizes pancreatic cancer cells towards gemcitabine in vitro (FIG. 11C-D).

Figure 12:
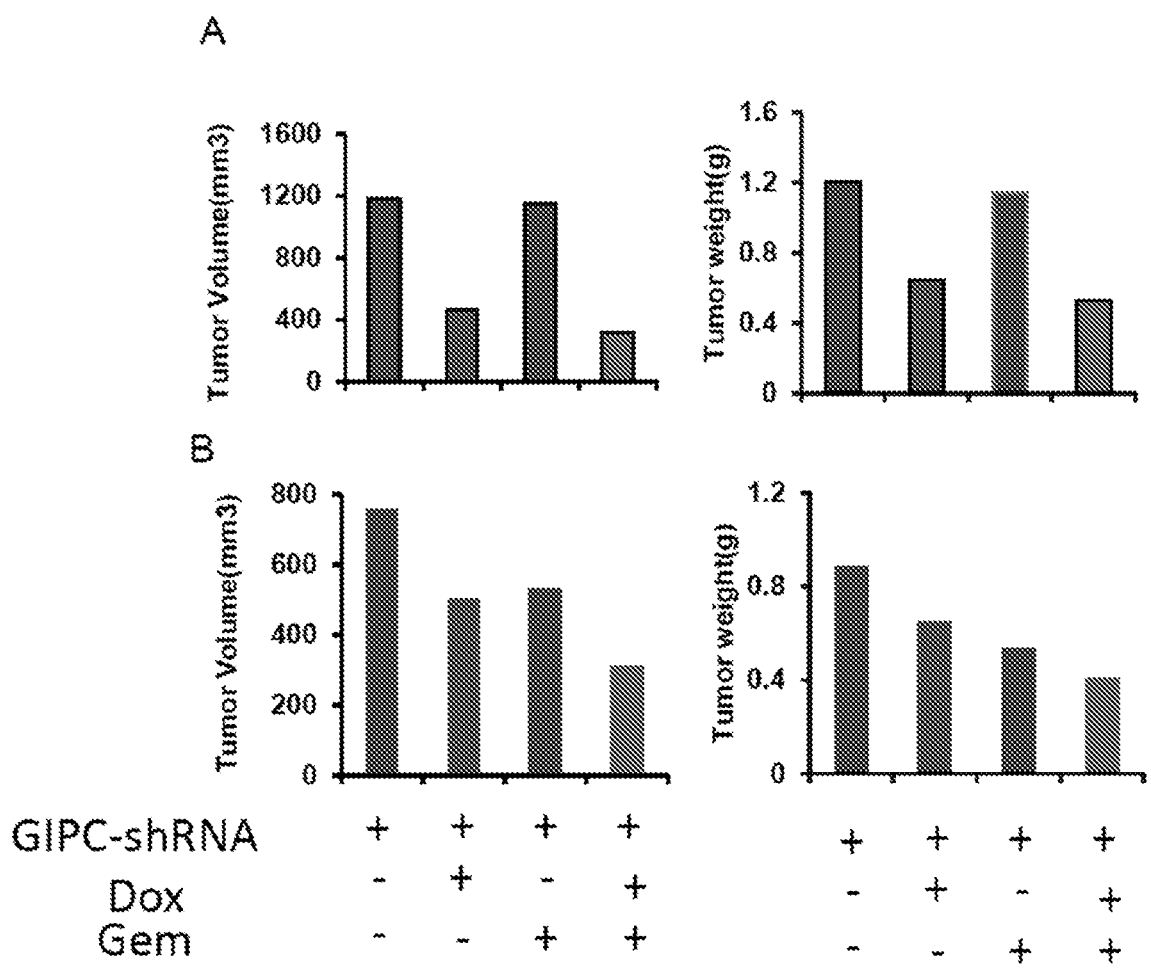
FIG. 12 In-vivo tumorigenic properties of GIPC in pancreatic cancer growth in single mice model. GIPC knockdown done by treating with 0.5 mg/ml of doxycycline in water after three days of cell implanted and continued throw out the study. IN in-vivo study end point results clearly suggesting that GIPC knockdown increasing gemcitabine efficacy mice treated 2×/3 wk with 10 mg/kg of gemcitabine (A) AsPC-1 (tumor volume left and tumor weight right) and (B) PANC-1 (tumor volume left and tumor weight right).
Figure 13:
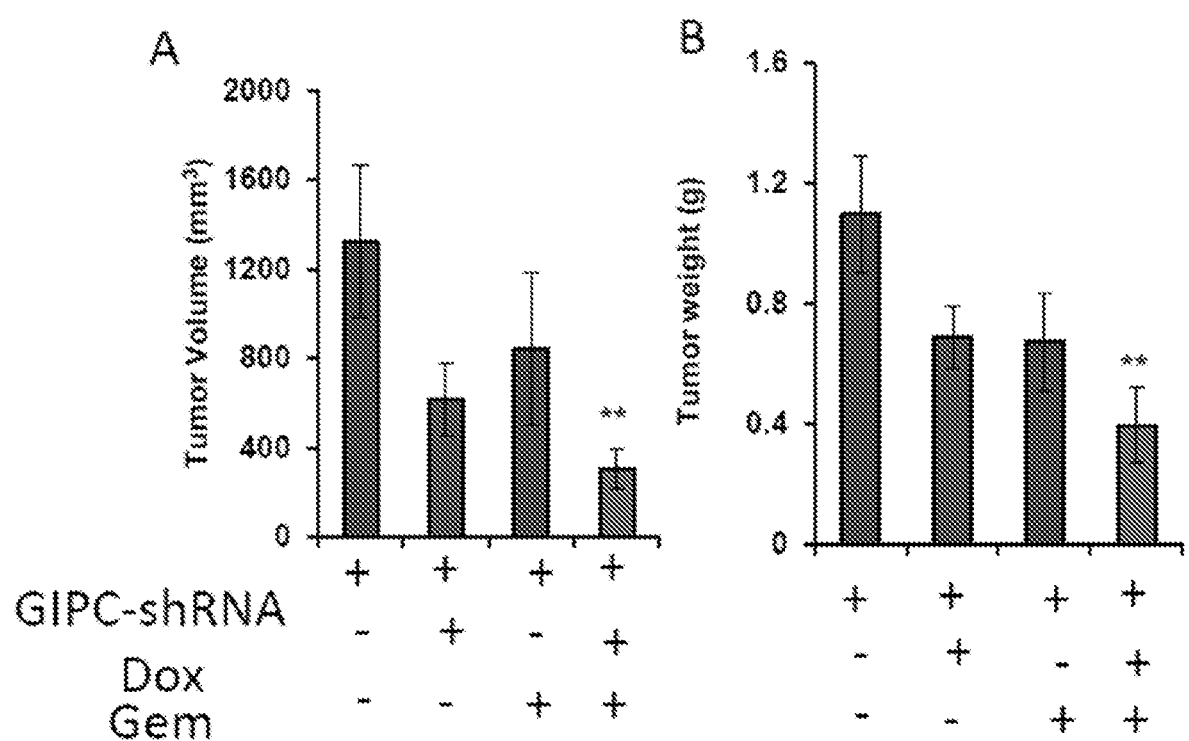
FIG. 13 In-vivo tumorigenic properties of GIPC in pancreatic cancer growth in validation experiment in AsPC-1 tumors. GIPC knockdown done by treating with 0.5 mg/ml of doxycycline in water after three days of cell implanted and continued throw out the study. in in-vivo study end point results clearly suggesting that GIPC knockdown increasing gemcitabine efficacy mice treated 2×/3 wk with 10 mg/kg of gemcitabine in AsPC-1 (A) Tumor volume (B) Tumor weight.

GIPC-Depletion Sensitizes Orthotopic Pancreatic Cancer Xenografts Towards Gemcitabine In Vivo To further validate our hypothesis in vivo, we performed a single mouse trial using two pancreatic cancer cell lines, namely AsPC-1 and PANC-1. We observed that GIPC-depleted tumors were significantly smaller in both AsPC-1 (FIG. 12A) and PANC-1 (FIG. 12B) orthotopic xenografts. In addition, GIPC-depleted tumors exhibited significantly higher response to Gemcitabine treatment for both the cell lines. To validate the results obtained from the single mouse trail, we repeated the same experiment in AsPC-1 xenografts with 5 mice per treatment group as usual. We observed more or less similar results in that experiment (FIG. 13A-B). Taken together, these results suggest that GIPC knockdown sensitizes pancreatic cancer xenografts towards gemcitabine in vivo. Additionally, the usefulness of the single mouse trial in identifying the best treatment strategy for combating cancer was also substantiated.

Figure 14:
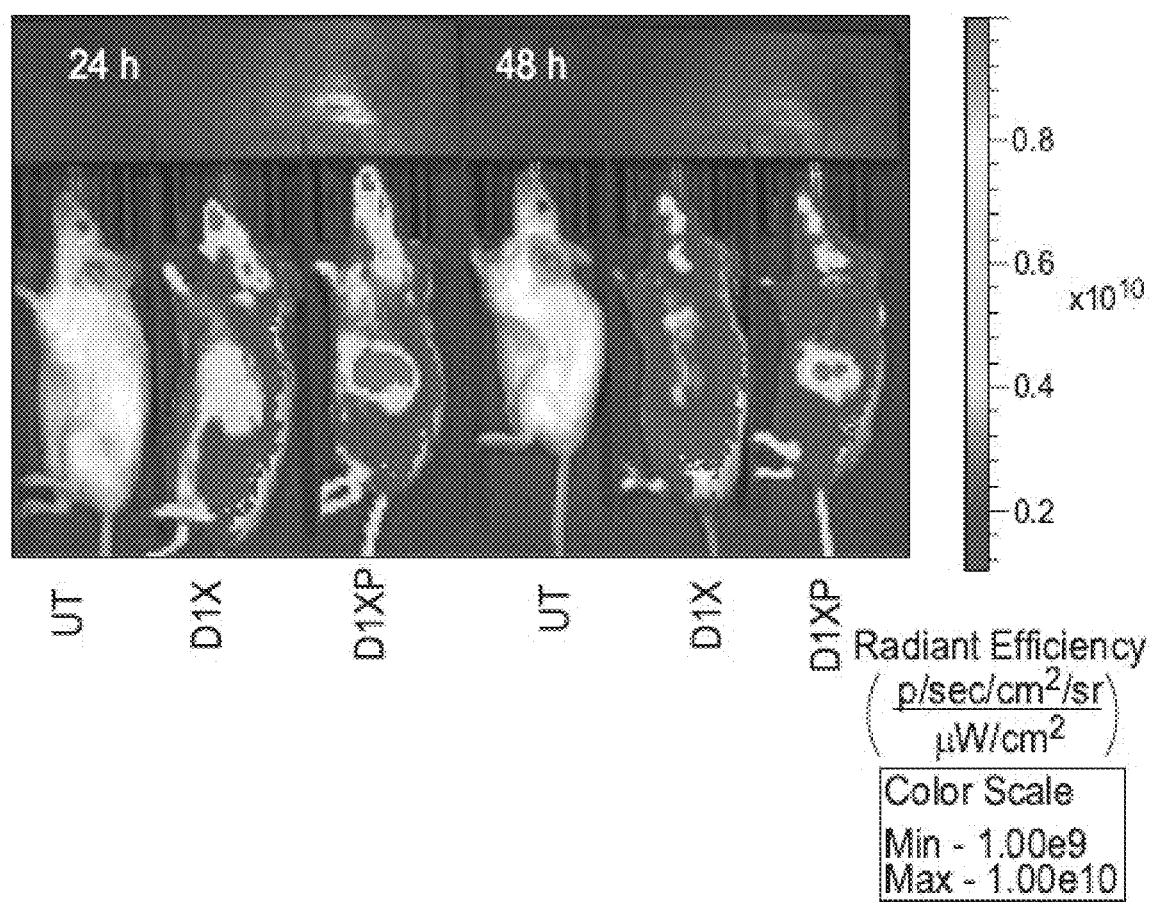
FIG. 14 in vivo selective tumor uptake of targeted liposomal formulations: IVIS imaging showing tumor accumulation of NIR-Dye labeled and FAM-siRNA complexed targeted liposomal formulations 24 h and 48 h of after i.p. administration into mice bearing orthotopic PANC-1 tumor. The NIR-dye labeled and FAM-siRNA complexed targeted liposomal formulations shows significantly higher tumor accumulation than control liposome.

D1XP Demonstrates Tumor-Selective Uptake in Orthotopic Pancreatic Cancer Xenografts The results from the above experiments prompted us to assess the therapeutic potential of GIPC-depletion in vivo. Towards this end, we developed a novel tumor-targeted liposomal formulation (D1XP) for siRNA delivery in vivo. To evaluate the tumor targeting efficacy of D1XP formulation, we performed in vivo tumor uptake study in PANC-1 orthotopic tumor bearing mice. FAM-siRNA complexed with IR-780-dye labelled control (DIX) or tumor-targeted (D1XP) liposomal formulations were injected intraperitoneally in orthotopic PANC-1 tumor-bearing mice. In vivo tumor uptake was monitored by IVIS imaging after 24 h and 48 h. IR-780-dye was used in this experiment, since it absorbs and emits in IR region of the spectrum that is less absorbed by living tissue. There is no auto-fluorescence interfering with the signal intensity from mice fur in this region as well. As shown in FIG. 14, our novel tumor-targeting liposomal formulation D1XP clearly showed significant tumor uptake compared to control formulation D1X. However, we didn't observe clear signal of FAM-siRNA due to strong autofluorescence in the green region of the spectrum. We are repeating this experiment using with Cy5.5 labeled siRNA to overcome this limitation.

Tumor Growth Inhibition Study PDAC Xenograft Bearing Mice.

Figure 15:
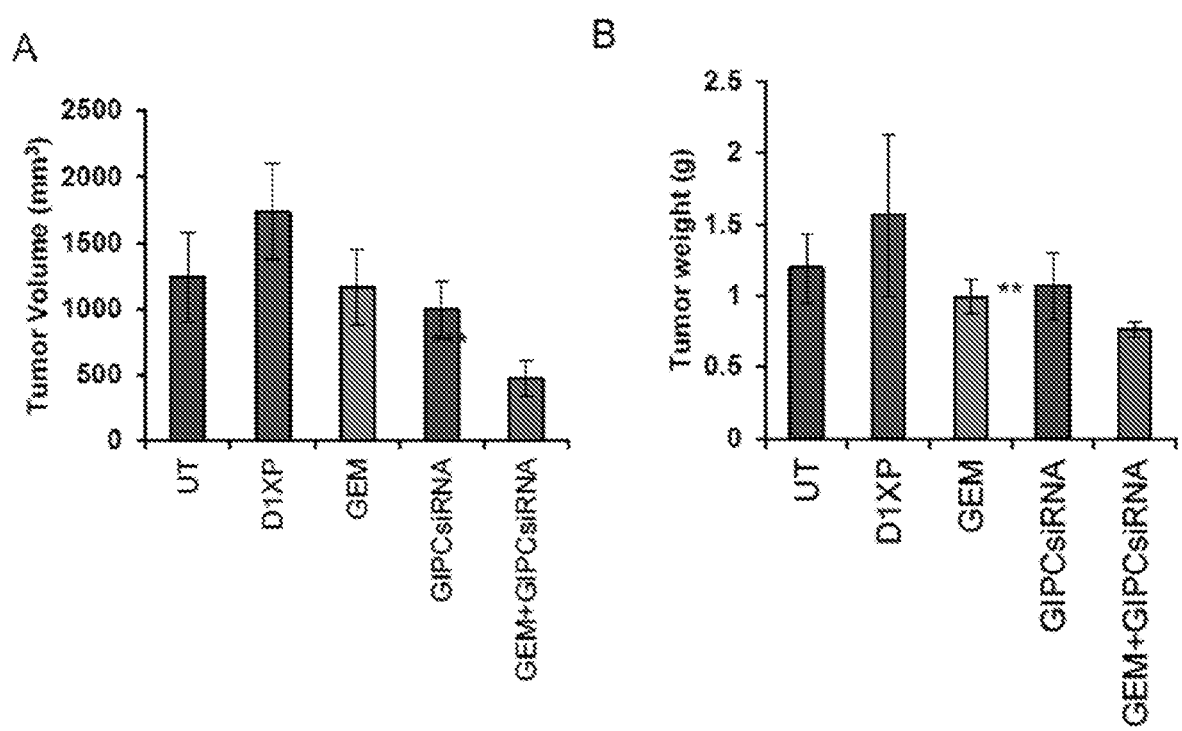
FIG. 15 Anti-tumor effects of combination of downregulating of GIPC-1 and Gemcitabine treatments in pancreatic xenograft mouse model: Mice bearing PANC-1 orthotopic pancreatic tumors were treated with five different combinations (n=5) Empty liposome (D1XP), Gemcitabine (10 mg/kg), GIPC-1 siRNA (0.5 mg/kg), and both Gemcitabine (10 mg/kg), GIPC-1 siRNA (0.5 mg/kg) for over 2×/3 weeks. Untreated group used as control. (A) Tumor volume, (B) Tumor weight. The antitumor efficacy of gemcitabine combined with GIPC-1 siRNA treated mice significantly inhibited tumor growth comparing with only gemcitabine treated or only GIPC siRNA treated or control mice.

Finally, to assess the therapeutic potential of GIPC-depletion in vivo, we performed a tumor growth inhibition study in mice bearing orthotopic PANC-1 xenografts using GIPC siRNA complexed with D1XP liposomal formulation. The mice were i.p. administered with: D1XP, GIPC-1 siRNA complexed with D1XP, Gemcitabine, and a combination of both twice a week for three weeks. The untreated group was used as a control. Tumor growth inhibition was most prominent in the combination group compared to the other groups (FIG. 15A-B). In summary, our novel tumor-targeting liposomal formulation was able to deliver GIPC siRNA to orthotopic pancreatic tumors to make that can be utilized as a therapeutic strategy, especially in combination with standard chemotherapeutic drug gemcitabine.

Example 3 Development of Multi-Drug Loaded PEGylated Nanodiamonds to Inhibit Tumor Growth and Metastasis in Genetically Engineered Mouse Models of Pancreatic Cancer Pancreatic ductal adenocarcinoma (PDAC) is a highly lethal malignancy with overall 5-year survival rates of <5%. Surgery is the only curative treatment, but most patients are diagnosed with unresectable late-stage tumors and, therefore, chemo-radiotherapy is often applied albeit with unsatisfactory results. Novel treatment approaches, including molecularly targeted drugs, have been considered for these patients, but no improvement in overall survival of PDAC has been achieved. The tumor stroma represents a critical barrier to pharmacological treatment of PDAC and the inability of drugs to reach the tumor tissue is an important cause of treatment failure. Consequently, there is an urgent need to develop efficient drug carriers for the treatment of PDAC.

Nanodiamonds (ND) possesses several interesting and useful features such as unique electrostatic properties, excellent biocompatibility, and a tunable surface that can be readily functionalized. In particular, the truncated octahedral shape and attendant multi-faceted surface with varying electrostatic potentials promote drug adsorption by NDs. Hence, these miniscule nanoparticles have emerged as a promising nano-delivery system in various pre-clinical cancer models. Previous studies have demonstrated that NDs may be used to effectively deliver the chemotherapeutic drugs, doxorubicin and epirubicin in mouse models of metastatic breast cancer and hepatocellular cancer, respectively. NDs were also employed for delivery of daunorubicin to multi-drug resistant leukemia cells. Furthermore, using doxorubicin as a model drug, we recently reported that poly(ethylene glycol) (PEG)-functionalized NDs afford a considerable improvement over the free drug in an orthotopic xenograft model of PDAC. Importantly, we showed that NDs did not elicit any toxicity in mice following i.p. administration. Other investigators have reported that pristine NDs administered through i.v. injection are well tolerated in rats and non-human primates.

Two of the most commonly mutated genes in PDAC are the KRAS proto-oncogene and the TP53 tumor suppressor gene. Consequently, one of the most studied genetically engineered mouse models of PDAC displays mutations in the Kras and Trp53 genes that are specifically targeted to the pancreas using Cre-Lox technology. The KPC model faithfully recapitulates many of the clinical and histopathological features of the human disease and the tumors arise spontaneously with defined histopathologic stages that mirror the disease in patients. In addition, KPC mice are immunocompetent and thus provide a useful model for studying interactions between the immune system and the tumor cells including the role of the tumor microenvironment. Results described herein show that ultra-small, PEGylated NDs loaded with irinotecan and curcumin display superior antitumor effects in vivo in two different mouse models of aggressive PDAC. The data indicates that NDs preferentially localized in the pancreatic tumors and the experimental evidence shows that the nanoparticles per se exerted immunomodulatory effects.

Materials and Methods

Materials and drugs. Nanodiamonds (NDs) with carboxyl (—COOH) surface modification (~5 nm diameter) were purchased from Adimas Nanotechnologies, Raleigh, NC mPEG-amine Mwt-550 was from Creative PEG Works, Durham, NC N-(3-Dimethylaminopropyl)-N'-ethylcarbodiimide hydrochloride (EDC) was from Sigma St. Louis, USA and sulfo-NHS (N-hydroxysulfosuccinimide) from Fisher Scientific Hampton, USA. Irinotecan was purchased from LC Laboratories (Woburn, MA) and curcumin from Cayman Chemical, Michigan, USA.

Dynamic light scattering (DLS): The hydrodynamic diameter was determined from number-based distributions using a Malvern Zetasizer Nano ZS (laser, angle=173° C.) at a nanodiamond concentration of 50 μg/mL. Samples were prepared in deionized water, DMEM containing 10% FBS and sonicated for 1 min prior to the measurements. Serum stability of the samples was measured at 0, 24, 48 and 72 h after incubation of NDs at 37° C. in DMEM containing 10% FBS.

Synthesis of ND-PEG. PEG-grafted ND nanoparticles were synthesized according to the method described previously. Briefly, the NDs (1.0 mg mL$^{-1}$) were sonicated using probe sonicator for 5 min. EDC (8.35 μg) and sulfo-NHS (9.5 μg) dissolved in water were then added into the ND suspension. After 30 min of stirring, the mPEG-Amine (200 μg dissolved in water) solution was added to the activated ND solution and the resulting mixture was allowed to stir for overnight at RT. The amine groups of PEG reacted with the activated carboxyl groups to form stable amide bonds resulting PEGylated ND nanoparticles. The excess reagents were removed by centrifugation at 14,000 rpm for 2 h and samples were washed in deionized water.

Molecular modeling. A nanodiamond system was built to a dimension of approximately 50 Å in diameter consisting of 9570 atoms. Building upon previously established methods in the Caulfield Lab, the ND complexes were constructed. The lattice was built within Schrödinger using a script and code to generate a spherical function from the origin. Then PEG arms of PEG-12 length (ending in —OMe) consisting of 19070 atoms were fused to the ND complex. Further, drug molecules were introduced into the system. Finally, a physiological milieu of Na$^+$ and Cl$^-$ ions were added to a solvated box surrounding the ND using the SPC water model. The final simulation contained 230,003 atoms, which form a cubic cell of ~1,900 nm$^3$. The PEG chains, NDs and drugs were examined using refinement protocol and verified. The final system was subjected to energy optimization with PR conjugate gradient with an R-dependent dielectric for 25,000 steps with relaxing restraints. Each model was exported to the following formats: Maestro (MAE). Model manipulation was done with Maestro (Macromodel, version 9.8, Schrödinger LLC, New York, NY), or Visual Molecular Dynamics (VMD).[19] The refinement modeling was built as a using Schrödinger Maestro and VMD.[19, 20] Refer to the Supplementary Information for further details on molecular modeling.

Drug loading onto NDs. Both irinotecan (IRT) and curcumin (CUR) were loaded onto PEGylated NDs according to previously reported procedures with some modifications. Briefly, NDs were dispersed in 2.5 mM NaOH at a concentration of 1 mg mL$^{-1}$ by probe sonication for 5 min. Then, both IRT and CUR at 1:3 w/w ratio (IRT:CUR) from 50 mg mL$^{-1}$ DMSO stock of each were added and incubated for an overnight on rotating shaker at RT to allow adsorption of IRT and CUR on ND surface to yield ND-IRT+CUR. Finally, ND-IRT+CUR were purified from free drugs and 2.5 mM NaOH by centrifuging the resulting mixture at 14000 rpm for 2 h and washing the pellet with distilled water. The amount of free drug in the supernatant was analyzed by using a UV-VIS spectrometer. The drug loading efficiency (DLE) was calculated according to the following equation:

DLE=(drug added initially−drug in the supernatant after centrifugation)/(drug added initially)×100%.

The adsorption of IRT and CUR on ND surfaces was confirmed by measuring the absorbance of IRT at 370 nm and CUR at 428 nm using a SHIMADZU-UV spectrometer (UV-2401PC).

Characterization of NDs. FTIR spectra of PEGylated NDs and drug-loaded NDs were measured by JASCO-FT/IR-4600 spectrometer (JASCO Instrument Corp., MD, USA). ND powders were placed on the diamond chamber and the spectra were recorded immediately. A signal from a blank chamber was subtracted as a background for each sample. The hydrodynamic diameter was determined from number-based distributions using a Malvern Zetasizer Nano ZS (laser, angle=173°) at a ND concentration of 50 μg mL$^{-1}$. Samples were prepared in deionized water, DMEM containing 10% fetal bovine serum (FBS) and sonicated for 1 min prior to the measurements. Serum stability of the samples was measured at 0, 24, 48 and 72 h after incubation at 37° C. in DMEM containing 10% FBS.

Transmission electron microscopy. Both ND-COOH and the PEGylated NDs were analyzed by electron microscopy using FEI Tecnai 12a. The samples were prepared by previously published methods. Briefly, the particles were centrifuged into a pellet in liquid agar. The agar was hardened and then dehydrated with ethanol followed by 100% acetone. The samples were then embedded in epoxy resin and polymerized in an oven overnight at 65° C. Ultrathin (70-90 nm) sections were cut with a diamond knife and examined with a transmission electron microscope.

Cell growth inhibition. AsPC-1 and PANC-1 cell lines were obtained from American Type Culture Collection (ATCC), VA, USA. PANC-1 cells were maintained in DMEM and AsPC-1 cells were maintained in RPMI-1640. All culture media were supplemented with 10% fetal bovine serum (FBS), 100 U/ml penicillin and 100 mg/ml streptomycin at 37° C. in a humidified 5% CO$_2$ incubator. The cytotoxicity of NDs and drug-loaded NDs was assessed by the CellTiter-Glo® luminescent cell viability assay according to the manufacturer's instructions (Promega, WI, USA). To this end, cells were seeded at a density of 5000 cells per well in 384-well plates for 18 to 24 h then treated with NDs across the concentration ranges 0-100 μg mL$^{-1}$ of ND concentration. After 72 h, samples were collected for assessment of cytotoxicity. 100 μg of NDs contain 9 μg of CUR and 3 μg of IRT and NDs containing the corresponding amount of the individual drugs were used for comparison. The samples were analyzed using a Spectramax i3x microplate reader (Molecular Devices, LLC., CA, USA)

Tumor uptake of NIR-dye loaded NDs. Genetically engineered (KPC) mice were obtained breeding of LSL-Kras$^{G12D/+}$ with p53$^{flox/flox}$ mice in our laboratory. The animals were housed in the institutional animal facilities. The animal studies were performed under protocols approved by the Mayo Clinic Institutional Animal Care and Use Committee. Tumors were initiated by injecting 50 μL of Ca5cre adenovirus orthotopically into the pancreas of male KPC mice. After 30 days, when tumors were palpable NIR dye (ir-780 iodide, Sigma) bounded PEGylated NDs (0.5 mg kg$^{-1}$ of dye) was injected intraperitoneally, and mice were imaged after 24 h with IVIS Spectrum In Vivo Imaging System (Perkin Elmer, MA, USA) using 745 and 800 nm filters. Finally, major organs, i.e., liver, lung, kidney, spleen, and tumor were collected and subjected to ex vivo imaging. Organs from untreated mice were used as a control to avoid autofluorescence from the instrument and animals. Additional in vino tumor efficacy: Female Kras+/−p53flox/flox mice (6-8 weeks old) were obtained from in-house breeding and housed in the institutional animal facilities. All animal studies were performed under protocols approved by the Mayo Clinic Institutional Animal Care and Use Committee. To establish the spontaneous tumor model, approximately 50 μL Ca5cre Adenovirus were slowly injected orthotopically into the pancreas of Kras+/−p53flox/flox mice. The tumors were allowed to grow for four weeks and then randomly divided into 5 groups (n=5). The mice were treated with vehicle (PBS) or 100 mg/kg of ND, ND-IRT (5 mg/kg IRT equivalent), ND-CUR (15 mg/kg CUR equivalent), ND-IRT-CUR (5 mg/kg IRT equivalent+15 mg/kg CUR equivalent) twice per week for four weeks by i.p. injection. After four weeks of treatment, mice were sacrificed, tumors were harvested and measured with slide calipers and weighed. Tumor volume was calculated using an equation: V=½×a×b2 mm3, where a is the largest diameter, and b is the smallest diameter Anti-tumor efficacy of drug-loaded NDs. To establish the tumor model, approximately 50 μL Ca5cre adenovirus were slowly injected orthotopically into the pancreas of Kras$^{+/-}$p53$^{flox/flox}$ mice. The tumors were allowed to grow for four weeks and then randomly divided into 5 groups (n=5). The mice were treated with vehicle (PBS) or 100 mg kg$^{-1}$ of ND, ND-IRT (5 mg kg$^{-1}$ IRT equivalent), ND-CUR (15 mg kg$^{-1}$ CUR equivalent), ND-IRT-CUR (5 mg kg$^{-1}$ IRT equivalent+ 15 mg kg$^{-1}$ CUR equivalent) twice per week for four weeks by i.p. injection. After four weeks of treatment, mice were sacrificed, tumors were harvested and measured with slide calipers and weighed. Tumor volume was calculated using an equation: V=½×a×b$^2$ mm$^3$, where a is the largest diameter, and b is the smallest diameter. Experiments were also conducted using the p53$^{+/LSL-R172H}$ KPC (mutant p53) mouse model displaying the same phenotype as the p53 knockout mice. The animals were obtained breeding of LSL-Kras$^{G12D/+}$ with p53$^{+/LSL-R172H}$ mice in our laboratory and housed in institutional animal facilities. Tumors were established similar way mentioned above by injecting 50 μL of Ca5 adenovirus in the head of the pancreas. After four weeks, once tumors were palpable, the mice were randomized into 5 groups (n=5 per group) and treated with above-indicated formulations twice a week for four weeks. After two days of the last treatment mice were sacrificed, harvested tumors, tumor volume was measured and tumor weight was noted.

Immunohistochemical analysis. Tumors and major organs were harvested and fixed in 10% formalin at RT for 24 h prior to paraffin embedding and sectioning. Sections were subjected hematoxylin and eosin (H&E), Ki67, cleaved caspase-3 (CST, MA, USA), IL-10 (Bio legend, CA, USA), LY6G (Thermo Fisher, USA), YM1 (STEMCELL Technologies Inc., V6A 1B6, Canada), and F4/80 staining according to the manufacturer's instructions. Stable diaminobenzidine was used as a chromogen substrate and the sections were counterstained with a hematoxylin solution. Slides were digitized with the Aperio AT2 slide scanner (Leica) and analyzed using image scope software (Leica).

Cytokine-chemokine profiling. Quantification of pro- and anti-inflammatory mediator release by KPC mice following the indicated exposures was performed by using the Luminex® assay as described previously. Serum samples were collected from mice and stored at −80° C. until further analysis. Cytokine profiling was performed using the Bio-Plex Pro™ Mouse Cytokine 23-plex Assay (BioRad Laboratories AB, Sweden). This kit detects the following concentrations of the following 23 analytes: IL-1α, IL-10, IL-2, IL-3, IL-4, IL-5, IL-6, IL-9, IL-10, IL-12 p40, IL-12 p70, IL-13, IL-17A, eotaxin (CCL11), G-CSF, GM-CSF, IFN-γ, KC, MCP-1, MIP-1α, MIP-10, RANTES and TNF-α. The assay was performed according to the manufacturer's instructions, with the following modifications: serum samples were diluted 4-fold and the analyses were performed in triplicates. The samples were measured using the Bio-Plex® 200 system (Luminex® xMAP Technology) operating with Bio-Plex® software (Bio-Rad). The cytokine-chemokine expression data retrieved from the multiplex assay were analyzed using hierarchical clustering analysis as described previously. Complete linkage and Euclidean distances were employed as metrics to draw association dendrograms between cytokines-chemokines and the different treatment conditions. The cluster analysis and the corresponding heat maps were prepared by using R, as described.

Statistical analysis. The data are plotted as mean values±S.D. where applicable. The probability of significant differences between groups was analyzed by independent-sample t-test. p<0.05 (*) and p<0.01 (**) were considered statistically significant and highly statistically significant, respectively.

Results and Discussion

Synthesis of PEGylated NDs.

Figure 23:
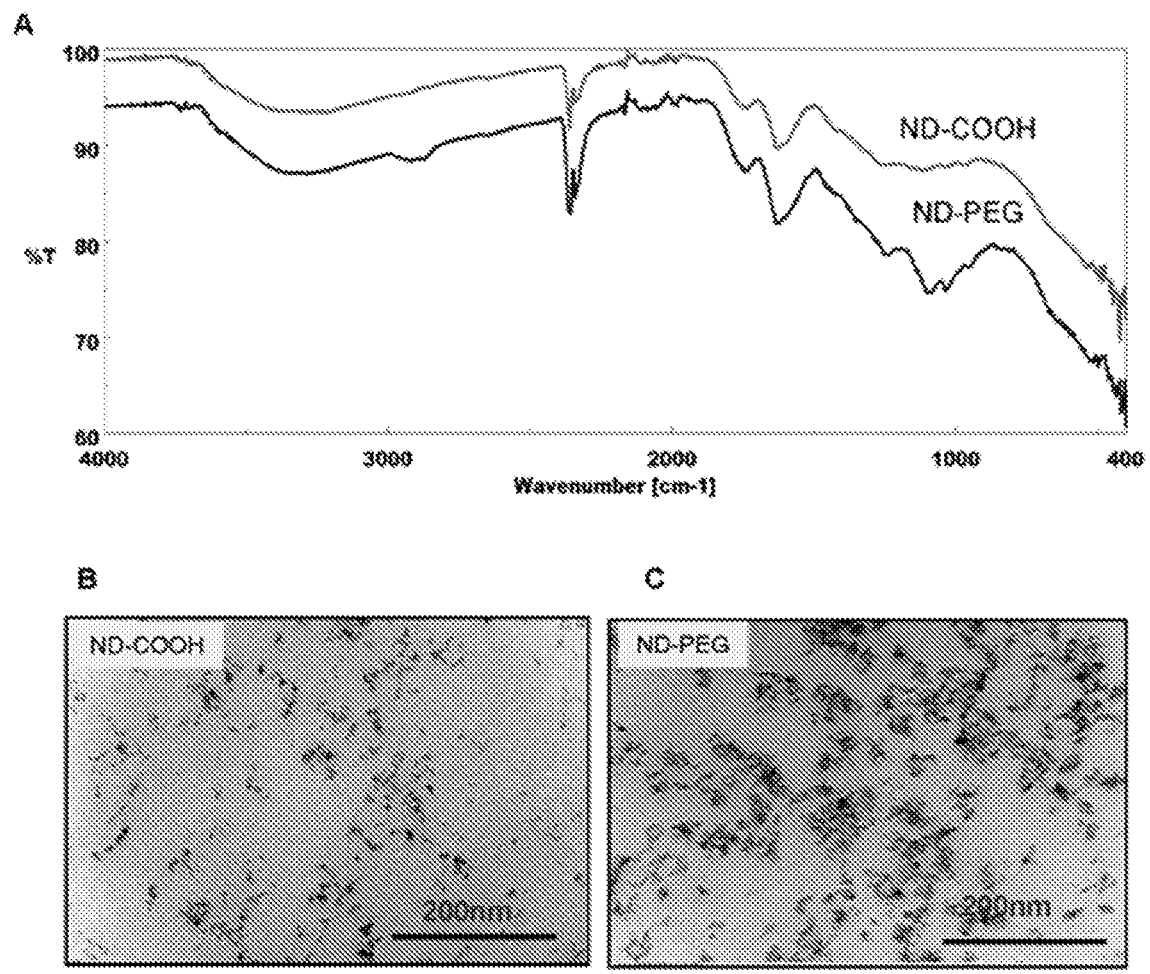
FIG. 23. Confirmation of PEGylation through FTIR and TEM examination for size measuring. FTIR analysis of ND-COOH and ND-PEG (A). TEM images of ND-COOH (B) and ND-PEG (C).

To improve the dispersibility and stability of the carboxylated NDs, ne NDs were conjugated with poly(ethylene glycol) (PEG) moieties. PEGylated NDs were synthesized via formation of an amide bond between ND-COOH and mPEG-amine by using EDC and sulfo-NHS acid-amine coupling reaction method. After purification, PEGylation was confirmed by FTIR analysis (FIG. 23A) and transmission electron micrograph (TEM) analysis (FIG. 23B-C) for both ND-COOH and ND-PEG respectively.

Molecular Modeling for Nanodiamond Identifies Prospective Structure Cooperative for Drug Binding.

Molecular dynamics simulations were employed to assess the interactions between NDs and drugs, which have not previously been studied in relation to ND-mediated drug delivery. Molecular modeling was utilized to make informed decisions about the propensities of irinotecan and curcumin to bind to ND surfaces. Irinotecan (IRT) was selected for the study as the liposomal formulation of this drug is approved for the treatment of metastatic PDAC. However, the drug itself is poorly water-soluble thereby severely limiting its use. NDs, on the other hand, may facilitate the delivery of water-insoluble drugs. Curcumin (CUR) is a compound known for its anti-cancer and anti-inflammatory properties. Reported herein is atomic-level of detail for ND models with drugs binding, which have quantitative characteristics that are consistent with the experimental observations. Modeling performed using statistical mechanics approaches and molecular mechanics yielded a docked structure that demonstrates physical relaxation with simulations. Small simulations were completed to study ND complex affinity with IRT and CUR molecules (FIG. 16A-B). The water box size consists of >2.2 million cubic A (or >1900 nm$^3$); giving the system over 230,000 atoms within the box and the box has dimensions of approximately 132 Å per edge (X, Y, Z). The ND complex consisted of 9570 ND atoms, 7238 atoms for the PEG-12OMe arms, 2262 atoms for the drugs coating the ND surface, and yielding 19070 atoms for the entire complex. Other atoms consisted of drugs free in solution and the physiological milieu of solvent (water and salt). The ND has an inner diameter of 54.27 Å or approximately 5.4 nm (FIG. 24A). The particle is free to tumble and migrate during simulation; however, periodic boundary conditions with Particle-Mesh Ewald are utilized to ensure accuracy (see Supplementary Information). When examining the particle in detail (FIG. 24B) the bulk of the captured drug has interaction via van der Waals and π-π cloud interactions of drugs and ND, and the ND seems to assist in increasing the aggregate concentration locally to the ND within a 3.5 Å cutoff 14 IRT and 32 CUR, which gives 46 drugs per ND surface, or a ratio of 30.4% IRT and 69.6% CUR Aa a distance of up to 6 A cutoff, the distribution of ~three IRT for every seven CUR persists, showing preference for CUR binding during the isothermal-isobaric ensemble (NPT) simulations (FIG. 16A-B). Docking assessments of the binding were completed using the algorithm, which takes into consideration factors like lipophilicity, displacement of water, hydrogen bonding, and electrostatic interactions and metal ion/ligand interactions as favorable interactions, whereas desolvation of polar or charged groups, restriction of motion, and the entropic cost of binding can adversely affect the score. The in silico studies provide support for the rationale design of the drug delivery systems and assist with determining the bound drug structure and rank the most favorable drug binders, which assists in guiding the experiments. To our knowledge, this is the first report of utilizing computational all-atoms models of NDs for structural design implementation as a tool towards targeted delivery of cancer therapeutics. This method may be generalized for fabricating many kinds of ND complexes that target various molecular substrates for cancer-based drug therapies.

Physical Characterization of Drug-Loaded NDs.

Figure 17A:
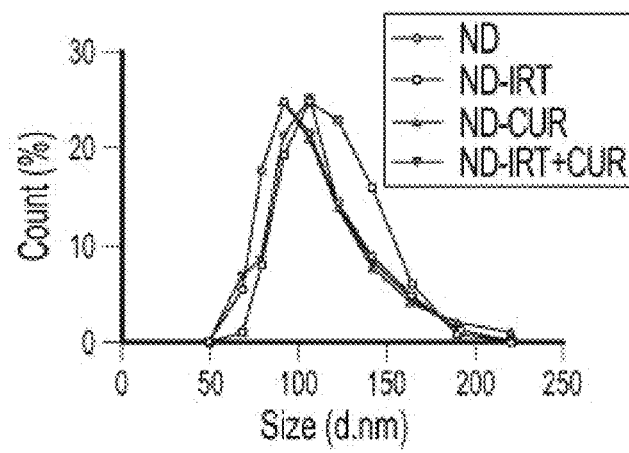
FIG. 17. Physical characteristics and in vitro efficacy of drug loaded NDs. Hydrodynamic size (A) and zeta potential of ND, ND-CUR, ND-IRT, ND-IRT+CUR in water. The stability of NDs measured by size (C) and PDI (D) in DMEM containing 10% FBS at varying time-points up to 72 h. (E-F) The in vitro cytotoxicity of NDs was assayed in (E) AsPC-1 and (F) PANC-1 cell lines after treating cells with increasing concentrations of NDs loaded or not loaded with drugs for 72 h.

Based on the molecular docking results described above, NDs were loaded with both IRT and CUR. The drugs were adsorbed onto the PEGylated NDs by varying the weight ratios of ND:IRT:CUR from 10:3:9 to 10:0.05:0.15. No free drug was observed in the supernatant at the maximum ratio of 10:0.25:0.75 and this therefore was considered this as the optimum drug loading. The formation of ND-drug complexes was confirmed by FTIR (FIG. 16C) through the recognition of characteristic parent drug peaks (FIG. 16D) and by using UV-visible spectroscopy in order to identify the maximum absorption peaks for ND-IRT, ND-CUR and ND-IRT+CUR. Arrows show the maximum absorption peaks for ND-IRT, ND-CUR and ND-IRT+CUR in FIGS. 16E, F, and G, respectively, at 370 nm for IRT and 428 nm for CUR. The hydrodynamic sizes of PEGylated ND, ND-IRT, ND-CUR and ND-IRT+CUR complexes in cell culture medium (DMEM) supplemented with 10% FBS are illustrated in FIG. 17A. The sizes of ND and ND-drug complexes were within the range of 10-20 nm in water and 50-120 nm in DMEM containing 10% FBS (Table 3). The comparatively higher sizes in DMEM with 10% FBS are presumably due to the adsorption of serum proteins on the surface of the NDs. Nevertheless, the particles remained around 100 nm also in the presence of FBS demonstrating that they do not excessively aggregate or agglomerate in a biological medium. Table 3 provides Physical characterization of ND, ND-IRT, ND-CUR and ND-IRT-CUR: Size and PDI of ND, ND-IRT, ND-CUR and ND-IRT-CUR in Water and DMEM containing 10% FBS.

TABLE 3

Hydrodynamic diameters of NDs with/without drugs

| | | Water | | DMEM + 10% FBS | |
|---|---|---|---|---|---|
| S.No. | Sample | size (nm) | PDI | size (nm) | PDI |
| 1 | ND | 11 ± 5 | 0.4 ± 0.01 | 105 ± 15 | 0.32 ± 0.01 |
| 2 | ND-IRT | 18 ± 3 | 0.2 ± 0.01 | 123 ± 18 | 0.24 ± 0.01 |
| 3 | ND-CUR | 19 ± 2 | 0.2 ± 0.01 | 68 ± 10 | 0.22 ± 0.01 |
| 4 | ND-IRT-CUR | 19.2 ± 1.8 | 0.21 ± 0.01 | 95 ± 17 | 0.321 ± 0.01 |

Figure 17B:
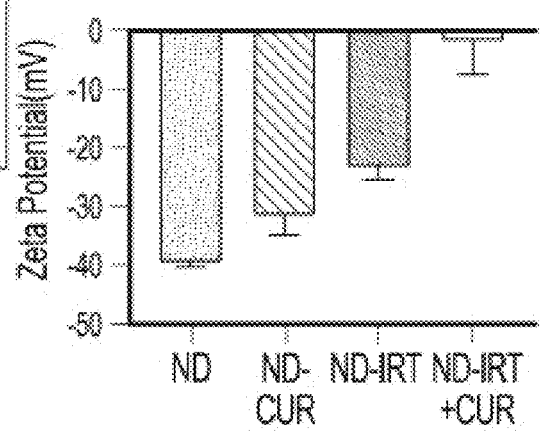
Figure 17C:
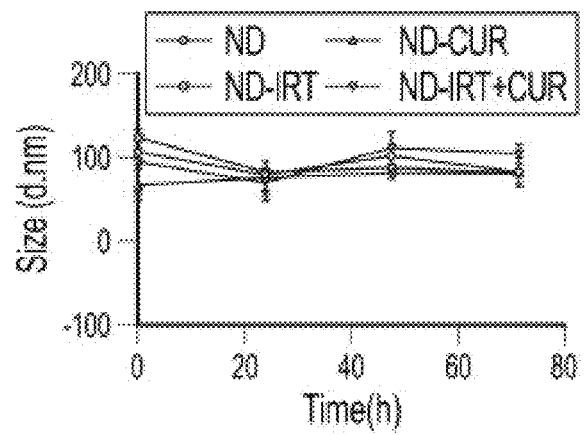
Figure 17D:
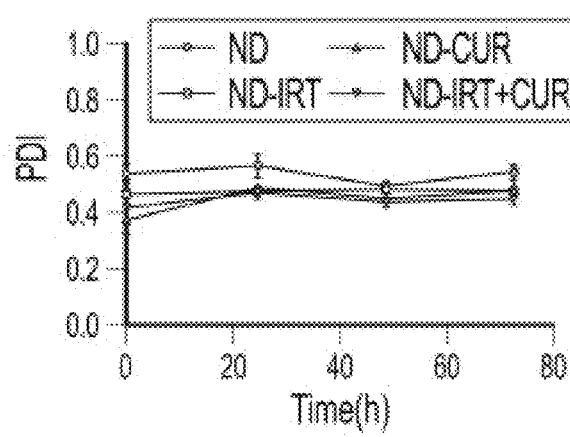

Importantly, as highlighted by Ho and colleagues, NDs present with a high adsorption capacity allowing for efficient drug loading while maintaining a ND-drug complex size suitable for effective passive targeted therapy. In their seminal study, Chow et al. reported that NDs complexed with doxorubicin displayed an average size of about 80 nm and this was found to yield favorable biodistribution of these complexes in mice. Being of the "right size" is important in order to better exploit the so-called enhanced permeability and retention (EPR) effect while at the same time allowing for (renal) clearance of the nano-carriers from the body. This, and a lack of toxicity make PEGylated NDs promising from the point of view of clinical translation. In addition, the simplicity of the synthesis methods and batch-to-batch reproducibility alleviate the barriers to translation related to the synthetic process, reproducibility and feasibility of industrial scale-up. The average zeta potentials of the PEGylated ND, ND-IRT, ND-CUR, and ND-IRT+CUR complexes are reported in FIG. 17B. As can be seen, the values gradually approached a neutral surface charge with increased drug loading suggesting that ND surfaces were occupied by the drugs. Furthermore, the sizes and PDI values of these NDs (FIGS. 17C & 17D) did not change significantly up to 72 h incubation at 37° C. in DMEM containing 10% FBS suggesting a highly stable dispersion of the nanoparticles in physiological conditions.

In-Vitro Cytotoxicity of Drug-Loaded NDs in PDAC Cells.

Figure 17E:
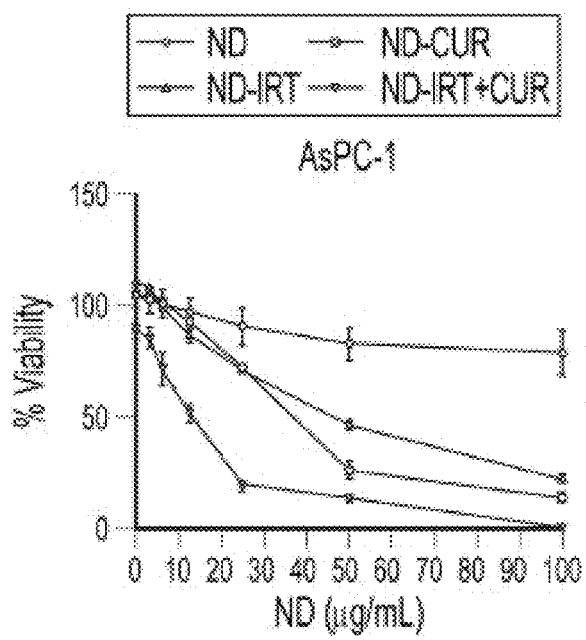
Figure 17F:
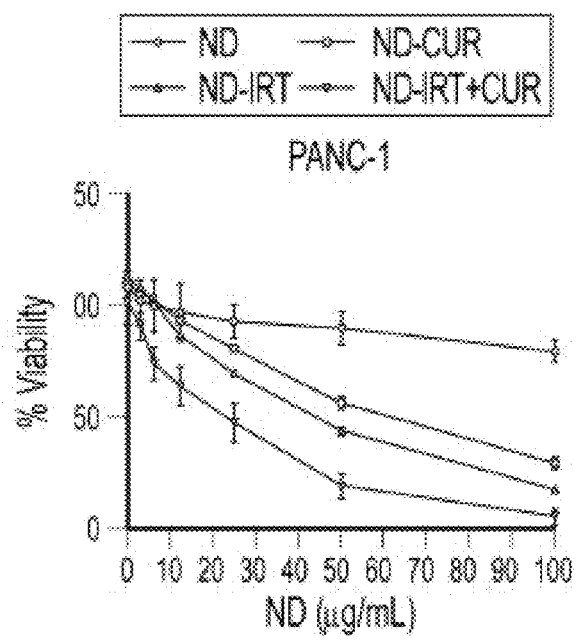

Next, the in vitro toxicity of the drug-loaded NDs was assayed in human AsPC-1 and PANC-1 cells harboring mutations in the KRAS and TP53 genes after 72 h of treatment. The results are shown in FIG. 17E (AsPC-1) and FIG. 17F (PANC-1) clearly demonstrated that NDs carrying the two drugs (IRT and CUR) in combination was more effective in killing PDAC cells when compared to NDs carrying the individual drugs. It was also found that NDs alone without drugs were nontoxic up to 100 µg mL$^{-1}$ in line with previous work. Cell killing was observed most prominent for the AsPC-1 cells.

Enhanced Penetration and Therapeutic Efficacy of Drug-Loaded NDs in PDAC Tumors Developed in LSL-Kras$^{G12D/+}$; Trp53loxP$^f$/loxP Mice.

It was then determined whether the PEGylated NDs would reach the target tissue which is a prerequisite for successful drug delivery. To this end, tumors were initiated using a pancreas-restricted Pdxl promoter to express Cre recombinase (Pdxl-cre) in Kras$^{LSL-G12D/+}$; Trp53loxP$^f$/loxP mice as described in Methods. Then, NDs absorbed with the DOX were injected intraperitoneally, and major organs, i.e., liver, lung, kidney, spleen, and tumor were harvested at 48 h post-exposure and subjected to ex vivo imaging by using IVIS as reported previously by us. As noted in FIG. 18A, whole-body NIR fluorescence imaging indicated significant tumor uptake at 24 h. This was further confirmed by ex vivo imaging of tumors and other organs (liver metastasis [Lm], kidney [K], spleen [S] lung [Lu], heart [H]) 24 h post injection FIG. 18B. NIR-NDs were also observed in the liver and this is likely due to the presence of liver metastasis (see histopathological findings below). Moreover, these tumor sections were examined by TEM to further validate the results obtained from IVIS and as shown in FIG. 18C, the presence of NDs in the tumor cell is clearly detectable.

Next, the in vivo therapeutic efficacy of the novel drug-loaded, PEGylated NDs was tested in an immunocompetent aggressive PDAC model developed by injecting Ca5cre adenovirus into the pancreas of Kras$^{LSL-G12D/+}$; p53$^{flox/flox}$ mice (KPC mice). These mice developed spontaneous PDAC tumors within 2-3 weeks of adenovirus inoculation in the head of the pancreas by survival surgery. After four weeks, when the tumors had reached the most advanced stage (histologically proven by examining tumors after different days of adenovirus injection) and also were palpable by hand, mice were randomized into five groups prior to the initiation of treatment. The results depicted in FIGS. 19A & B show the tumor volume and tumor weight, respectively, of the different treatment groups after 4 weeks of treatment. Although the single ND-IRT treated group showed some inhibition of tumor growth compared to control, ND or ND-CUR treated groups, the responses in the ND-IRT+CUR group were significantly more pronounced. NDs alone without drug loading were no different than control animals (FIGS. 19A & B). The evaluation of Ki67-positive cell nuclei in tumor sections for all the treatment groups corroborated these results (FIG. 19C). Additionally, H&E staining revealed less nuclear staining. These results are suggestive of an anti-proliferative effect of ND-IRT+CUR. Furthermore, increased expression of cleaved caspase-3 (i.e., apoptosis marker) was observed in treatment groups especially ND-IRT+CUR (FIG. 19C). It was also observed that the ND-IRT+CUR treated group displayed markedly reduced liver metastases versus control (FIG. 19E). No gross abnormalities (toxicities) were observed in major organs including kidney and spleen (FIG. 20B), and the mice did not show significant changes in endpoint body weight (FIG. 25A) suggesting no overt toxicity.

ND-Mediated Immune-Modulation of the Tumor Microenvironment.

Figure 20:
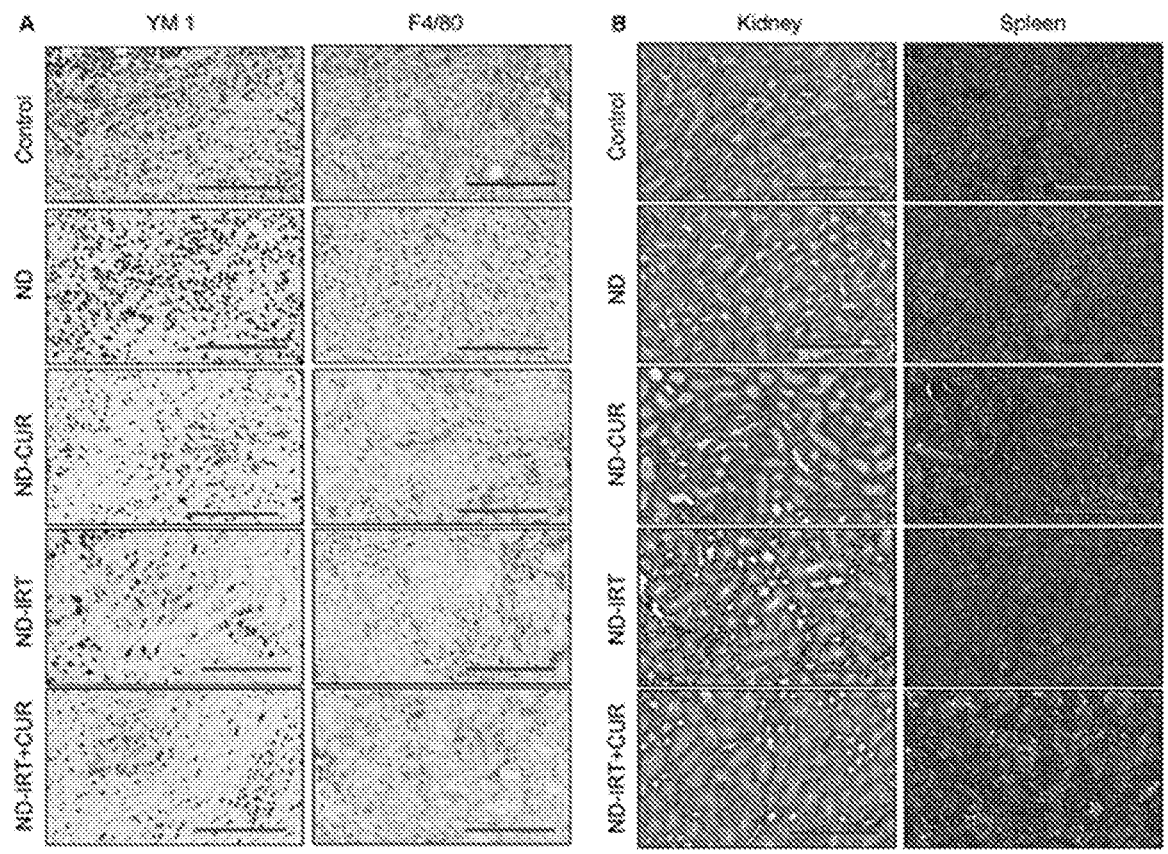
FIG. 20. Macrophage markers and toxicity evaluation. (A) Tumor sections obtained from the treatment groups of mice treated as described in the legend to the preceding figure were excised and subjected to immunohistochemical analysis of the M2-marker, Ym1 and the general macrophage marker, F4/80. (B) H&E staining of kidney and spleen of treatment groups. Scale bar=200 μm.
Figure 26:
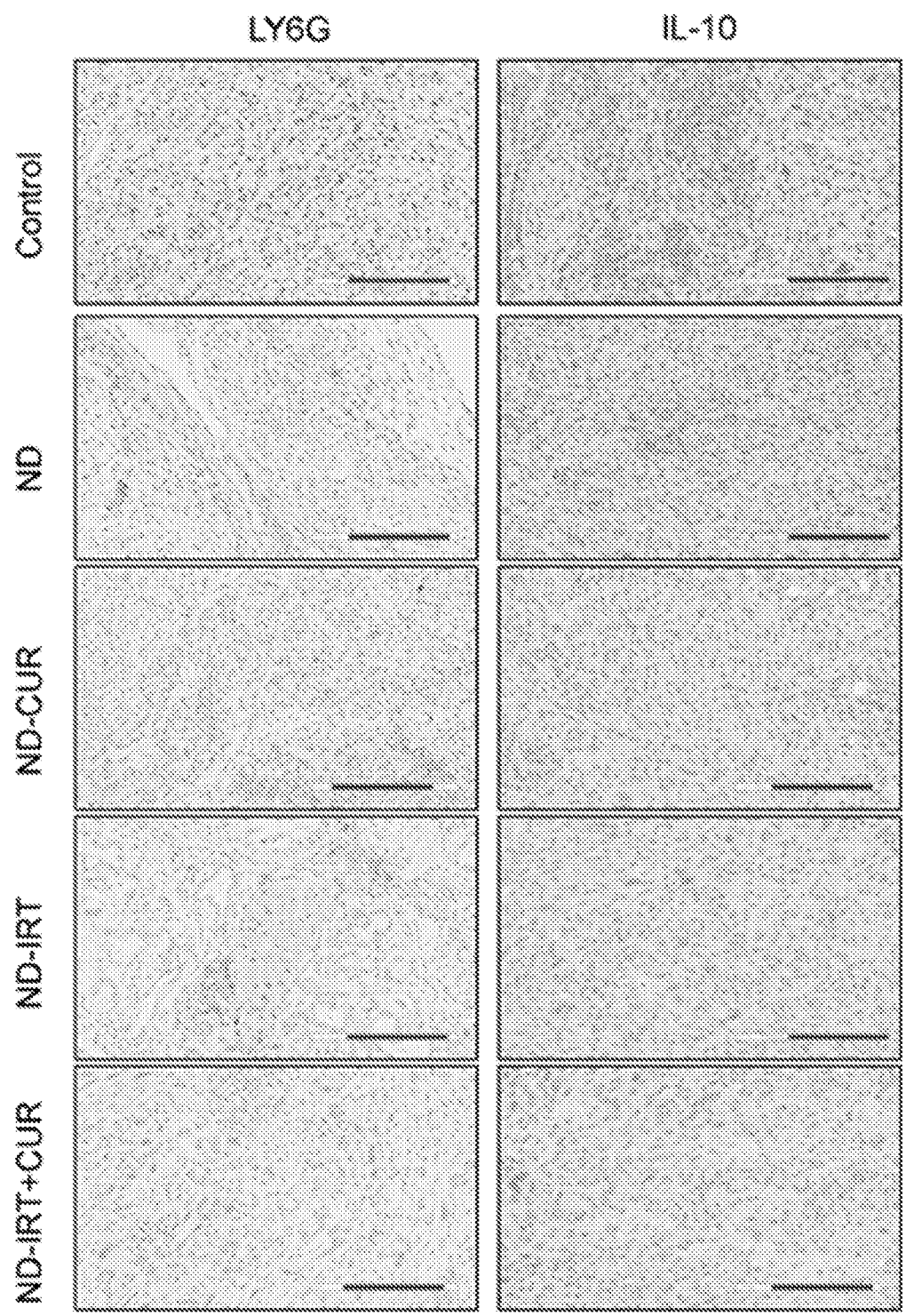
FIG. 26. Immunohistochemistry (IHC) of tumor sections for LY6G and IL-10 staining. After 2×/wk treatment for 4 weeks with vehicle control, ND, ND-IRT (5 mg kg$^{-1}$ IRT equivalent), CUR (15 mg kg$^{-1}$ CUR equivalent) and ND-IRT+CUR (5 mg kg$^{-1}$ IRT equivalent+15 mg kg$^{-1}$ CUR equivalent) tumor sections were stained for LY6G and IL-10 expression.
Figure 27A:
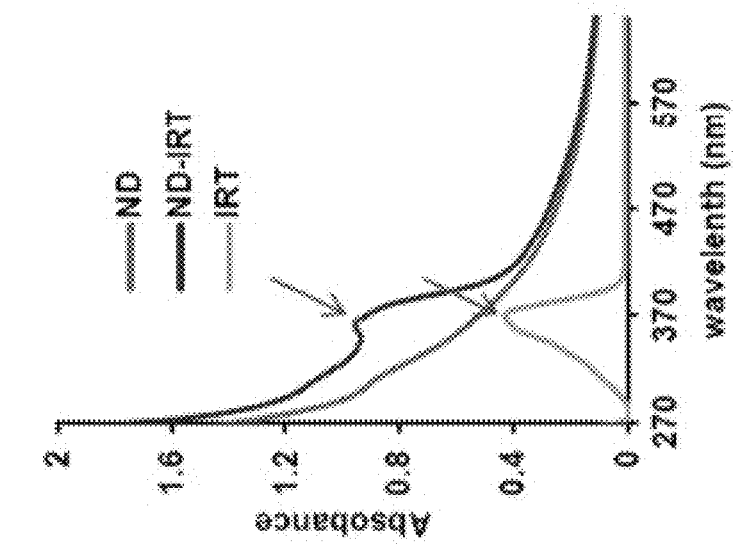
FIG. 27. Irinotecan (IRT) and Curcumin (CUR) binding profile of ND conjugates. Confirmation of (A) IRT (B) CUR and (C) both IRT and CUR binding on ND by UV absorbance analysis. Representative peaks are shown using arrows in the spectrum.
Figure 27B:
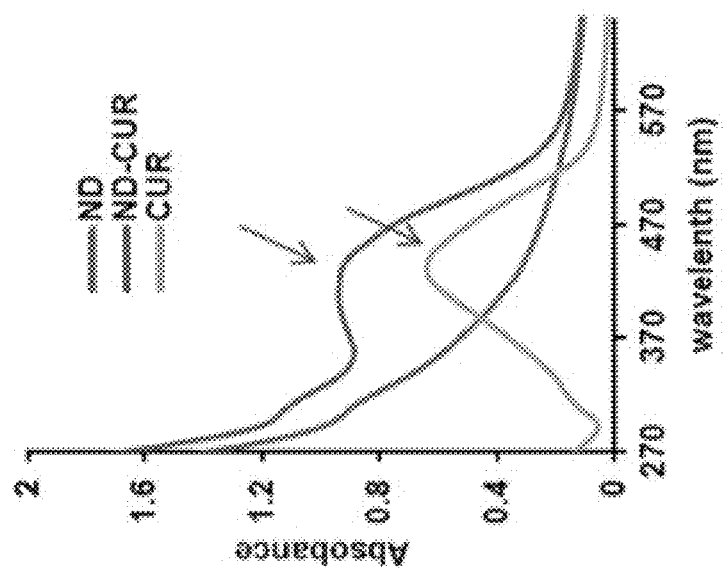
Figure 27C:
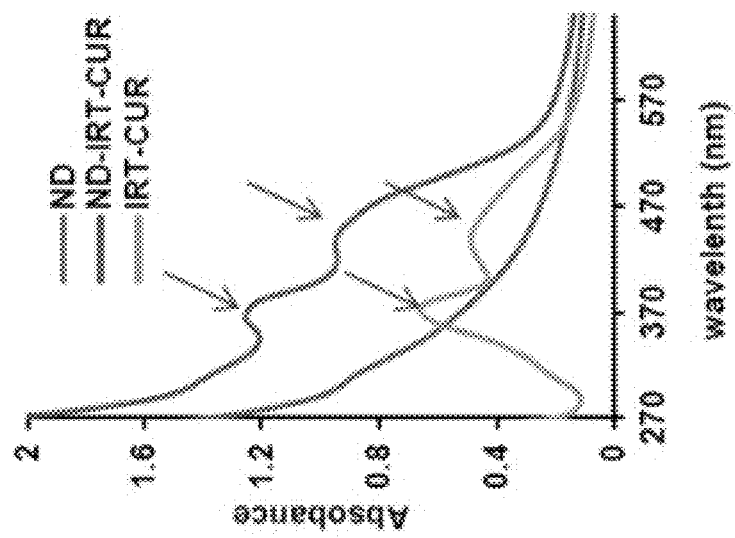

Next, It was evaluated whether the NDs with/without drug cargoes exerted any immunomodulatory effects. Macrophages can be polarized into pro-inflammatory (M1) or anti-inflammatory (M2) phenotypes, and it was of considerable interest to identify potential nanoparticle effects on macrophage polarization, especially effects on so-called tumor-associated macrophages. As shown in FIG. 20A, there was a reduction of Ym1, characteristic of M2 macrophage polarization, as well as the common macrophage marker, F4/80 in tumors in treated groups versus control. Furthermore, it was noted that Ly6G and IL-10, both characteristic of M2 polarization of macrophages, were downregulated following 4 weeks of treatment of KPC mice (FIG. 26).

Figure 21B:
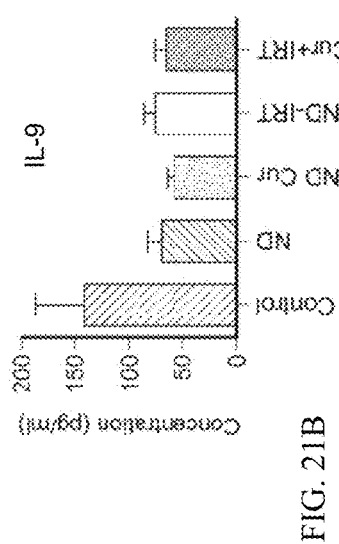
FIG. 21. Cytokine/chemokine profiling of ND-treated KPC mice. Serum samples were obtained from the indicated groups of mice treated as detailed in the legend to FIG. 3 and analyzed by using a Bio-Plex Pro™ Mouse Cytokine 23-plex Assay. (A) Heat map depicting the hierarchical clustering analysis of cytokine, chemokine, and growth factor secretion. Each branch in the dendrograms shows the similarity between samples; the shorter the branch, the more similar the samples. Association clusters for the different treatments and for the secreted factors are represented by dendrograms at the left and at the top of the heat map, respectively. The data shown are the mean values derived from 5 animals per group. Expression of IL-9 (B), IL-10 (C), and IFN-γ (D) in serum samples obtained from the indicated groups. Data shown are mean values±S.D. (n=5).
Figure 21C:
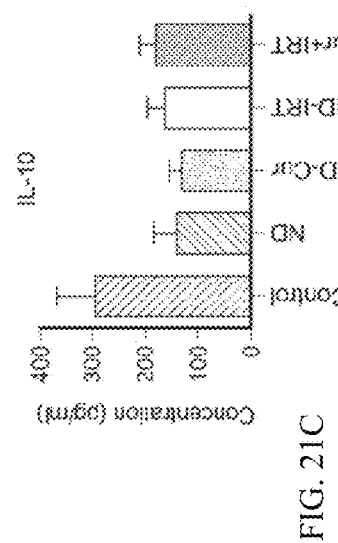
Figure 21D:
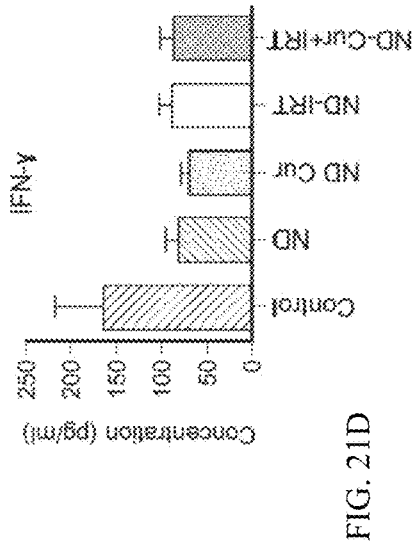
Figure 21A:
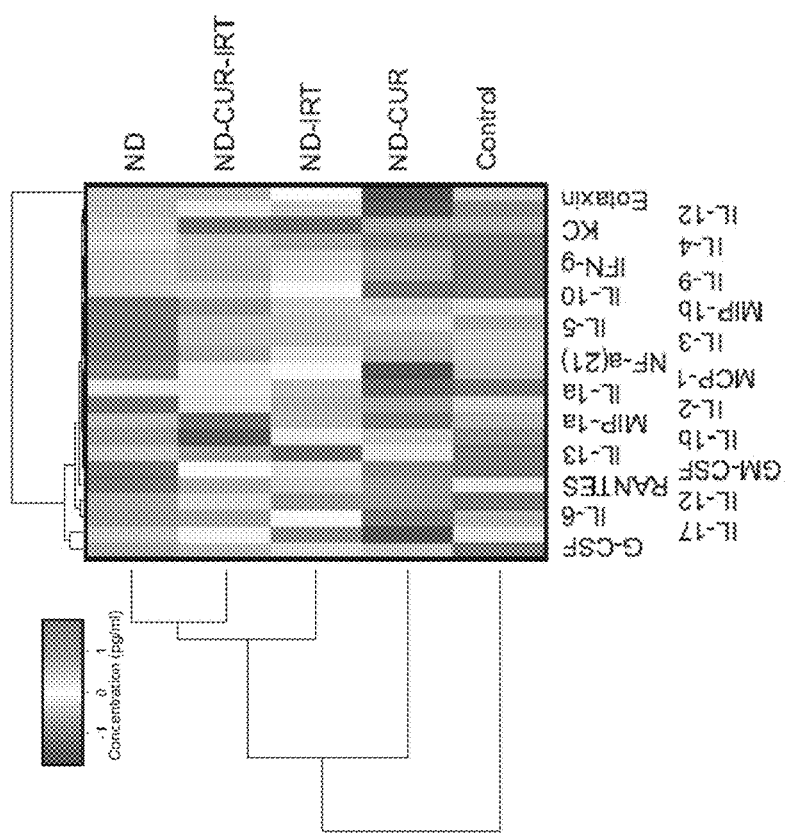

To further evaluate the immunological impact of the different exposures, a multiplex-based analysis was conducted using the 23-plex mouse cytokine array. Serum samples were analyzed with respect to the expression of IL-1α, IL-1β, IL-2, IL-3, IL-4, IL-5, IL-6, IL-9, IL-10, IL-12 p40, IL-12 p70, IL-13, IL-17A, eotaxin (CCL11), G-CSF, GM-CSF, IFN-γ, KC, MCP-1 (MCAF), MIP-1α, MIP-1β, RANTES and TNF-α. Hierarchical clustering analysis was performed as described in Methods in order to draw associations between cytokine responses evidenced for the treated versus untreated mice. The analysis showed that the ND treated samples clustered separately from controls (FIG. 21A). Furthermore, the cytokines IL-9, IL-10, and IFN-γ were all downregulated in mice treated with NDs when compared to the untreated animals (FIGS. 21B-D), and this was true irrespective of whether or not the NDs carried any drug, suggesting an effect of the NDs per se.

Validation of Anti-Tumor Activity of Drug-Loaded NDs in PDAC Tumors Developed in LSL-Kras$^{G12D/+}$; p53$^{+/LSL-R172H}$ Mice.

Finally, the efficacy of our novel drug-loaded NDs was tested in another model of aggressive PDAC harboring mutant p53 (p53$^{+/LSL-R172H}$) These mice carry a conditional point mutant allele of the p53 gene (p53R172H) that is functionally equivalent to a null mutation or "knockout" of p53. After Cre-adenovirus injection, the tumors were allowed to grow for four weeks and treated with indicated groups twice a week for an additional four weeks. The results portrayed in FIG. 22A (tumor volume) and FIG. 22B (tumor weight) clearly demonstrated that the combination treatment group (ND-IRT+CUR) displayed significantly inhibited tumor growth in comparison with individual drug-treated groups or the control group. Additionally, it was noted that the results for the ND-IRT treated group were superior in this model when compared to the "standard" KPC model. As shown in FIG. 25B, the mice did not display significant changes in endpoint body weight suggesting no overt toxicity of the administered treatments. Furthermore, our immunohistochemical analysis showed that there was a pronounced anti-proliferative effect of the treatment, as evidenced by the H&E, Ki67, and cleaved caspase-3 results (FIG. 22C). Additionally, while the aggressive liver metastases were not observed in this model, a reduction of micro-metastases in the treatment groups versus control was observed (FIG. 22D).

The tumor microenvironment is an important feature of solid tumors and plays a role in tumorigenesis and metastasis as well as in the resistance to treatment. In particular, tumor-associated macrophages or TAMs are known to play a key role. In general, M2-polarized macrophages increase tumor growth and suppress immune responses to cancer cells while M1-polarized macrophages can reduce tumor growth by selectively killing cancer cells. Liu et al. reported that M2-polarized TAMs promoted epithelial-mesenchymal transition (EMT) in pancreatic cancer cells, partially through a Toll-like receptor (TLR)4/IL-10 signaling pathway. Notably, several studies have shown that nanoparticles may cause polarization or reprogramming of macrophages. Hence, liposomes can cause M2-like polarization leading to tumor growth, while iron oxide nanoparticles have been shown to cause a strong M1-polarization and reduction in tumor growth in mouse models of metastatic disease. The present results show that NDs caused a reduction of the M2 markers, Ym1 and Ly6G on macrophages in pancreatic tumors in KPC mice. It was also noted a decreased expression of IL-10, a cytokine characteristic of M2 macrophages. However, further studies are required to ascertain whether this putative M2-to-M1 switch is linked to a tumor suppressive as opposed to tumor-promoting effect in this model. The fact that NDs alone were capable of modulating M2 markers yet did not suppress tumor growth indicates that NDs alone are not sufficient and that the delivery of an anticancer drug(s) is required. Using a multiplex array, it was also demonstrated that NDs suppressed the expression of IL-10 in the systemic circulation of KPC mice, along with a suppression of IL-9, and IFN-γ. IL-10 is an important immunomodulatory cytokine and it has been shown to control the immunosuppressive tumor microenvironment in various mouse tumor models. For instance, recent work has shown that the local blockade of IL-10 promoted antitumor responses in mouse models of breast cancer. Furthermore, in a recent study using an orthotopic PDAC model as well as KPC mice, Daley et al. showed that NLRP3-mediated signaling promoted the expansion of immunosuppressive macrophages and that these effects were IL-10-dependent. IL-9, in turn, is a pleiotropic cytokine that has been suggested to exert both pro- and antitumor effects. Notably, recent in vitro work showed that IL-9 promotes pancreatic cancer cell proliferation and metastatic potential in a study using AsPC-1 and PANC-1 cells. IFN-γ was recently shown to be involved in antitumor responses in an orthotopic mouse model of PDAC in the context of paclitaxel treatment. IFN-γ was suggested to cause sensitization to paclitaxel-induced apoptotic cell death in addition to its role in tumor immune surveillance. However, the role of IFN-γ in our animal model remains unclear.

Using the HepG2 liver carcinoma cell line, Cui et al. screened a panel of different nanoparticles and found that NDs act as potent autophagy inhibitors. The authors then demonstrated that NDs improved the therapeutic outcome of arsenic trioxide treatment in vivo in a liver tumor mouse model. In another recent study, NDs without any grafted surface ligands were specifically and efficiently targeted to a family of extracellular signaling molecules namely fibroblast growth factors or FGFs. The authors identified an evolutionarily conserved FGF recognition motif that contributed to the selectivity of these ND-FGF interactions. Thus, it appears that NDs could act as artificial proteins or protein "mimics" leading to specific biological effects. The fact that the results could show immunomodulatory effects of NDs in vivo, as evidenced by the suppression of specific cytokines in tumors as well as in systemic circulation, supports this notion. ND, therefore, are not only passive carriers of anti-cancer drugs but may also act as "nanologicals" that are capable of exerting beneficial therapeutic effects by themselves. This feature makes NDs particularly interesting.

Additional Results

Figures 28A, 28B:
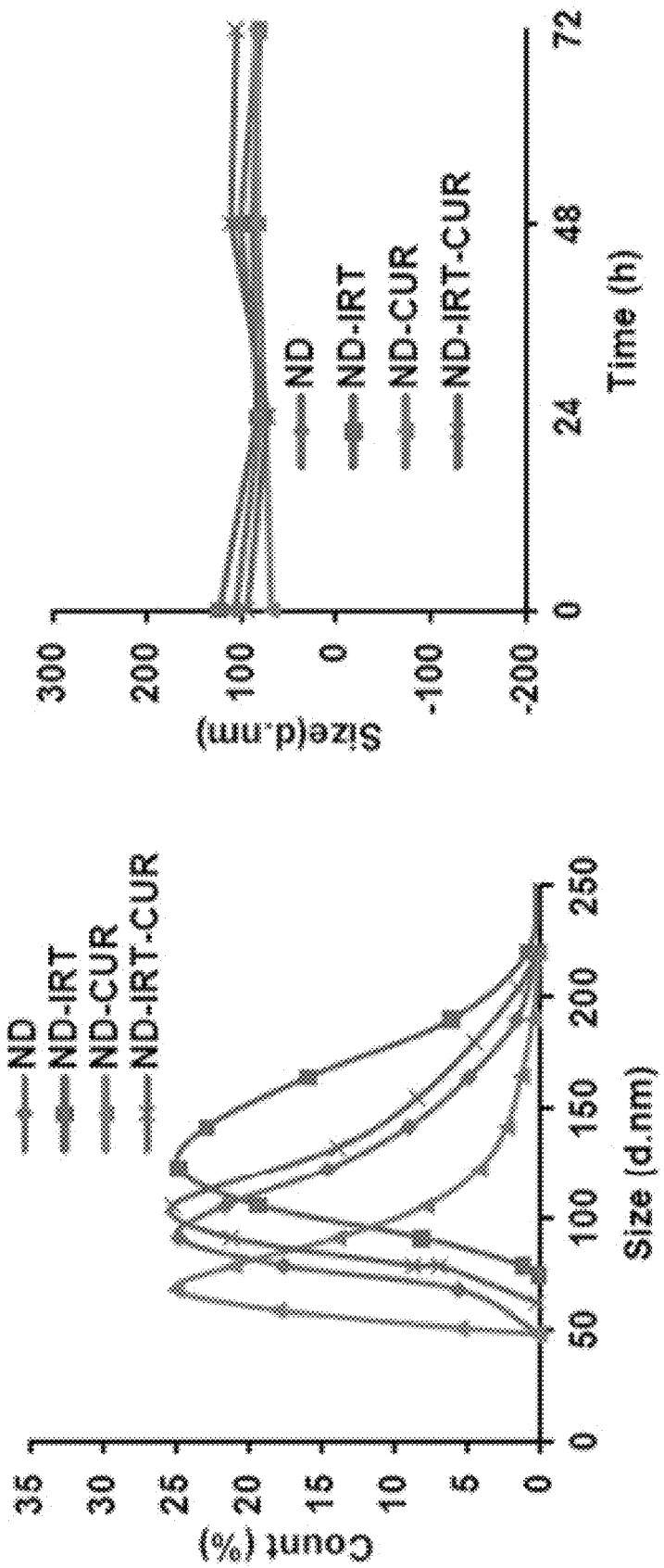
FIG. 28. Physical characterization of ND, ND-IRT, ND-CUR and ND-IRT-CUR: (A) Size, (B) stability In DMEM containing 10% FBS.

Physical Characterization of ND-drug conjugates. Recent studies have shown that nanodiamonds are biodegradable whereas other carbon nanoparticles like quantum dots of similar size are highly bio-stable. Therefore, nanodiamonds will be a better choice as drug delivery agents in vivo. However, the aggregation of ND-COOH in DMEM containing 10% FBS suggests that it may create solubility problems in biological systems. To overcome this limitation, the carboxylated NDs may be covalently conjugated with biocompatible PEG moieties to increase the dispersity and stability of NDs. It will also be helpful in avoiding enzymatic degradation or phagocytic attack. Therefore, PEGylated NDs were synthesized via formation of an amide bond between ND-COOH and mPEG-amine by using EDC and sulfo-NHS Acid-Amine coupling reaction method. Then drugs were adsorbed onto the PEGylated ND by following methods described here. The formation of ND-drug complexes was confirmed by using UV-visible spectroscopy by identifying the maximum absorption peaks (showed by arrows in the FIG. 1) at 370 nm for IRT and 428 nm for CUR respectively. The hydrodynamic sizes of PEGylated ND, ND-IRT, ND-CUR and NDIRT-CUR complexes in DMEM supplemented with 10% FBS are illustrated in FIG. 28. The sizes of ND and ND-drug complexes were within the range of 10-20 nm in water and 50-120 nm in DMEM containing 10% FBS (Table 3). The comparatively higher sizes in the DMEM containing 10% FBS are presumably due to the formation of protein corona in presence of serum. Nevertheless, even then the particles are less than 200 nm in size that is good for higher accumulation in tumor tissues than in normal tissues because of enhanced permeability and retention (EPR) effect. Furthermore, the sizes of these complexes did not change significantly up to 72 h incubation at 37° C. in DMEM containing 10% FBS suggesting a highly stable dispersion of the nanoparticles in physiological conditions (FIG. 28 B).

In Vivo Antitumor Activity of ND-PEG-IRT-CUR.

Figures 29A, 29B:
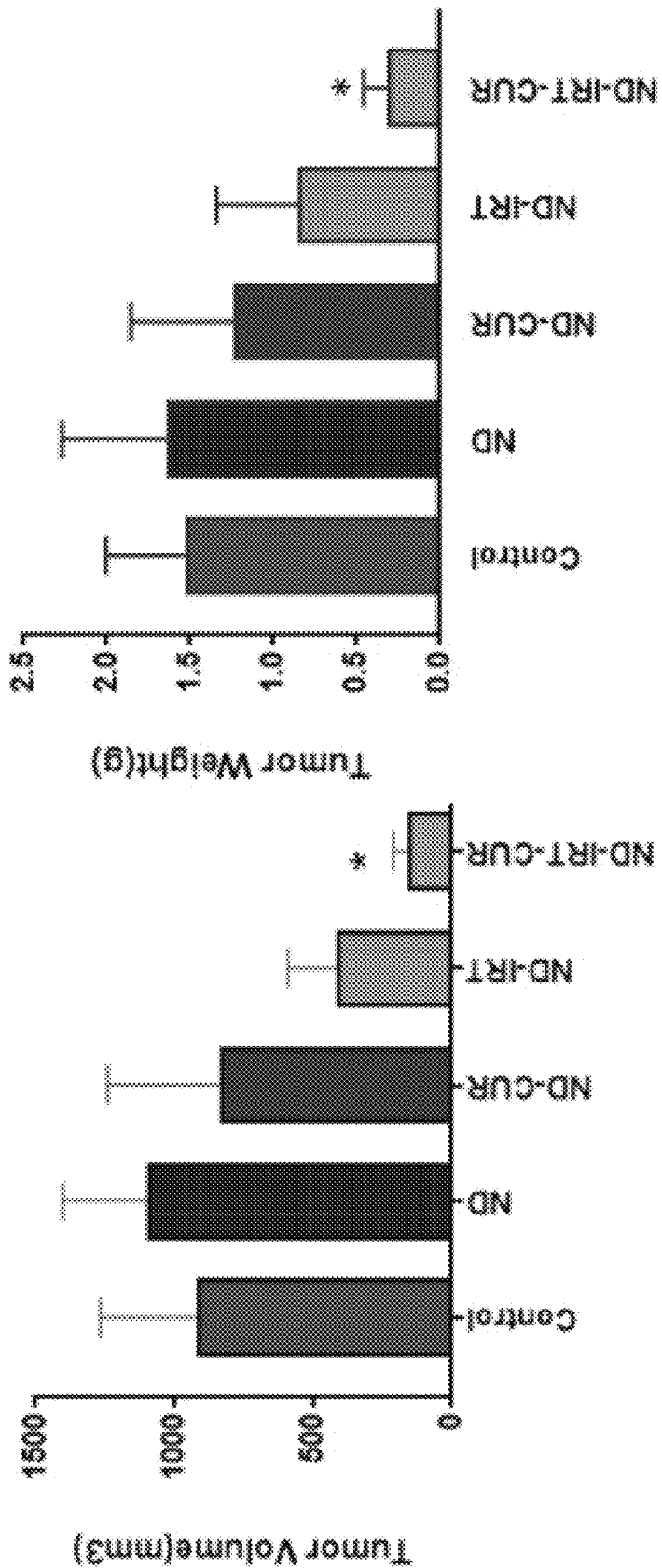
FIG. 29. In vivo anti tumor activity of ND-IRT-CUR. (A) Tumor volume, (B) Tumor weight in Ca5Cre Adenovirus implanted orthotopic spontaneous tumor generated in KPC mice after 2×/wk treatment for four weeks with Control, ND 100 mg/kg, NDIRT (5 mg/kg IRT equivalent), CUR (15 mg/kg CUR equivalent) and ND-IRT-CUR (5 mg/kg IRT equivalent+15 mg/kg CUR equivalent). Statistical Significance with respect to ND-IRT group (p Values*<0.05).

Finally, we tested the in vivo therapeutic efficacy of the ND-PEG-IRT-CUR in an immunocompetent PDAC model developed by injecting Ca5cre Adenovirus into the pancreas of Kras+/−p53flox/flox mice. Highly aggressive spontaneous PDAC tumors were developed within 2-3 weeks of adenovirus treatment. After four weeks, when the tumors were palpable by hand, mice were randomized into five groups before the initiation of treatment. The experiment was terminated after four weeks of treatment. FIGS. 29 A and B shows the tumor weight and tumor volume, respectively, of the treatment groups after 4 weeks of treatment. Although the single ND-IRT treated group showed some inhibition of tumor growth compared to control, ND or ND-CUR treated groups; ND PEG-IRT-CUR group was significantly more efficacious in inhibiting tumor growth. Taken together, these data demonstrate the superior antitumor activity of ND-PEG-IRT-CUR in highly aggressive spontaneous pancreatic tumor model developed in immunocompetent mice. Therefore, this formulation has the potential to be translated in clinical settings.

CONCLUSION

To summarize, in the present example, it was demonstrated that PEGylated NDs facilitated dual drug delivery and therapeutic enhancement in mouse models of PDAC. These results showed, for the first time, that the chemotherapeutic drug irinotecan and the anti-inflammatory/anti-cancer agent curcumin bind to NDs. This is also the first report on the utilization of computational all-atoms modeling of NDs for structural design implementation as a tool to develop effective nano-carriers for drug delivery. Subsequently, the drug-loaded NDs were extensively characterized and evaluated in vitro and in vivo using two models of genetically engineered, spontaneous PDAC. Interestingly, we found that NDs exerted immunomodulatory effects in vivo by inhibiting IL-9 and IL-10. Taken together, the results obtained herein will serve as a guide in the development of ND-based drug delivery systems.

REFERENCES

[1] D. P. Ryan, T. S. Hong, N. Bardeesy, Pancreatic Adenocarcinoma, New England Journal of Medicine 371(11) (2014) 1039-1049.
[2] J. P. Neoptolemos, J. Kleeff, P. Michl, E. Costello, W. Greenhalf, D. H. Palmer, Therapeutic developments in pancreatic cancer: current and future perspectives, Nature Reviews Gastroenterology & Hepatology 15(6) (2018) 333-348.
[3] P. P. Adiseshaiah, R. M. Crist, S. S. Hook, S. E. McNeil, Nanomedicine strategies to overcome the pathophysiological barriers of pancreatic cancer, Nature Reviews Clinical Oncology 13(12) (2016) 750-765.
[4] M. Erkan, S. Hausmann, C. W. Michalski, A. A. Fingerle, M. Dobritz, J. Kleeff, H. Friess, The role of stroma in pancreatic cancer: diagnostic and therapeutic implications, Nature Reviews Gastroenterology & Hepatology 9(8) (2012) 454-467.
[5] A. Neesse, H. Algül, D. A. Tuveson, T. M. Gress, Stromal biology and therapy in pancreatic cancer: a changing paradigm, Gut 64(9) (2015) 1476-1484.
[6] V. N. Mochalin, O. Shenderova, D. Ho, Y. Gogotsi, The properties and applications of nanodiamonds, Nature Nanotechnology 7(1) (2011) 11-23.
[7] D. Ho, C.-H. K. Wang, E. K.-H. Chow, Nanodiamonds: The intersection of nanotechnology, drug development, and personalized medicine, Science Advances 1(7) (2015) e1500439.
[8] J. Xiao, X. Duan, Q. Yin, Z. Zhang, H. Yu, Y. Li, Nanodiamonds-mediated doxorubicin nuclear delivery to inhibit lung metastasis of breast cancer, Biomaterials 34(37) (2013) 9648-9656.
[9] X. Wang, X. C. Low, W. Hou, L. N. Abdullah, T. B. Toh, M. Mohd Abdul Rashid, D. Ho, E. K.-H. Chow, Epirubicin-Adsorbed Nanodiamonds Kill Chemoresistant Hepatic Cancer Stem Cells, ACS Nano 8(12) (2014) 12151-12166.
[10] H. B. Man, H. Kim, H.-J. Kim, E. Robinson, W. K. Liu, E. K.-H. Chow, D. Ho, Synthesis of nanodiamond-daunorubicin conjugates to overcome multidrug chemoresistance in leukemia, Nanomedicine: Nanotechnology, Biology and Medicine 10(2) (2014) 359-369.
[11] V. S. Madamsetty, A. Sharma, M. Toma, S. Samaniego, A. Gallud, E. Wang, K. Pal, D. Mukhopadhyay, B. Fadeel, Tumor selective uptake of drug-nanodiamond complexes improves therapeutic outcome in pancreatic cancer, Nanomedicine: Nanotechnology, Biology and Medicine (2019).
[12] L. Moore, J. Yang, T. T. H. Lan, E. Osawa, D.-K. Lee, W. D. Johnson, J. Xi, E. K.-H. Chow, D. Ho, Biocompatibility Assessment of Detonation Nanodiamond in Non-Human Primates and Rats Using Histological, Hematologic, and Urine Analysis, ACS Nano 10(8) (2016) 7385-7400.
[13] T. Kamisawa, L. D. Wood, T. Itoi, K. Takaori, Pancreatic cancer, The Lancet 388(10039) (2016) 73-85.
[14] C. Guerra, M. Barbacid, Genetically engineered mouse models of pancreatic adenocarcinoma, Molecular Oncology 7(2) (2013) 232-247.
[15] J. W. Lee, C. A. Komar, F. Bengsch, K. Graham, G. L. Beatty, Genetically Engineered Mouse Models of Pancreatic Cancer: The KPC Model (LSL-KrasG12D/+; LSL-Trp53R172H/+; Pdx-1-Cre), Its Variants, and Their Application in Immuno-oncology Drug Discovery, (2016) 14.39.1-14.39.20.
[16] D. Wang, Y. Tong, Y. Li, Z. Tian, R. Cao, B. Yang, PEGylated nanodiamond for chemotherapeutic drug delivery, Diamond and Related Materials 36 (2013) 26-34.
[17] T. Caulfield, B. Devkota, Motion of transfer RNA from the A/T state into the A-site using docking and simulations, Proteins: Structure, Function, and Bioinformatics 80(11) (2012) 2489-2500.
[18] T. R. Caulfield, F. C. Fiesel, E. L. Moussaud-Lamodiere, D. F. Dourado, S. C. Flores, W. Springer, Phosphorylation by PINK1 releases the UBL domain and initializes the conformational opening of the E3 ubiquitin ligase Parkin, PLoS Comput Biol 10(11) (2014) e1003935.
[19] W. Humphrey, A. Dalke, K. Schulten, V M D: visual molecular dynamics, J Mol Graph 14(1) (1996) 33-8, 27-8.
[20] (Schrödinger. Suite 2012. BioLuminate, version 1.0 ed. New York, N. Y.: Schrödinger, LLC; 2012.).
[21] K. P. Olive, D. A. Tuveson, Z. C. Ruhe, B. Yin, N. A. Willis, R. T. Bronson, D. Crowley, T. Jacks, Mutant p53 Gain of Function in Two Mouse Models of Li-Fraumeni Syndrome, Cell 119(6) (2004) 847-860.
[22] K. Bhattacharya, G. Kilic, P. M. Costa, B. Fadeel, Cytotoxicity screening and cytokine profiling of nineteen nanomaterials enables hazard ranking and grouping based on inflammogenic potential, Nanotoxicology 11(6) (2017) 809-826.
[23] M. Chen, E. D. Pierstorff, R. Lam, S.-Y. Li, H. Huang, E. Osawa, D. Ho, Nanodiamond-Mediated Delivery of Water-Insoluble Therapeutics, ACS Nano 3(7) (2009) 2016-2022.
[24] M. C. Fadus, C. Lau, J. Bikhchandani, H. T. Lynch, Curcumin: An age-old anti-inflammatory and anti-neoplastic agent, Journal of Traditional and Complementary Medicine 7(3) (2017) 339-346.
[25] E. K. Chow, X. Q. Zhang, M. Chen, R. Lam, E. Robinson, H. Huang, D. Schaffer, E. Osawa, A. Goga, D. Ho, Nanodiamond Therapeutic Delivery Agents Mediate Enhanced Chemoresistant Tumor Treatment, Science Translational Medicine 3(73) (2011) 73ra21-73ra21.
[26] D. Rosenblum, N. Joshi, W. Tao, J. M. Karp, D. Peer, Progress and challenges towards targeted delivery of cancer therapeutics, Nature Communications 9(1) (2018) 1410.
[27] A. M. Nystrom, B. Fadeel, Safety assessment of nanomaterials: Implications for nanomedicine, Journal of Controlled Release 161(2) (2012) 403-408.
[28] D. Reichel, M. Tripathi, J. M. Perez, Biological Effects of Nanoparticles on Macrophage Polarization in the Tumor Microenvironment, Nanotheranostics 3(1) (2019) 66-88.
[29] L. Cassetta, J. W. Pollard, Targeting macrophages: therapeutic approaches in cancer, Nature Reviews Drug Discovery 17(12) (2018) 887-904.
[30] D. M. Mosser, J. P. Edwards, Exploring the full spectrum of macrophage activation, Nature Reviews Immunology 8(12) (2008) 958-969.
[31] C.-Y. Liu, J.-Y. Xu, X.-Y. Shi, W. Huang, T.-Y. Ruan, P. Xie, J.-L. Ding, M2-polarized tumor-associated macrophages promoted epithelial-mesenchymal transition in pancreatic cancer cells, partially through TLR4/IL-10 signaling pathway, Laboratory Investigation 93(7) (2013) 844-854.

[32] X. Miao, X. Leng, Q. Zhang, The Current State of Nanoparticle-Induced Macrophage Polarization and Reprogramming Research, International Journal of Molecular Sciences 18(2) (2017) 336.

[33] R. Rajan, M. K. Sabnani, V. Mavinkurve, H. Shmeeda, H. Mansouri, S. Bonkoungou, A. D. Le, L. M. Wood, A. A. Gabizon, N. M. La-Beck, Liposome-induced immunosuppression and tumor growth is mediated by macrophages and mitigated by liposome-encapsulated alendronate, Journal of Controlled Release 271 (2018) 139-148.

[34] S. Zanganeh, G. Hutter, R. Spitler, O. Lenkov, M. Mahmoudi, A. Shaw, J. S. Pajarinen, H. Nejadnik, S. Goodman, M. Moseley, L. M. Coussens, H. E. Daldrup-Link, Iron oxide nanoparticles inhibit tumour growth by inducing pro-inflammatory macrophage polarization in tumour tissues, Nature Nanotechnology 11(11) (2016) 986-994.

[35] L. Shen, J. Li, Q. Liu, W. Song, X. Zhang, K. Tiruthani, H. Hu, M. Das, T. J. Goodwin, R. Liu, L. Huang, Local Blockade of Interleukin 10 and C—X—C Motif Chemokine Ligand 12 with Nano-Delivery Promotes Antitumor Response in Murine Cancers, ACS Nano 12(10) (2018) 9830-9841.

[36] D. Daley, V. R. Mani, N. Mohan, N. Akkad, G. S. D. B. Pandian, S. Savadkar, K. B. Lee, A. Torres-Hernandez, B. Aykut, B. Diskin, W. Wang, M. S. Farooq, A. I. Mahmud, G. Werba, E. J. Morales, S. Lall, B. J. Wadowski, A. G. Rubin, M. E. Berman, R. Narayanan, M. Hundeyin, G. Miller, NLRP3 signaling drives macrophage-induced adaptive immune suppression in pancreatic carcinoma, The Journal of Experimental Medicine 214(6) (2017) 1711-1724.

[37] R. J. Noelle, E. C. Nowak, Cellular sources and immune functions of interleukin-9, Nature Reviews Immunology 10(10) (2010) 683-687.

[38] B. Hu, H. Qiu-lan, R.-e. Lei, C. Shi, H.-x. Jiang, S.-y. Qin, Interleukin-9 Promotes Pancreatic Cancer Cells Proliferation and Migration via the miR-200a/Beta-Catenin Axis, BioMed Research International 2017 (2017) 1-9.

[39] J. Zhao, Z. Xiao, T. Li, H. Chen, Y. Yuan, Y. A. Wang, C.-H. Hsiao, D. S. L. Chow, W. W. Overwijk, C. Li, Stromal Modulation Reverses Primary Resistance to Immune Checkpoint Blockade in Pancreatic Cancer, ACS Nano 12(10) (2018) 9881-9893.

[40] Z. Cui, Y. Zhang, K. Xia, Q. Yan, H. Kong, J. Zhang, X. Zuo, J. Shi, L. Wang, Y. Zhu, C. Fan, Nanodiamond autophagy inhibitor allosterically improves the arsenical-based therapy of solid tumors, Nature Communications 9(1) (2018).

[41] L. Balek, M. Buchtova, M. Kunova Bosakova, M. Varecha, S. Foldynova-Trantirkova, I. Gudernova, I. Vesela, J. Havlik, J. Neburkova, S. Turner, M. A. Krzyscik, M. Zakrzewska, L. Klimaschewski, P. Claus, L. Trantirek, P. Cigler, P. Krejci, Nanodiamonds as "artificial proteins": Regulation of a cell signalling system using low nanomolar solutions of inorganic nanocrystals, Biomaterials 176 (2018) 106-121.

[42] K. Bhattacharya, S. P. Mukherjee, A. Gallud, S. C. Burkert, S. Bistarelli, S. Bellucci, M. Bottini, A. Star, B. Fadeel, Biological interactions of carbon-based nanomaterials: From coronation to degradation, Nanomedicine: Nanotechnology, Biology and Medicine 12(2) (2016) 333-351.

Numbered Paragraphs

In some embodiments, the invention may be described by reference to the following numbered paragraphs:

1. A polypeptide, or a pharmaceutically acceptable salt thereof, comprising an amino acid sequence:
KCLSPPRYPC (SEQ ID NO: 1).

2. The polypeptide of paragraph 1, comprising an —S—S— bridge between cysteine (C) residues in the amino acid sequence SEQ ID NO: 1.

3. A lipopeptide of formula (I):

A-L-B  (I), or pharmaceutically acceptable salt thereof, wherein:
A is a lipid;
L is a linker or a bond; and
B is a polypeptide of paragraph 1 or 2.

4. The lipopeptide of paragraph 3, wherein the lipid is selected from a fatty acid, a fatty amine, a fatty amide, a saccharolipid, a prenol lipid, a sterol lipid, a sphingolipid, a glycerolipid, and a phospholipid.

5. The lipopeptide of paragraph 3 or 4, wherein the linker comprises $C_{2-100}$ alkylene, which is optionally interrupted by 1-10 groups independently selected from O, NH, N($C_{1-6}$ alkyl), C(=O), a PEG moiety comprising —(OCH$_2$CH$_2$)$_n$— or —(CH$_2$CH$_2$O)$_n$—, and a PPG moiety comprising —(OCH(CH$_3$)CH$_2$)$_n$— or —(CH$_2$CH(CH$_3$)O)$_n$—, wherein n is an integer from 1 to 2,000.

6. The lipopeptide of paragraph 5, wherein the linker comprises a group of formula:

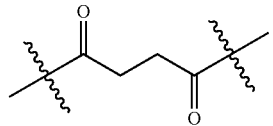

7. The lipopeptide of any one of paragraphs 3-6, wherein L is bound to the N-terminus of the polypeptide.

8. The lipopeptide of paragraph 7, wherein L is bound to the α-amino group of N-terminal amino acid (K) of the amino acid sequence SEQ ID NO: 1.

9. The lipopeptide of paragraph 3, wherein:
A is a fatty amine of formula:

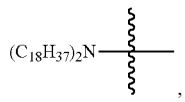

L is a linker of formula:

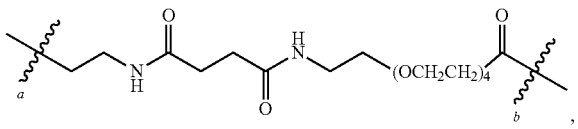

wherein a denotes a point of attachment to A, and b denotes a point of attachment to the α-amino group of the N-terminal amino acid (K) of the amino acid sequence SEQ ID NO: 1 of the polypeptide B.

10. A liposome comprising a lipopeptide of any one of paragraphs 3-9.

11. The liposome of paragraph 10, further comprising a lipid bilayer stabilizing agent.

12. The liposome of paragraph 11, where the lipid bilayer stabilizing agent is cholesterol.

13. The liposome of any one of paragraphs 10-12, further comprising one or more phospholipids.

14. The liposome of paragraph 13, wherein each phospholipid is independently selected from 1,2-dioleoyl-sn-glycero-3-phosphocholine (DOPC), 1,2-dioleoyl-sn-glycero-3-phosphoethanolamine (DOPE), 1,2-dipalmitoyl-sn-glycero-3-phosphocholine (DPPC), and 1,2-distearoyl-sn-glycero-3-phosphoethanolamine (DSPE).

15. The liposome of paragraph 13 or 14, wherein at least one phospholipid is derivatized with a hydrophilic polymer.

16. The liposome of paragraph 15, wherein the hydrophilic polymer is polyethylene glycol.

17. The liposome of paragraph 16, wherein the at least one phospholipid is DSPE-PEG$_{2000}$-OMe.

18. A liposome comprising:
    a lipopeptide of any one of paragraphs 3-9;
    a lipid bilayer stabilizing agent; and
    at least one phospholipid.

19. The liposome of paragraph 18, wherein:
    the lipid bilayer stabilizing agent is cholesterol; and
    each phospholipid is independently selected from 1,2-dioleoyl-sn-glycero-3-phosphocholine (DOPC), 1,2-dioleoyl-sn-glycero-3-phosphoethanolamine (DOPE), and 1,2-dipalmitoyl-sn-glycero-3-phosphocholine (DPPC).

20. The liposome of paragraph 18 or 19, wherein the molar ratio between the lipopeptide, the lipid bilayer stabilizing agent, and the combined amount of the phospholipids in the liposome is about 0.1 to about 0.25 to about 1, respectively.

21. A liposome comprising:
    a lipopeptide of any one of paragraphs 3-9;
    at least one phospholipid; and
    a derivatized phospholipid comprising a hydrophilic polymer.

22. The liposome of paragraph 21, wherein:
    each phospholipid is independently selected from 1,2-dioleoyl-sn-glycero-3-phosphocholine (DOPC), 1,2-dioleoyl-sn-glycero-3-phosphoethanolamine (DOPE), and 1,2-dipalmitoyl-sn-glycero-3-phosphocholine (DPPC); and
    the derivatized phospholipid is 1,2-distearoyl-sn-glycero-3-phosphoethanolamine (DSPE) comprising polyethylene glycol.

23. The liposome of paragraph 21 or 22, wherein the molar ratio between the lipopeptide, the derivatized phospholipid, and the combined amount of the phospholipids in the liposome is about 0.1 to about 0.01 to about 1.25, respectively.

24. A liposome comprising:
    a lipopeptide of any one of paragraphs 3-9;
    a lipid bilayer stabilizing agent;
    at least one phospholipid; and
    a derivatized phospholipid comprising a hydrophilic polymer.

25. The liposome of paragraph 24, wherein:
    the lipid bilayer stabilizing agent is cholesterol;
    each phospholipid is independently selected from 1,2-dioleoyl-sn-glycero-3-phosphocholine (DOPC), 1,2-dioleoyl-sn-glycero-3-phosphoethanolamine (DOPE), and 1,2-dipalmitoyl-sn-glycero-3-phosphocholine (DPPC); and
    the derivatized phospholipid is 1,2-distearoyl-sn-glycero-3-phosphoethanolamine (DSPE) comprising polyethylene glycol.

26. The liposome of paragraph 24 or 25, wherein the molar ratio between the lipopeptide, the lipid bilayer stabilizing agent, the combined amount of the phospholipids, and the derivatized phospholipid in the liposome is selected from:
    about 0.1 to about 0.25 to about 1 to about 0.01, respectively;
    about 0.05 to about 0.5 to about 1 to about 0.01, respectively;
    about 0.1 to about 0.1 to about 1 to about 0.01, respectively; and
    about 0.1 to about 0.1 to about 1.25 to about 0.01, respectively.

27. The liposome of any one of paragraphs 10-26, comprising at least one anti-cancer agent, or a pharmaceutically acceptable salt thereof.

28. The liposome of paragraph 27, wherein each anti-cancer agent is independently selected from an mTOR inhibitor, an NRP1 inhibitor, a mitosis inhibitor, an antimetabolite, an EGFR inhibitor, and an VEGFR2 inhibitor or a pharmaceutically acceptable salt thereof.

29. The liposome of paragraph 28, wherein the mTOR inhibitor is selected from everolimus, rapamycin, and temsirolimus, or a pharmaceutically acceptable salt thereof.

30. The liposome of paragraph 28, wherein the NRP1 inhibitor is selected from EG00229, EG01377, and MNRP1685A, or a pharmaceutically acceptable salt thereof.

31. The liposome of paragraph 28, wherein the mitosis inhibitor is selected from vinorelbine, paclitaxel, docetaxel, vinblastine, vincristine, vindesine, colchicine, podophyllotoxin, griseofulvin, and glaziovianin A, or pharmaceutically acceptable salt thereof.

32. The liposome of paragraph 28, wherein the EGFR inhibitor is selected from erlotinib, gefitinib, genistein, apatinib and afatinib, or a pharmaceutically acceptable salt thereof.

33. The liposome of paragraph 28, wherein the antimetabolite is selected from gemcitabine, 5-fluorouracil, 6-mercaptopurine, capecitabine, cytarabine, floxuridine, fludarabine, methotrexate, and pemetrexed, or a pharmaceutically acceptable salt thereof.

34. The liposome of paragraph 28, wherein the VEGFR2 inhibitor is selected from XL-184, sorafenib, sunitinib, and foretinib, or a pharmaceutically acceptable salt thereof.

35. The liposome of paragraph 27, comprising a combination of two anti-cancer agents, or a pharmaceutically acceptable salt thereof.

36. The liposome of paragraph 35, comprising an mTOR inhibitor, or a pharmaceutically acceptable salt thereof, and an NRP1 inhibitor, or a pharmaceutically acceptable salt thereof.

37. The liposome of paragraph 36, wherein:
    the mTOR inhibitor is selected from everolimus, rapamycin, and temsirolimus, or a pharmaceutically acceptable salt thereof, and
    the NRP1 inhibitor is selected from EG00229, EG01377, and MNRP1685A, or a pharmaceutically acceptable salt thereof.

38. The liposome of paragraph 35, comprising everolimus, or a pharmaceutically acceptable salt thereof, and EG00229, or a pharmaceutically acceptable salt thereof.

39. The liposome of paragraph 35, comprising an mTOR inhibitor, or a pharmaceutically acceptable salt thereof, and a mitosis inhibitor, or a pharmaceutically acceptable salt thereof.

40. The liposome of paragraph 39, wherein:
  the mTOR inhibitor is selected from everolimus, rapamycin, and temsirolimus, or a pharmaceutically acceptable salt thereof, and
  the mitosis inhibitor is selected from vinorelbine, paclitaxel, docetaxel, vinblastine, vincristine, vindesine, colchicine, podophyllotoxin, griseofulvin, and glaziovianin A, or pharmaceutically acceptable salt thereof.

41. The liposome of paragraph 35, comprising everolimus, or a pharmaceutically acceptable salt thereof, and vinorelbine, or a pharmaceutically acceptable salt thereof.

42. The liposome of paragraph 35, comprising an antimetabolite, or a pharmaceutically acceptable salt thereof, and a mitosis inhibitor, or a pharmaceutically acceptable salt thereof.

43. The liposome of paragraph 42, wherein:
  the antimetabolite is selected from gemcitabine, 5-fluorouracil, 6-mercaptopurine, capecitabine, cytarabine, floxuridine, fludarabine, methotrexate, and pemetrexed, or a pharmaceutically acceptable salt thereof; and
  the mitosis inhibitor is selected from vinorelbine, paclitaxel, docetaxel, vinblastine, vincristine, vindesine, colchicine, podophyllotoxin, griseofulvin, and glaziovianin A, or pharmaceutically acceptable salt thereof.

44. The liposome of paragraph 35, comprising gemcitabine, or a pharmaceutically acceptable salt thereof, and paclitaxel, or a pharmaceutically acceptable salt thereof.

45. The liposome of paragraph 35, comprising an antimetabolite, or a pharmaceutically acceptable salt thereof, and an EGFR inhibitor, or a pharmaceutically acceptable salt thereof.

46. The liposome of paragraph 45, wherein:
  the antimetabolite is selected from gemcitabine, 5-fluorouracil, 6-mercaptopurine, capecitabine, cytarabine, floxuridine, fludarabine, methotrexate, and pemetrexed, or a pharmaceutically acceptable salt thereof; and
  the EGFR inhibitor is selected from erlotinib, gefitinib, genistein, apatinib and afatinib, or a pharmaceutically acceptable salt thereof.

47. The liposome of paragraph 35, comprising gemcitabine, or a pharmaceutically acceptable salt thereof, and erlotinib, or a pharmaceutically acceptable salt thereof.

48. The liposome of paragraph 35, comprising an antimetabolite, or a pharmaceutically acceptable salt thereof, and a VEGFR2 inhibitor, or a pharmaceutically acceptable salt thereof.

49. The liposome of paragraph 48, wherein:
  the antimetabolite is selected from gemcitabine, 5-fluorouracil, 6-mercaptopurine, capecitabine, cytarabine, floxuridine, fludarabine, methotrexate, and pemetrexed, or a pharmaceutically acceptable salt thereof; and
  the VEGFR2 inhibitor is selected from XL-184, sorafenib, sunitinib, and foretinib, or a pharmaceutically acceptable salt thereof.

50. The liposome of paragraph 35, comprising gemcitabine, or a pharmaceutically acceptable salt thereof, and XL-184, or a pharmaceutically acceptable salt thereof.

51. The liposome of paragraph 35, comprising a mitosis inhibitor, or a pharmaceutically acceptable salt thereof, and a VEGFR2 inhibitor, or a pharmaceutically acceptable salt thereof.

52. The liposome of paragraph 51, wherein:
  the mitosis inhibitor is selected from vinorelbine, paclitaxel, docetaxel, vinblastine, vincristine, vindesine, colchicine, podophyllotoxin, griseofulvin, and glaziovianin A, or pharmaceutically acceptable salt thereof; and
  the VEGFR2 inhibitor is selected from XL-184, sorafenib, sunitinib, and foretinib, or a pharmaceutically acceptable salt thereof.

53. The liposome of paragraph 35, comprising paclitaxel, or a pharmaceutically acceptable salt thereof, and XL-184, or a pharmaceutically acceptable salt thereof.

54. A liposome comprising a combination of two anti-cancer agents, or pharmaceutically acceptable salts thereof, wherein the combination is selected from: everolimus, or a pharmaceutically acceptable salt thereof, and vinorelbine, or a pharmaceutically acceptable salt thereof,
  everolimus, or a pharmaceutically acceptable salt thereof, and EG00229, or a pharmaceutically acceptable salt thereof,
  gemcitabine, or a pharmaceutically acceptable salt thereof, and erlotinib, or a pharmaceutically acceptable salt thereof,
  gemcitabine, or a pharmaceutically acceptable salt thereof, and paclitaxel, or a pharmaceutically acceptable salt thereof,
  gemcitabine, or a pharmaceutically acceptable salt thereof, and XL-184, or a pharmaceutically acceptable salt thereof, and
  paclitaxel, or a pharmaceutically acceptable salt thereof, and XL-184, or a pharmaceutically acceptable salt thereof.

55. A pharmaceutical composition comprising a liposome of any one of paragraphs 27-54, and a pharmaceutically acceptable carrier.

56. A method of treating a cancer in a subject in need thereof, the method comprising administering to the subject a liposome of any one of paragraphs 27-54, or a pharmaceutical composition of paragraph 55.

57. The method of paragraph 56, wherein the cancer is selected from kidney cancer, pancreatic cancer, breast cancer, brain cancer, melanoma, and hematological cancer 58. The method of paragraph 57, wherein cancer is brain cancer.

59. The method of paragraph 58, wherein the brain cancer is glioblastoma.

60. The method of paragraph 57, wherein the cancer is kidney cancer.

61. The method of paragraph 60, wherein the kidney cancer is renal cell carcinoma.

62. The method of paragraph 57, wherein the cancer is pancreatic cancer.

63. A complex comprising
  a nanodiamond conjugated with a hydrophilic polymer; and
  an at least one anticancer therapeutic agent non-covalently bound to the surface of the nanodiamond.

64. The complex of paragraph 63, wherein the hydrophilic polymer is polyethyleneglycol.

65. The complex of paragraph 63 or 64, wherein the anticancer therapeutic agent is irinotecan, or a pharmaceutically acceptable salt thereof.

66. The complex of paragraph 63 or 64, wherein the anticancer therapeutic agent is curcumin, or a pharmaceutically acceptable salt thereof.

67. The complex of paragraph 63 or 64, wherein the complex comprises at least two anticancer therapeutic agents.

68. The complex of paragraph 67, wherein the complex comprises irinotecan, or a pharmaceutically acceptable salt thereof, and curcumin, or a pharmaceutically acceptable salt thereof.

69. A pharmaceutical composition comprising the complex of any one of paragraphs 63-68, and a pharmaceutically acceptable carrier.

70. A method of treating cancer, the method comprising administering to a subject in need thereof a therapeutically effective amount of a complex of any one of paragraphs 63-68, or a pharmaceutical composition of paragraph 69.

71. The method of paragraph 70, wherein the cancer is pancreatic cancer.

OTHER EMBODIMENTS

It is to be understood that while the present application has been described in conjunction with the detailed description thereof, the foregoing description is intended to illustrate and not limit the scope of the present application, which is defined by the scope of the appended claims. Other aspects, advantages, and modifications are within the scope of the following claims.

5. A liposome comprising a lipopeptide of claim 3;
a lipid bilayer stabilizing agent;
a phospholipid; and
a derivatized phospholipid comprising a hydrophilic polymer.

6. The liposome of claim 5, wherein the lipid bilayer stabilizing agent is cholesterol;
the phospholipid is selected from 1,2-dioleoyl-sn-glycero-3-phosphocholine (DOPC), 1,2-dioleoyl-sn-glycero-3-phosphoethanolamine (DOPE), and 1,2-dipalmitoyl-sn-glycero-3-phosphocholine (DPPC); and
the derivatized phospholipid comprising a hydrophilic polymer is 1,2-distearoyl-sn-glycero-3-phosphoethanolamine (DSPE) comprising polyethylene glycol.

7. The liposome of claim 5, comprising at least one anti-cancer agent, or a pharmaceutically acceptable salt thereof.

What is claimed is:

1. A polypeptide, or a pharmaceutically acceptable salt thereof, comprising SEQ ID NO: 1.

2. The polypeptide of claim 1, comprising an —S—S— bridge between cysteine (C) residues of SEQ ID NO: 1.

3. A lipopeptide of formula (I), wherein said formula (I) is A-L-B,
or pharmaceutically acceptable salt thereof, wherein A is a lipid; L is a linker or a bond; and
B is a polypeptide of claim 1.

4. The lipopeptide of claim 3, wherein
A is a fatty amine of formula

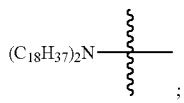

L is a linker of formula

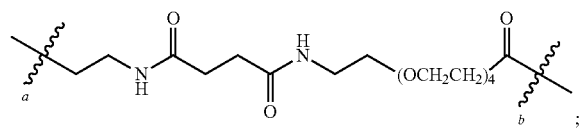

wherein a denotes a point of attachment to A, and b denotes a point of attachment to the α-amino group of the N-terminal amino acid (K) of SEQ ID NO: 1 of the polypeptide B.

8. The liposome of claim 7, comprising an mTOR inhibitor, or a pharmaceutically acceptable salt thereof; and an NRP1 inhibitor, or a pharmaceutically acceptable salt thereof.

9. The liposome of claim 8, wherein the mTOR inhibitor is selected from the group consisting of everolimus, rapamycin, and temsirolimus, or a pharmaceutically acceptable salt thereof; and
the NRP1 inhibitor is selected from the group consisting of EG00229, EG01377, and MNRP1685A, or a pharmaceutically acceptable salt thereof.

10. The liposome of claim 7, comprising an mTOR inhibitor, or a pharmaceutically acceptable salt thereof; and a mitosis inhibitor, or a pharmaceutically acceptable salt thereof.

11. The liposome of claim 10, wherein the mTOR inhibitor is selected from the group consisting of everolimus, rapamycin, and temsirolimus, or a pharmaceutically acceptable salt thereof; and
the mitosis inhibitor is selected from the group consisting of vinorelbine, paclitaxel, docetaxel, vinblastine, vincristine, vindesine, colchicine, podophyllotoxin, griseofulvin, and glaziovianin A, or pharmaceutically acceptable salt thereof.

12. The liposome of claim 7, comprising an antimetabolite, or a pharmaceutically acceptable salt thereof; and a mitosis inhibitor, or a pharmaceutically acceptable salt thereof.

13. The liposome of claim 12, wherein the antimetabolite is selected from the group consisting of gemcitabine, 5-fluorouracil, 6-mercaptopurine, capecitabine, cytarabine, floxuridine, fludarabine, methotrexate, and pemetrexed, or a pharmaceutically acceptable salt thereof; and the mitosis inhibitor is selected from the group consisting of vinorelbine, paclitaxel, docetaxel, vinblastine, vincristine, vindesine, colchicine, podophyllotoxin, griseofulvin, and glaziovianin A, or pharmaceutically acceptable salt thereof.

14. The liposome of claim 7, comprising an antimetabolite, or a pharmaceutically acceptable salt thereof; and an EGFR inhibitor, or a pharmaceutically acceptable salt thereof.

15. The liposome of claim 14, wherein the antimetabolite is selected from the group consisting of gemcitabine, 5-fluorouracil, 6-mercaptopurine, capecitabine, cytarabine, floxuridine, fludarabine, methotrexate, and pemetrexed, or a pharmaceutically acceptable salt thereof; and the EGFR inhibitor is selected from the group consisting of erlotinib, gefitinib, genistein, apatinib and afatinib, or a pharmaceutically acceptable salt thereof.

16. The liposome of claim 7, comprising an antimetabolite, or a pharmaceutically acceptable salt thereof; and a VEGFR2 inhibitor, or a pharmaceutically acceptable salt thereof.

17. The liposome of claim 16, wherein the antimetabolite is selected from the group consisting of gemcitabine, 5-fluorouracil, 6-mercaptopurine, capecitabine, cytarabine, floxuridine, fludarabine, methotrexate, and pemetrexed, or a pharmaceutically acceptable salt thereof; and the VEGFR2 inhibitor is selected from the group consisting of XL-184, sorafenib, sunitinib, and foretinib, or a pharmaceutically acceptable salt thereof.

18. The liposome of claim 7, comprising a mitosis inhibitor, or a pharmaceutically acceptable salt thereof; and a VEGFR2 inhibitor, or a pharmaceutically acceptable salt thereof.

19. The liposome of claim 18, wherein the mitosis inhibitor is selected from the group consisting of vinorelbine, paclitaxel, docetaxel, vinblastine, vincristine, vindesine, colchicine, podophyllotoxin, griseofulvin, and glaziovianin A, or pharmaceutically acceptable salt thereof; and the VEGFR2 inhibitor is selected from the group consisting of XL-184, sorafenib, sunitinib, and foretinib, or a pharmaceutically acceptable salt thereof.

20. The liposome of claim 7, comprising a combination of two anti-cancer agents, or pharmaceutically acceptable salts thereof, wherein the combination is selected from the group consisting of
  (i) everolimus, or a pharmaceutically acceptable salt thereof, and vinorelbine, or a pharmaceutically acceptable salt thereof;
  (ii) everolimus, or a pharmaceutically acceptable salt thereof, and EG00229, or a pharmaceutically acceptable salt thereof;
  (iii) gemcitabine, or a pharmaceutically acceptable salt thereof, and erlotinib, or a pharmaceutically acceptable salt thereof;
  (iv) gemcitabine, or a pharmaceutically acceptable salt thereof, and paclitaxel, or a pharmaceutically acceptable salt thereof;
  (v) gemcitabine, or a pharmaceutically acceptable salt thereof, and XL-184, or a pharmaceutically acceptable salt thereof; and
  (vi) paclitaxel, or a pharmaceutically acceptable salt thereof, and XL-184, or a pharmaceutically acceptable salt thereof.

21. A pharmaceutical composition comprising a liposome of claim 7, and a pharmaceutically acceptable carrier.

22. A method of treating a cancer in a subject in need thereof, the method comprising administering to the subject a pharmaceutical composition of claim 21, wherein the cancer is selected from the group consisting of a pancreatic cancer, a kidney cancer, a lung cancer, a liver cancer, an ovarian cancer, and a brain cancer.

* * * * *

SEQUENCE LISTING

<160> NUMBER OF SEQ ID NOS: 1

<210> SEQ ID NO 1
<211> LENGTH: 10
<212> TYPE: PRT
<213> ORGANISM: Artificial
<220> FEATURE:
<223> OTHER INFORMATION: synthetically generated polypeptide

<400> SEQUENCE: 1

Lys Cys Leu Ser Pro Pro Arg Tyr Pro Cys
1               5                   10